(12) United States Patent
Hormis et al.

(10) Patent No.: US 11,881,929 B2
(45) Date of Patent: *Jan. 23, 2024

(54) RADIO FREQUENCY DOMAIN BEAMFORMING ROUTER

(71) Applicant: QUALCOMM Incorporated, San Diego, CA (US)

(72) Inventors: Raju Hormis, New York, NY (US); Navid Abedini, Basking Ridge, NJ (US); Junyi Li, Fairless Hills, PA (US); Juergen Cezanne, Ocean Township, NJ (US); Ozge Koymen, Princeton, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/883,183

(22) Filed: Aug. 8, 2022

(65) Prior Publication Data

US 2023/0033880 A1  Feb. 2, 2023

Related U.S. Application Data

(63) Continuation of application No. 16/883,818, filed on May 26, 2020, now Pat. No. 11,411,641.

(Continued)

(51) Int. Cl.
*H04B 7/155* (2006.01)
*H04B 7/204* (2006.01)
(Continued)

(52) U.S. Cl.
CPC .......... *H04B 7/2041* (2013.01); *H04B 7/043* (2013.01); *H04B 7/0456* (2013.01); *H04B 7/1555* (2013.01)

(58) Field of Classification Search
CPC .... H04B 7/2041; H04B 7/043; H04B 7/0456; H04B 7/1555; H04B 7/086; H04B 7/0617; Y02D 30/70; H04W 40/08
See application file for complete search history.

(56) References Cited

U.S. PATENT DOCUMENTS 5,027,125 A  6/1991  Tang
5,932,936 A  8/1999  Potthast et al.
(Continued)

FOREIGN PATENT DOCUMENTS

CN    107852397 A      3/2018
WO    WO-2014019213 A1  2/2014
WO    WO-2018063824 A1  4/2018

OTHER PUBLICATIONS

Bargellini P.L., et al., "An Overview of Satellite Transmission Techniques", Innovations in Telecommunications, New York: Academic, 1982 (pp. 565-602).

(Continued)

*Primary Examiner* — Kenneth T Lam
(74) *Attorney, Agent, or Firm* — Holland & Hart LLP/QUALCOMM Incorporated

(57) ABSTRACT

Methods, systems, and devices for wireless communications are described in which RF-domain wireless routers may repeat, extend, or redirect beamformed wireless signals received from one or more transmitters to one or more receivers. The router may receive transmissions at a mmW frequency using a first array of antenna elements, and provide the transmissions to a beamforming network, such as a Butler matrix, that outputs one or more a signals to a switching network. The switching network may perform switching to provide the one or more signals to desired inputs of an output beamforming network that outputs beamformed transmission beams via a second array of antenna elements.

30 Claims, 23 Drawing Sheets

Related U.S. Application Data

(60) Provisional application No. 62/855,669, filed on May 31, 2019.

(51) Int. Cl.
*H04B 7/0426* (2017.01)
*H04B 7/0456* (2017.01)

(56) References Cited

U.S. PATENT DOCUMENTS

| | | | |
|---|---|---|---|
| 6,933,812 | B2 | 8/2005 | Sarabandi et al. |
| 7,151,507 | B1 | 12/2006 | Herting |
| 7,526,321 | B2 | 4/2009 | Liu |
| 7,872,547 | B2 | 1/2011 | Song et al. |
| 8,244,175 | B2 | 8/2012 | Rofougaran |
| 9,184,829 | B2 | 11/2015 | Miller et al. |
| 9,374,887 | B1 | 6/2016 | Warne et al. |
| 9,692,126 | B2 | 6/2017 | Sharawi |
| 9,692,489 | B1 | 6/2017 | Rofougaran et al. |
| 9,985,357 | B2 | 5/2018 | Perumana et al. |
| 10,608,678 | B1 | 3/2020 | Hormis et al. |
| 10,833,788 | B2 * | 11/2020 | Frenne .......... H04L 27/2613 |
| 10,944,452 | B2 | 3/2021 | Islam et al. |
| 11,411,641 | B2 * | 8/2022 | Hormis .......... H04B 7/043 |
| 2004/0110469 | A1 | 6/2004 | Judd et al. |
| 2006/0040615 | A1 | 2/2006 | Mohamadi |
| 2011/0008008 | A1 | 1/2011 | Chowdhury et al. |
| 2012/0299765 | A1 | 11/2012 | Huang et al. |
| 2013/0248936 | A1 | 9/2013 | Alexopoulos |
| 2017/0062948 | A1 | 3/2017 | Artemenko et al. |
| 2017/0331528 | A1 | 11/2017 | Gamand et al. |
| 2018/0124783 | A1 | 5/2018 | Mukkavilli et al. |
| 2018/0241137 | A1 | 8/2018 | Perumana et al. |
| 2018/0352444 | A1 | 12/2018 | Sridharan et al. |
| 2019/0020402 | A1 | 1/2019 | Gharavi et al. |
| 2019/0181943 | A1 | 6/2019 | Liang et al. |
| 2019/0238283 | A1 | 8/2019 | Liu et al. |
| 2019/0260442 | A1 | 8/2019 | Clifton |
| 2020/0028556 | A1 * | 1/2020 | Inoue ............. H04B 7/088 |
| 2020/0195310 | A1 | 6/2020 | Abedini et al. |
| 2020/0280127 | A1 | 9/2020 | Hormis et al. |
| 2020/0280355 | A1 | 9/2020 | Abedini et al. |

OTHER PUBLICATIONS

Cetinoneri B., et al., "An 8×8 Butler Matrix in 0.13 micrometre CMOS for 5-6-GHz Multibeam Applications", IEEE Transactions on Microwave Theory and Techniques, vol. 59, No. 2, Feb. 1, 2011 (Feb. 1, 2011), pp. 295-301, XP055740221, USA ISSN: 0018-9480, DOI: 10.1109/TMTT.2010.2097751, figure 1.

Chu H M., et al., "An Extended 4 × 4 Butler Matrix with Enhanced Beam Controllability and Widened Spatial Coverage", IEEE Transactions on Microwave Theory and Techniques, vol. 66, No. 3, Mar. 2018, 11 pages.

Fomani A.A., et al., "Monolithically Integrated Multiport RF MEMS Switch Matrices", IEEE Transactions on Microwave Theory and Techniques, vol. 57, No. 12, Dec. 2009, pp. 3434-3441.

International Search Report and Written Opinion—PCT/US2020/034729—ISAEPO—dated Oct. 27, 2020.

Lian J-W., et al., "Planar Millimeter-Wave 2-D Beam-Scanning Multibeam Array Antenna Fed by Compact SIW Beam-Forming Network", IEEE Transactions on Antennas and Propagation, vol. 66, No. 3, Mar. 2018, 12 pages.

Mohammed Zobilah A., et al., Fixed and Selectable Multiband Isolation of Double Pole Double Throw Switch Using Transmission Line Stub Resonators for WIMAX and LTE, Progress in Electromagnetics Research B, vol. 72, Jan. 1, 2017 (Jan. 1, 2017), pp. 95-110, XP055740154, DOI: 10.2528/PIERB16100903 p. 1, bottom passage, figure 1.

Partial International Search Report—PCT/US2020/034729—ISA/EPO—dated Aug. 13, 2020.

Yu B., et al., "DC-30 GHz DPDT Switch Matrix Design in High Resistivity Trap-Rich SOI", IEEE Transactions on Electron Devices, vol. 64, No. 9, Sep. 2017, pp. 3548-3554.

* cited by examiner

RADIO FREQUENCY DOMAIN BEAMFORMING ROUTER

CROSS REFERENCE

The present application for patent is a Continuation of U.S. patent application Ser. No. 16/883,818 by HORMIS et al., entitled "RADIO FREQUENCY DOMAIN BEAMFORMING ROUTER" filed May 26, 2020, which claims the benefit of U.S. Provisional Patent Application No. 62/855,669 by HORMIS et al., entitled "RADIO FREQUENCY DOMAIN BEAMFORMING ROUTER," filed May 31, 2019, assigned to the assignee hereof, and expressly incorporated by reference herein.

INTRODUCTION

The following relates to wireless communications, and more specifically to a device that routes wireless communications between a transmitting device and a receiving device.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some deployments, wireless communications between transmitting devices and receiving devices may be limited by path-loss through the air, interference from physical blockers, or other constraints. Further, one or more transmitting interfering devices, or jammers, may be located in proximity to a transmitter, receiver, or other network node.

SUMMARY

A method of wireless communication at a wireless router is described. The method may include configuring a first beamforming network to receive one or more receive beams of a set of receive beams, a second beamforming network to transmit one or more transmit beams of a set of transmit beams, and a switching network coupled between the first beamforming network and the second beamforming network to route signals between the first beamforming network and the second beamforming network based on a mapping of the one or more receive beams to the one or more transmit beams. The method may also include receiving, at two or more antenna elements of a first antenna array, one or more beamformed transmissions associated with the one or more receive beams. The method may also include feeding received signals at each of the two or more antenna elements into corresponding inputs of the first beamforming network. The method may also include switching, at the switching network, one or more outputs of a set of outputs of the first beamforming network to be coupled with one or more inputs of a set of inputs of the second beamforming network based on the mapping of the one or more receive beams to the one or more transmit beams. Additionally, the method may include transmitting, using two or more antenna elements of a second antenna array coupled with corresponding outputs of the second beamforming network, the one or more transmit beams.

An apparatus for wireless communication at a wireless router is described. The apparatus may include a processor, memory coupled with the processor. The processor and the memory may be configured to configure a first beamforming network to receive one or more receive beams of a set of receive beams, a second beamforming network to transmit one or more transmit beams of a set of transmit beams, and a switching network coupled between the first beamforming network and the second beamforming network to route signals between the first beamforming network and the second beamforming network based on a mapping of the one or more receive beams to the one or more transmit beams. The processor and the memory may also be configured to cause reception of one or more beamformed transmissions via two or more antenna elements of a first antenna array. The one or more beamformed transmissions may be associated with the one or more receive beams. The processor and the memory may also be configured to feed received signals at each of the two or more antenna elements into corresponding inputs of the first beamforming network. The processor and the memory may also be configured to switch, at the switching network, one or more outputs of a set of outputs of the first beamforming network to be coupled with one or more inputs of a set of inputs of the second beamforming network based on the mapping of the one or more receive beams to the one or more transmit beams. Additionally, the processor and the memory may be configured to cause transmission of the one or more transmit beams via two or more antenna elements of a second antenna array coupled with corresponding outputs of the second beamforming network.

Another apparatus for wireless communication at a wireless router is described. The apparatus may include means for configuring a first beamforming network to receive one or more receive beams of a set of receive beams, a second beamforming network to transmit one or more transmit beams of a set of transmit beams, and a switching network coupled between the first beamforming network and the second beamforming network to route signals between the first beamforming network and the second beamforming network based on a mapping of the one or more receive beams to the one or more transmit beams. The apparatus may also include means for receiving, at two or more antenna elements of a first antenna array, one or more beamformed transmissions associated with the one or more receive beams. The apparatus may also include means for feeding received signals at each of the two or more antenna elements into corresponding inputs of the first beamforming network. The apparatus may also include means for switching, at the switching network, one or more outputs of a set of outputs of the first beamforming network to be coupled with one or more inputs of a set of inputs of the second beamforming network based on the mapping of the one or more receive beams to the one or more transmit beams. Additionally, the apparatus may include means for transmitting, using two or more antenna elements of a second antenna array coupled with corresponding outputs of the second beamforming network, the one or more transmit beams.

A non-transitory computer-readable medium storing code for wireless communication at a wireless router is described. The code may include instructions executable by a processor to configure a first beamforming network to receive one or more receive beams of a set of receive beams, a second beamforming network to transmit one or more transmit beams of a set of transmit beams, and a switching network coupled between the first beamforming network and the second beamforming network to route signals between the first beamforming network and the second beamforming network based on a mapping of the one or more receive beams to the one or more transmit beams. The code may also include instructions executable by the processor to receive, at two or more antenna elements of a first antenna array, one or more beamformed transmissions associated with the one or more receive beams, feed received signals at each of the two or more antenna elements into corresponding inputs of the first beamforming network. The code may also include instructions executable by the processor to switch, at the switching network, one or more outputs of a set of outputs of the first beamforming network to be coupled with one or more inputs of a set of inputs of the second beamforming network based on the mapping of the one or more receive beams to the one or more transmit beams. Additionally, the code may include instructions executable by the processor to transmit, using two or more antenna elements of a second antenna array coupled with corresponding outputs of the second beamforming network, the one or more transmit beams.

In some examples of the method, apparatuses, and non-transitory computer-readable medium described herein, the first beamforming network and the second beamforming network may be each based on a Butler matrix.

Some examples of the method, apparatuses, and non-transitory computer-readable medium described herein may further include operations, features, means, or instructions for determining a first receive beam of the set of receive beams to be repeated via a first transmit beam of the set of transmit beams, where the first receive beam may be associated with a first output of the set of outputs of the first beamforming network and the first transmit beam may be associated with a first input of the set of inputs of the second beamforming network, and where the configuring further includes configuring the switching network to route signals from the first output of the first beamforming network to the first input of the second beamforming network based on the mapping of the first receive beam to the first transmit beam.

In some examples of the method, apparatuses, and non-transitory computer-readable medium described herein, the switching network includes a first single-pole-M-throw (SPMT) switch coupled between the set of outputs of the first beamforming network and a variable gain amplifier, and a second SPMT switch coupled between the variable gain amplifier and the set of inputs of the second beamforming network.

In some examples of the method, apparatuses, and non-transitory computer-readable medium described herein, the first beamforming network includes a low noise amplifier (LNA) coupled between each of the two or more antenna elements of the first antenna array and an associated input of the first beamforming network, and where the second beamforming network includes a power amplifier (PA) driver and a PA coupled between each of the two or more antenna elements of the second antenna array and an associated output of the second beamforming network.

In some examples of the method, apparatuses, and non-transitory computer-readable medium described herein, the wireless router may be a bidirectional wireless router, the set receive beams may have beamforming parameters that correspond to a first set of beams that can be transmitted or received via the first antenna array and the first beamforming network, the set transmit beams may have beamforming parameters that correspond to a second set of beams that can be transmitted or received via the second antenna array and the second beamforming network, and where the method further includes switching a di-pole-di-throw (DPDT) switch that may be coupled between a first SPMT switch associated with the first beamforming network and a second SPMT switch associated with the second beamforming network to toggle the first antenna array from a transmit configuration to a receive configuration and the second antenna array from the receive configuration to the transmit configuration.

In some examples of the method, apparatuses, and non-transitory computer-readable medium described herein, the switching the DPDT switch changes signal path through a LNA, a PA driver, and a PA to flow from the first SPMT switch to the second SNPT switch or from the second SPMT switch to the first SPMT switch. In some examples of the method, apparatuses, and non-transitory computer-readable medium described herein, the switching the DPDT switch occurs during a guard period between a first time domain duplexing (TDD) period and a second TDD period.

Some examples of the method, apparatuses, and non-transitory computer-readable medium described herein may further include operations, features, means, or instructions for determining a first receive beam of the set of receive beams to be repeated via two or more transmit beams of the set of transmit beams, where the first receive beam may be associated with a first output of the set of outputs of the first beamforming network and the two or more transmit beams may be associated with two or more inputs of the set of inputs of the second beamforming network, and where the configuring further includes configuring the switching network to route signals from the first output of the first beamforming network to the two or more inputs of the second beamforming network based on the mapping of the first receive beam to the two or more transmit beams.

In some examples of the method, apparatuses, and non-transitory computer-readable medium described herein, the switching network includes a SPMT switch coupled between the set of outputs of the first beamforming network and a variable gain amplifier that may be coupled with a power divider that divides the output of the variable gain amplifier among the set of inputs of the second beamforming network.

In some examples of the method, apparatuses, and non-transitory computer-readable medium described herein, the wireless router may be a bidirectional wireless router, the set receive beams may have beamforming parameters that correspond to a first set of beams that can be transmitted or received via the first antenna array and the first beamforming network, the set transmit beams may have beamforming parameters that correspond to a second set of beams that can be transmitted or received via the second antenna array and the second beamforming network, and where the method further includes a DPDT switch that may be coupled between a SPMT switch associated with the first beamforming network and a power divider/combiner of the second beamforming network to toggle the first antenna array from a transmit configuration to a receive configuration and the second antenna array from the receive configuration to the transmit configuration. In some examples of the method, apparatuses, and non-transitory computer-readable medium described herein, the switching the DPDT switch changes signal path through a LNA, a PA driver, and a PA to flow from the SPMT switch to the power divider/combiner or from the power divider/combiner to the SPMT switch.

Some examples of the method, apparatuses, and non-transitory computer-readable medium described herein may further include operations, features, means, or instructions for determining a first set of beams that includes two or more receive beams of the set of receive beams to be repeated via a second set of beams that includes two or more transmit beams of the set of transmit beams, where each beam of the first set of beams may be associated with a corresponding output of a first output set of the set of outputs of the first beamforming network and each beam of the second set of beams may be associated with a corresponding input of a first input set the set of inputs of the second beamforming network, and where the configuring further includes configuring the switching network to route signals from the first output set of the first beamforming network to the first input set of the second beamforming network based on the mapping of the first set of beams to the second set of beams.

In some examples of the method, apparatuses, and non-transitory computer-readable medium described herein, the switching may include operations, features, means, or instructions for dividing, at a set of power dividers that may be associated with each output of the set of outputs of the first beamforming network, each output signal of the first output set into a first number of outputs that correspond to a second number of inputs of the set of inputs of the second beamforming network, switching, based on the mapping of the first set of beams to the second set of beams, a set of single-pole-single-throw (SPST) switches, each SPST switch coupled with a divided output signal of one of the set of power dividers, where the switching couples the divided output signals with a set of inputs of a set of power combiners, each power combiner being associated with a corresponding input of the set of inputs of the second beamforming network, combining, at the set of power combiners, received output signals from a set of SPST switches, where each SPST switch of the set of SPST switches may be associated with a corresponding output of the first output set, and routing an output of each of the set of power combiners to an associated input of the set of inputs of the second beamforming network.

In some examples of the method, apparatuses, and non-transitory computer-readable medium described herein, the first beamforming network includes a LNA coupled between each of the two or more antenna elements of the first antenna array and an associated input of the first beamforming network, and where the second beamforming network includes a PA driver and a PA coupled between each of the two or more antenna elements of the second antenna array and an associated output of the second beamforming network.

In some examples of the method, apparatuses, and non-transitory computer-readable medium described herein, the wireless router may be a bidirectional wireless router, the set receive beams may have beamforming parameters that correspond to the first set of beams that can be transmitted or received via the first antenna array and the first beamforming network, the set transmit beams may have beamforming parameters that correspond to the second set of beams that can be transmitted or received via the second antenna array and the second beamforming network, and where the method further includes switching a first set of transmit/receive amplification paths between antenna elements of the first antenna array and the first beamforming network based on whether the first set of beams may be being transmitted or received using the first antenna array, and switching a second set of transmit/receive amplification paths between antenna elements of the second antenna array and the second beamforming network based on whether the second set of beams may be being transmitted or received using the second antenna array.

In some examples of the method, apparatuses, and non-transitory computer-readable medium described herein, the switching the first set of transmit/receive amplification paths and the second set of transmit/receive amplification paths occurs during a guard period between a first TDD period and a second TDD period.

In some examples of the method, apparatuses, and non-transitory computer-readable medium described herein, the switching the first set of transmit/receive amplification paths and the second set of transmit/receive amplification paths occurs concurrently at a duplexer or circulator component to route received signals at each antenna element to a LNA and to concurrently route signals to be transmitted at each antenna element to a PA driver and PA, and where the switching provides full-duplex routing of transmitted and received signals.

In some examples of the method, apparatuses, and non-transitory computer-readable medium described herein, the first beamforming network, switching network, and the second beamforming network may be associated with a first transmission path at a first frequency of a frequency division duplexing (FDD) system; and where the method further includes, receiving, at two or more antenna elements of the second antenna array, a second signal at a second frequency of the FDD system, feeding the received second signal into corresponding inputs of a third beamforming network associated with a second transmission path at the second frequency of the FDD system, switching, at a second switching network associated with the second transmission path at the second frequency of the FDD system, one or more outputs of the third beamforming network to be coupled with one or more inputs of a fourth beamforming network associated with the second transmission path at the second frequency of the FDD system, where the switching may be based on the mapping of the one or more receive beams to the one or more transmit beams, and transmitting, using two or more antenna elements of the second antenna array coupled with corresponding outputs of the fourth beamforming network, the second signal at the second frequency of the FDD system.

In some examples of the method, apparatuses, and non-transitory computer-readable medium described herein, the first beamforming network includes a first LNA coupled between each of the two or more antenna elements of the first antenna array and an associated input of the first beamforming network, the second beamforming network includes a first PA driver and a first PA coupled between each of the two or more antenna elements of the second antenna array and an associated output of the second beamforming network, the third beamforming network includes a second LNA coupled between each of the two or more antenna elements of the second antenna array and an associated input of the third beamforming network, and the fourth beamforming network includes a second PA driver and a second PA coupled between each of the two or more antenna elements of the first antenna array and an associated output of the fourth beamforming network.

In some examples of the method, apparatuses, and non-transitory computer-readable medium described herein, a first diplexer routes signals received at the first antenna array at the first frequency of the FDD system to the first beamforming network and routes signals provided from the fourth beamforming network to the first antenna array, and a second diplexer routes signals received at the second antenna array at the second frequency of the FDD system to the third beamforming network and routes signals provided from the second beamforming network to the second antenna array.

Some examples of the method, apparatuses, and non-transitory computer-readable medium described herein may further include operations, features, means, or instructions for establishing a control link with a controller of the wireless router, the control link being separate from the one or more receive beams or the one or more transmit beams, and receiving, via the control link, one or more of first beamforming parameters for the first beamforming network, second beamforming parameters for the second beamforming network, mapping information between the one or more receive beams and the one or more transmit beams, or any combinations thereof. In some examples of the method, apparatuses, and non-transitory computer-readable medium described herein, the first antenna array includes an dual polarization antenna array functioning in a first polarization and the second antenna array includes the dual polarization antenna array functioning in a second polarization.

In some examples of the method, apparatuses, and non-transitory computer-readable medium described herein, one or more components of the wireless router, including one or more of the first antenna array, the second antenna array, one or more switches, one or more couplers, one or more combiners, one or more splitters, one or more filters, one or more phase-shifters, one or more connecting elements, or any combinations thereof, include a meta-material or a material with tunable permittivity and permeability.

Some examples of the method, apparatuses, and non-transitory computer-readable medium described herein may further include operations, features, means, or instructions for monitoring an output of at least one PA associated with the second beamforming network and the second antenna array, and adjusting, based on the output, one or more of a gain of the at least one PA or a gain of at least one LNA coupled with the first antenna array.

DETAILED DESCRIPTION

Figure 1:
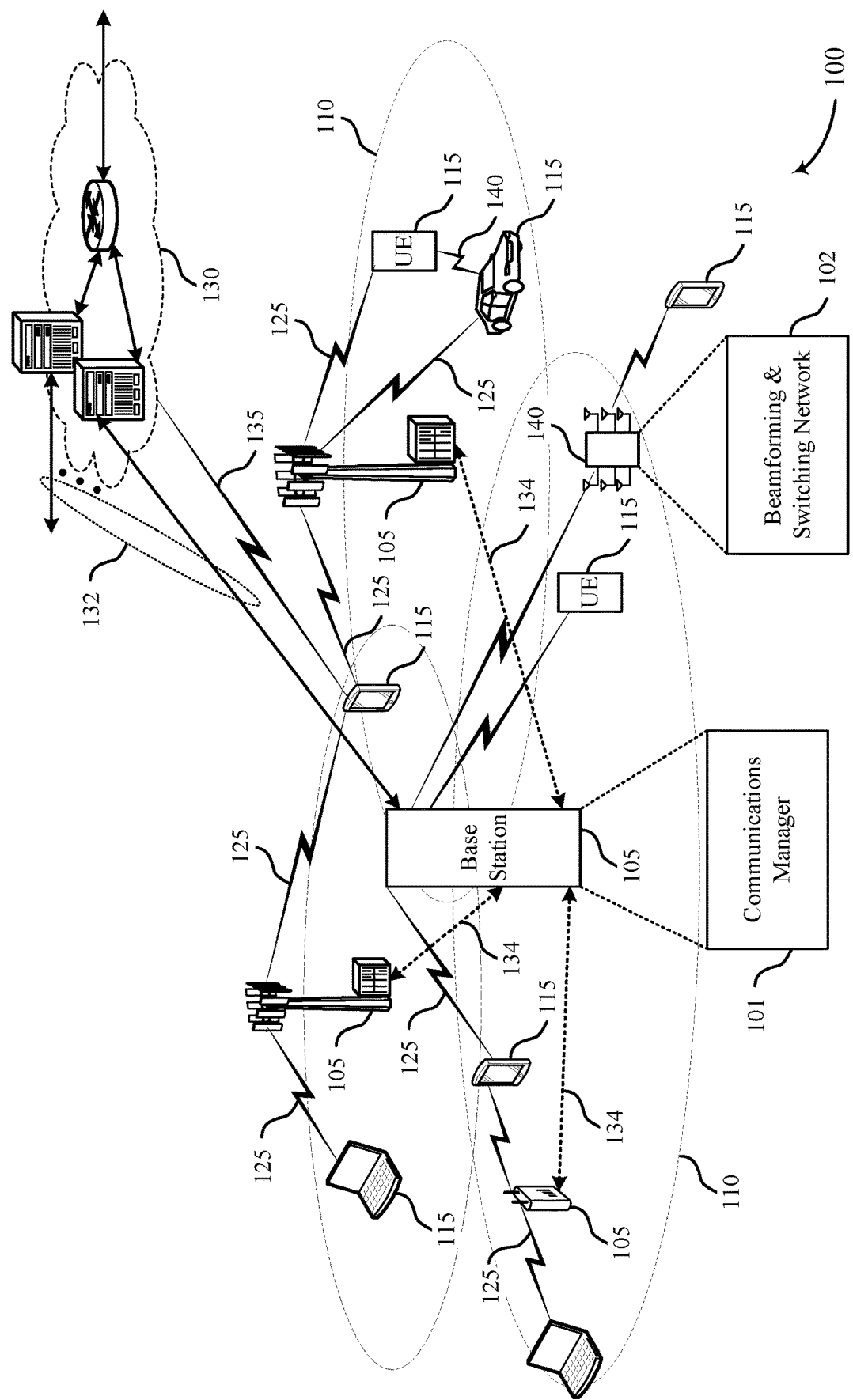
FIG. 1 illustrates an example of a system for wireless communications that includes a radio frequency (RF)-domain beamforming router in accordance with aspects of the present disclosure.

In a wireless communications system, a transmitting device (e.g., a base station, a UE, an access point, a station, etc.) may communicate with a receiving device (e.g., a base station, a UE, an access point, a station, etc.) over a wireless link. In some deployments, wireless communications may experience signal attenuation or interference due to, for example, path-loss through the air, interference from physical blockers, jamming devices in proximity to a wireless node, or other constraints. Various aspects of the present disclosure provide RF-domain wireless routers that may repeat signals, or route signals, from one or more transmitters to one or more receivers. For instance, in a wireless telecommunications system, base stations and UEs may operate in millimeter wave (mmW) frequency ranges, e.g., 28 gigahertz (GHz), 40 GHz, 60 GHz, etc. That is, the electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" or band in documents and articles, despite being different from the extremely high frequency (EHF) band (30 GHz-300 GHz) which is identified by the International Telecommunications Union (ITU) as a "millimeter wave" band. With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

Wireless communications at these frequencies may be associated with increased signal attenuation (e.g., pathloss), which may be influenced by various factors, such as temperature, barometric pressure, diffraction, blockage, etc. As a result, signal processing techniques, such as beamforming, may be used to coherently combine energy and overcome the pathlosses at these frequencies. However, the transmission of a signal (such as a beamformed signal) between the base station and the UE may be blocked or may be interfered with due to a physical barrier or a radio frequency (RF) jammer. In these cases, a repeating device (e.g., a wireless repeater, a mmW repeater, or the like) may be used to repeat or relay, or both, the transmission from the base station to the UE, and vice versa, thereby enabling efficient communication in the presence of RF jammers. For example, one or more integrated circuits (e.g., transceivers, processors, radio-frequency integrated circuit (RFICs), etc.) of the repeating device may implement the RF-domain wireless routing techniques discussed herein to reduce the overall complexity and processing requirements of the repeating device. It is noted that although various examples provided herein are discussed with reference to a wireless telecommunications system operating in mmW frequency ranges, devices and techniques discussed herein may be used in any wireless network that uses beamformed transmissions at any frequencies (e.g., IEEE 802.11-based systems, wireless Ethernet systems, Bluetooth systems, multi-hop-multi-point wireless systems (e.g., gigabit Wi-Fi or Terragraph systems), satellite-based systems, and the like).

RF-domain wireless routers as discussed herein may repeat, extend, or redirect beamformed wireless signals received from one or more transmitters to one or more receivers. For example, the router may receive a signal from a base station and retransmit the signal to a UE, or receive a signal from a UE and retransmit the signal to the base station. In such cases, as discussed herein, a router that can receive signals from multiple sources concurrently or transmit one or more received signals to multiple targets concurrently, may act in a similar manner as a single-source repeater that can receive a single signal and retransmit the single signal. In some cases, routers may perform amplification or interference mitigation, or both, to further enhance the reliability of communications between a UE and a base station (e.g., perform digital filtering or a combination of digital and analog filtering and amplification on a signal to reduce or eliminate interference from physical obstacles, jamming devices, radiation leakage of the router itself, or any combinations thereof). In some cases, the router may receive transmissions at a mmW frequency using a first array of antenna elements, and provide the transmissions to a beamforming network that outputs one or more a signals to a switching network. The switching network may perform switching to provide the one or more signals to desired inputs of an output beamforming network that outputs beamformed transmission beams via a second array of antenna elements.

To support such capabilities, a wireless router may receive one or more transmissions (e.g., from one or more base stations) and may map the transmissions to a set of beamforming directions. For instance, the wireless router may select the set of beamforming directions and may route the one or more transmissions or signals derived from the transmissions along a corresponding set of signal paths. Each signal path may be associated with one set of one or more beamforming directions. Upon performing the mapping, the wireless router may transmit one or more beamformed transmissions along the set of beamforming directions. In some examples, the one or more received transmissions may be routed along the one or more corresponding signal paths that may include a beamforming network that is associated with a Butler matrix, or a switching matrix, and output through a transmit antenna array. When signals from multiple transmitters are concurrently "received" at the wireless router, such a receiving operation may refer to combining signals (e.g., summing signals within an RF switching matrix of the router) from the multiple transmitters before they are retransmitted by the wireless router.

In some cases, wireless routers may be deployed in a network that performs TDD operations, and the wireless router may switch between a downlink configuration (e.g., a configuration for receiving one or more transmissions from one or more base stations and transmitting one or more transmissions to one or more UEs) and an uplink configuration (e.g., a configuration for receiving transmissions from the one or more UEs, and transmitting one or more transmissions to the one or more base stations). In some examples, the wireless router may perform the switch such that the signals associated with the uplink configuration and signals associated with the downlink configuration pass through a same set of signal processing components (e.g., LNAs, PA drivers, PAs, or a combination thereof). In other examples, the wireless router may perform the switch such that signals associated with the first configuration pass through a first set of signal processing components and signals associated with the second configuration pass through a second set of signal processing components. Additionally or alternatively, the wireless routers may be deployed in a network that performs FDD operations, and the wireless router may be configured to perform uplink and downlink operations concurrently (i.e., at least partially overlapping in time).

In some cases, the router may be a phased array router with an array of reception antennas, an array of transmission antennas, one or more beamforming networks, and a switching network. In some cases, the array of reception antennas and the array of transmission antennas are the same set of dual-polarized antennas, which may function in a first polarization as the reception antenna array and a second polarization as the transmission antenna array. The one or more beamforming network and switching network may be implemented as a RFIC (e.g., one or more monolithic microwave integrated circuits (MMICs)) and may include a series of phase shifters for controlling the beam width and direction in the reception antenna array or the transmission antenna array, switches, couplers, combiners, dividers, or combinations thereof. In some cases, one or more components may be located off the RFIC (e.g., as a separate filtering module).

In some cases, one or more control parameters may be provided to a wireless router through a control link between the router and the base station or UE that is separate from signals that are being repeated by the wireless router. Such control parameters may include one or more beamforming parameters for signals that are to be received and retransmitted, information on signal processing (e.g., amplification, filtering, and the like), or combinations thereof. In some cases, signal processing at the wireless router may further include a feedback path for real-time gain control to increase stability within the router, in which the feedback path may detect an output of a PA and adjust a gain to a driver to the PA to improve or maintain signal stability within the RFIC. In some cases, the gain to one or more LNAs of the signal processing chain may be adjusted based on the output of the PA.

Such techniques may provide more reliable and enhanced communications between a UE and a base station. For example, a system having one or more routers operating according to techniques such as described herein may allow for beamformed communications even in the presence of one or more physical blockers (e.g., in non-line-of-sight (NLOS) scenarios such as urban-micro or indoor-hotspot deployments), one or more RF jammers (e.g., adjacent channel, in-band, or out-of-band jammers that may transmit signals that interfere with the beamformed communications between the UE and the base station), or combinations thereof. By boosting the beamformed signals, routers as discussed herein may improve the performance of served UEs in the presence of such jammers, physical blockers, or both. Additionally, the RF-domain beamforming, routing, and repeating as discussed herein may provide for lower cost and lower complexity components within the router. Thus, routers using techniques as discussed herein may provide a secondary low-loss and un-jammed path between a base station and UE.

Aspects of the disclosure are initially described in the context of a wireless communications system. Additional aspects are then described with reference to architectures for beamforming and switching RF-domain routers. Aspects of the disclosure are further illustrated by and described with reference to apparatus diagrams, system diagrams, and flowcharts that relate to RF-domain beamforming routers.

FIG. 1 illustrates an example of a wireless communications system 100 that includes an RF-domain beamforming router in accordance with aspects of the present disclosure. The wireless communications system 100 includes base stations 105, UEs 115, and a core network 130. In some examples, the wireless communications system 100 may be an LTE network, an LTE-A network, an LTE-A Pro network, or a NR network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like. In some examples, base station 105 and UEs 115 may wirelessly communicate via one or more routers 140 (e.g., repeating devices, wireless routers, RF-domain beamforming routers) that may support the retransmission, amplification, filtering, frequency translation, etc. of signaling to one or more other devices, such as a UE 115, base station, etc.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105. In some cases, D2D communications may be routed through one or more routers 140.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130). Backhaul links 132, 134 may be wireline links or wireless links (e.g., in an integrated access and backhaul (IAB) deployment), and in cases where wireless links are used, such backhaul communications may be routed through one or more routers 140.

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, for example, in the range of 300 megahertz (MHz) to 300 GHz. The region from 300 MHz to 3 GHz is sometimes known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super-high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support mmW communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on FDD, TDD, or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying some amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify or determine (e.g., by the base station 105 or a receiving device, such as a UE 115) a beam direction for subsequent transmission or reception by the base station 105, or both.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying or determining a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARM) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105. In some cases, switching may be performed for different subframes, mini-slots, or symbols, to provide uplink communications or downlink communications according to a TDD configuration.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or DFT-S-OFDM).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples, the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

Wireless routers 140 may include functionality to repeat, extend, and redirect wireless signals transmitted within a wireless communications system. In some cases, wireless routers 140 may be used in line of sight (LOS) or NLOS scenarios. In a LOS scenario, directional (e.g., beamformed) transmissions, such as mmW transmissions, may be limited by path-loss through air. In a NLOS scenario, such as in an urban area or indoors, mmW transmissions may be limited by signal blocking or signal interfering physical objects. In either scenario, a wireless router 140 may be used to receive signal from one or more base stations 105 and transmit signals to one or more UEs 115, or receive signals from one or more UEs 115 and transmit signals to one or more base stations 105. Beamforming, filtering, gain control, and phase correction techniques may be utilized by the wireless router 140 to improve signal quality and avoid RF interference with the transmitted signal.

A wireless router 140 may include an array of reception antennas and an array of transmission antennas. In some cases, the wireless router 140 may include digital filtering, and the wireless router 140 may include a signal processing chain connected (e.g., coupled, linked, attached) between the array of reception of antennas and the array of transmission antennas, which may include a beamforming network associated with each antenna array and a switching network coupled between the beamforming networks. The signal processing chain may be implemented as an RFIC, which may include RF/microwave components such as one or more phase shifters, LNAs, PAs, PA drivers, heterodyning mixers, carrier tracking circuits, gain controllers, power detectors, filters, or other circuitry. The phase shifters may be controlled by one or more beam controllers for beamforming to reduce signal interference. In some cases, routers 140 may include a feedback path for monitoring the output of one or more PAs, and adjusting gains to one or more PA drivers to the PAs and gains to one or more LNAs based on the output. The gain adjustment may function to stabilize the signal reception and transmission and improve signal quality between devices such as base station 105 and UE 115. Accordingly, through beamforming, filtering, and gain control, signal quality (e.g., mmW signals) may be improved in LOS and NLOS scenarios.

Further, in some cases the wireless router 140 may include digital circuitry for receiving control information (e.g., for receiving remote configuration of switching within the router 140, beamforming parameters such as gain and direction, local oscillator tracking, or combinations thereof, via sub-6 GHz or via mmW signals). In some cases where the control information is not received via the mmW signals, the control information may be received using a different radio access technology than used between the base station 105 and UE 115. For example, one or more side channels or control channels may be used to provide control information and may be implemented as Bluetooth, ultra-wide band, wireless LAN, etc. protocols, and as such, the router 140 may include circuitry or processors for receiving and processing signals received via those protocols and controlling beamforming and switching at the RF components based on those signals received at the side channel.

One or more of the base stations 105 may include a communications manager 101, which may determine a configuration of a repeating device, the configuration being based on communicating with one or more UEs 115 and transmit, to the repeating device, a signal (e.g., via a side channel) including an indication of the configuration.

Routers 140 may include a beamforming and switching network 102 that supports reception, beamforming, and switching of one or more received signals and one or more transmitted signals. In some cases, routers 140 may receive control information from a base station (e.g., via a side channel) and may set one or more beamforming parameters, switching parameters, or both, based on the received control information. The beamforming and switching network 102 may receive one or more beamformed transmissions associated with the one or more receive beams, feed received signals at each of two or more antenna elements of a first antenna array into corresponding inputs of the first beamforming network, switch one or more outputs of a plurality of outputs of the first beamforming network to be coupled with one or more inputs of a plurality of inputs of a second beamforming network based at least in part on a mapping of the one or more receive beams to one or more transmit beams, and transmit the one or more transmit beams using two or more antenna elements of a second antenna array coupled with corresponding outputs of the second beamforming network.

Figure 2:
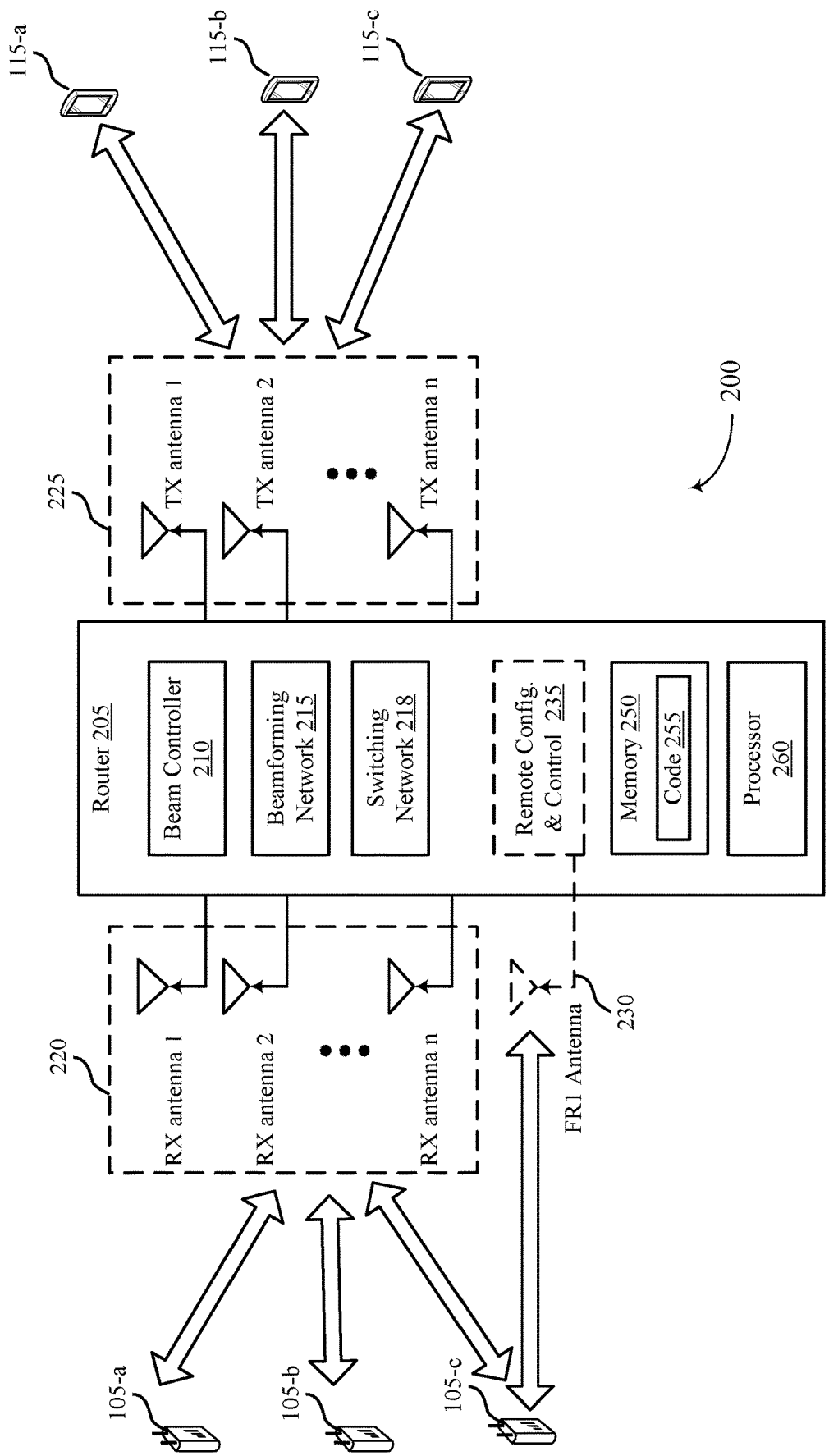
FIG. 2 illustrates an example of a block diagram of a configurable RF-domain beamforming router in a wireless communications system in accordance with aspects of the present disclosure.

FIG. 2 illustrates an example of a block diagram of a configurable RF-domain beamforming router in a wireless communications system 200 in accordance with aspects of the present disclosure. In some examples, wireless communications system 200 may implement aspects of wireless communication system 100, and the router 205 may be an example of the router 140 of FIG. 1. The block diagram includes base stations 105 and UEs 115. The router 205 includes a reception antenna array 220 including a set of antennas, and a transmission antenna array 225 including a set of antennas. In some cases, the reception antenna array 220 and the transmission antenna array 225 are the same antenna arrays including the same set of dual-polarized antennas functioning in first and second polarizations as the reception and the transmission antenna array. In some cases, the reception antenna array 220 or the transmission antenna array 225, or both, may include meta-material antennas.

For example, meta-materials may be any material of tunable electrical permittivity and/or magnetic permeability, and may be manufactured, for example, using nano-fabrication methods. In some cases, one or more components in an RF chain can be designed with meta-materials, including antennas, switches, phase-shifters, wave-guides, couplers, filters/resonators, oscillators, duplexers/circulators, or any combinations thereof. In some cases, the material refractive index may be a function of permittivity and permeability (e.g., based on Snell's law, from Maxwell's equations). Such materials may be designed for negative permittivity and/or permeability, and hence, have a negative refractive index. In some cases, meta-materials may also be referred to as left-handed materials, Epsilon negative (ENG) materials, double-negative materials, negative refractive index, or Chiral materials. Some use cases of meta-materials may include electrically small antennas (smaller than $\lambda/10$) that retain high efficiency and bandwidth, radio-transparent antennas to allow antenna stacking, limit scatter and mutual coupling, phase-shifters implemented by tuning the dielectric of wave-guides, non-magnetic circulators for duplexing, and the like. Such materials may provide a relatively low insertion loss, may be designed for circuits from sub-6 GHz to several terahertz (THz), and exhibit low power consumption. In some cases, meta-materials may be used to provide super-resolution lenses that operate below the diffraction limit.

In this example, three base stations 105 are illustrated, namely first base station 105-a, second base station 105-b, and third base station 105-c. Further, three UEs 115 are illustrated, namely first UE 115-a, second UE 115-b, and third UE 115-c. In some cases, the router 205 may receive signals from one base station 105 (e.g., first base station 105-a) and retransmit the signals to one UE 115 (e.g., first UE 115-a). In other cases, the router 205 may receive signals from one base station 105 (e.g., first base station 105-a) and retransmit the signals to multiple UEs 115 (e.g., first UE 115-*a* and second UE 115-*b*) with each UE 115 having different beamforming parameters. In further cases, the router 205 may receive signals from multiple base stations 105 (e.g., first base station 105-*a* and second base station 105-*b*) and retransmit the signals to multiple UEs 115 (e.g., first UE 115-*a* and second UE 115-*b*). Further, the router 205 may likewise receive signals from one or more of the UEs 115 and retransmit the signal to one or more of the base stations 105.

The router 205 may further include a beam controller 210, a beamforming network 215, and a switching network 218, which may include various circuitry including one or more PAs, LNAs, phase shifters, dividers, mixers, filters, combiners, or any combinations thereof. The router 205 may include various analog/RF domain components that may be implemented as a RFIC (e.g., MMIC). The router 205 may also include memory 250 (which may include computer executable code 255) and a processor 260, which may be used to control one or more of the beamforming network 215 or switching network 218, or both.

Beam controller 210 may control, via beamforming network 215, beam direction and width of the reception antennas at reception antenna array 220, the transmission antennas at transmission antenna array 225. In some cases, the beamforming network 215 may include a first beamforming matrix (e.g., a Butler matrix) associated with the reception antenna array 220 and a second beamforming matrix (e.g., a Butler matrix) associated with the transmission antenna array 225. In some cases, the beam controller 210, using the switching network 218, may route signals between the first beamforming matrix and the second beamforming matrix. In some cases, the adjustments associated with the antenna elements may be defined by a set of beamforming parameters (e.g., a beamforming weight set) that are used at the antenna arrays 220 and 225. For example, the beam controller 210 may use a first set of beamforming parameters for receiving signals at reception antenna array 220, and a second set of beamforming parameters for transmitting signals at transmission antenna array 225.

In some cases, beamforming parameters for the beamforming network 215, and switching information to provide routing using the switching network 218, may be controlled by the third base station 105-*c* (or any other of the base stations 105, other base stations of a same or different RAT, or other wireline or wireless control device) via a side control channel. In this example, the beam controller 210 may receive control information from optional remote configuration and control component 235, which may communicate with base station 105 using non-beamformed communications and a lower frequency antenna 230 (e.g., via a NB-IoT connection using a sub-6 GHz frequency referred to as frequency range 1 (FR1)). Additionally or alternatively, control information may be provided by base station 105 via a side channel implemented as a Bluetooth channel, ultra-wide band channel, wireless LAN channel, etc. Accordingly, the router 205 may include circuitry (e.g., remote control component 235, memory 250, processor 260) for receiving and processing side channel communications to control the beam controller 210. The base station 105 may transmit beamforming control configurations based on operating environment, position of the base stations 105, the UEs 115, configuration of the UE 115, any detected jammers, or any combinations thereof.

While various examples discussed herein describe that a router 205 may receive signals from the base station 105 according to a beamforming configuration and retransmit the signals to the UE 115 according to a beamforming configuration. The router 205 may further receive signals from the UE 115 according to a beamforming configuration and retransmit the signals to the base station 105 according to a beamforming configuration. As such, the router 205 may function to implement uplink and downlink communications, and may be utilized for communication in uplink or downlink scenarios.

Thus, router 205 may provide a flexible selection for retransmitting one or more signals from one or more transmitters to one or more receivers. For example, router 205 may retransmit one out of M base stations 105 (or any other type of wireless transmitters) to connect to one out of N stations. In other examples, in a more flexible configuration, router 205 may connects up to M base stations 105 to up to N UEs 115 concurrently. In some cases, communications may be retransmitted concurrently and bidirectionally, such as via time-domain switching paths. In some cases, router 205 may connect up to M base stations 105 to up to N UEs 115 concurrently and in full-duplex mode (e.g., in a single-frequency full-duplex (SFFD) or simultaneous transmit and receive (STAR) configuration). Such flexible configurations provided by a RF-domain device such as router 205 may provide flexible and economical options for a network operator to extend and enhance communications in a network based on the particular needs of a particular deployment.

As indicated herein, in some cases the optional remote configuration and control component 235 may receive control and configuration for the router 205. In some cases, the remote configuration and control component 235 use a wireless connection via FR1 antenna 230. In other cases, remote configuration and control component 235 may represent a physical connection or port to an external device. In some cases, the remote configuration and control component 235 may utilize an operating system such as iOS®, ANDROID®, MS-DOS®, MS-WINDOWS®, OS/2®, UNIX®, LINUX®, or another known operating system. In other cases, the remote configuration and control component 235 may represent or interact with a modem, a keyboard, a mouse, a touchscreen, or a similar device. In some cases, the remote configuration and control component 235 may be implemented as part of a processor.

The memory 250 may include RAM and ROM. The memory 250 may store computer-readable, computer-executable code 255 including instructions that, when executed, cause the processor to perform various functions described herein. In some cases, the memory 250 may contain, among other things, a BIOS which may control basic hardware or software operation such as the interaction with peripheral components or devices.

The processor 260 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 260 may be configured to operate a memory array using a memory controller. In other cases, a memory controller may be integrated into the processor 260. The processor 260 may be configured to execute computer-readable instructions stored in a memory (e.g., the memory 250) to cause the router 205 to perform various functions (e.g., functions or tasks supporting RF-domain beamforming).

The code 255 may include instructions to implement aspects of the present disclosure, including instructions to support wireless communications. The code 255 may be stored in a non-transitory computer-readable medium such as system memory or other type of memory. In some cases, the code 255 may not be directly executable by the processor 260 but may cause a computer (e.g., when compiled and executed) to perform functions described herein.

Figure 3:
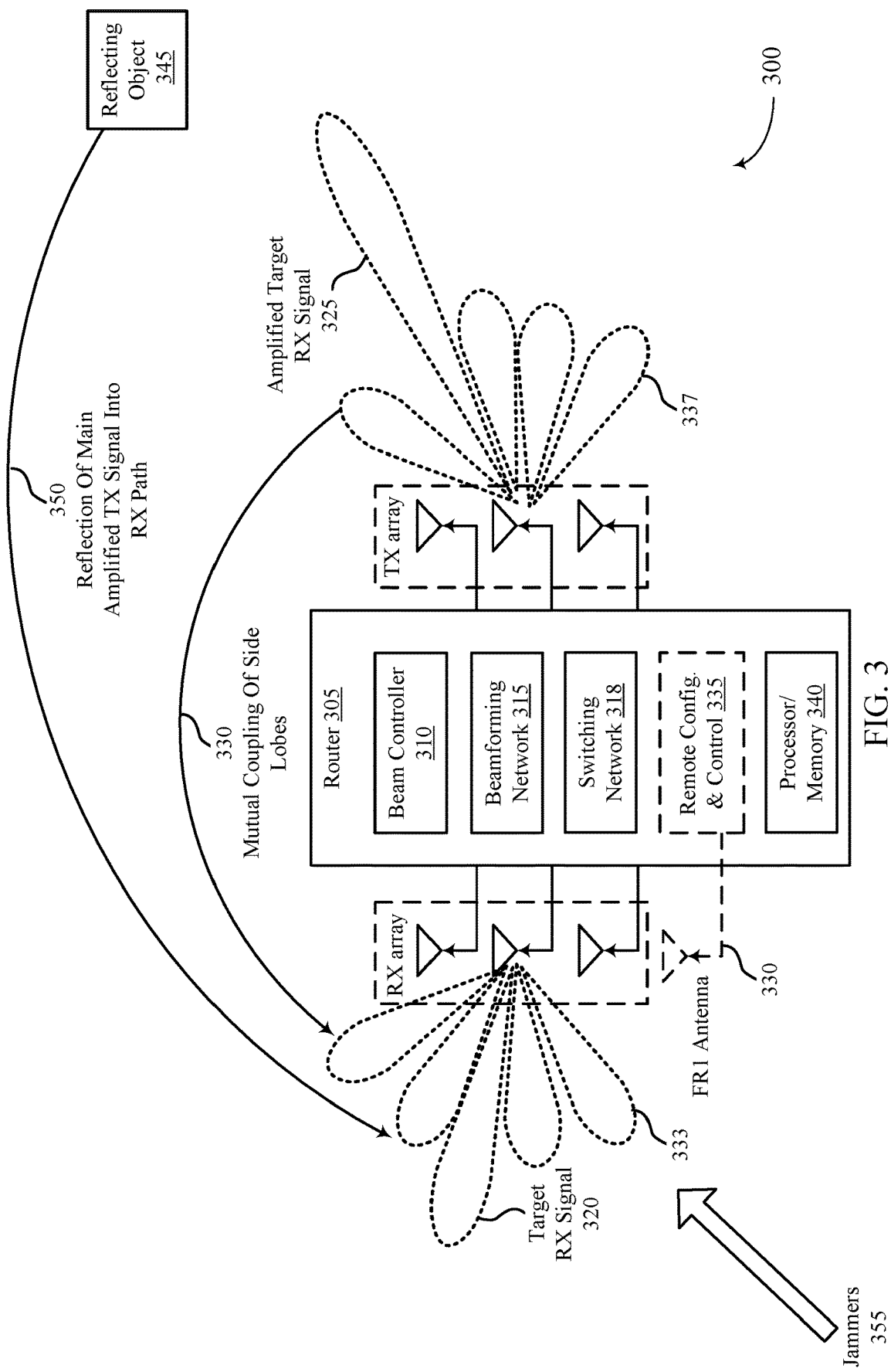
FIG. 3 illustrates an example of a RF-domain beamforming router in accordance with aspects of the present disclosure.

FIG. 3 illustrates another example of a RF-domain beamforming router 300 in accordance with aspects of the present disclosure. In some examples, RF-domain beamforming router 300 may implement aspects of wireless communication system 100 or 200. A router 305 may include a reception antenna array and transmission antenna array as described with respect to FIG. 2. The router 305 may be an example of a router 140 or 205 discussed with respect to FIG. 1 or 2. The router 305 may beamform the received signal via various beam directions (or scan angles). Lobes (e.g., lobes 320 and 333) illustrate the effective spatial shape of the received signal power after beamforming within the router 305. The lobe 320 (e.g., main lobe) may be directed to a target reception signal, which may be transmitted by a UE 115 or a base station 105. The target reception signal may correspond to the signal to be retransmitted to another device such as a UE 115 or base station 105. Lobes (e.g., lobes 325 and 337) illustrate the effective spatial shape of a transmitted signal power after beamforming within the router. While a single target reception signal and transmitted signal is illustrated in this example, in other cases the router 305 may transmit one or more signals and receive one or more signals.

The beam controller 310 may adjust the beam configuration such that the reception antenna array receives a higher quality target signal. In some cases, a jamming device may transmit a jamming signal 355 that may cause interference with a received signal at router 305, which may be mitigated through control of beamforming directions, filtering, and the like. In some cases, beamforming parameters and routing of signals between the reception antenna array and transmission antenna array may be managed by beam controller 310, beamforming network 315, and switching network 318, similarly as discussed with reference to FIG. 2. Further, in this example, optional remote configuration and control component 335 may be coupled with a FR1 antenna 330 and may provide control and configuration information, and processor and memory components 340 may provide processing and memory functions similarly as discussed with reference to FIG. 2. Various examples of components of router 305 (and router 205 of FIG. 2) and operations of the router 305 are discussed in examples of FIGS. 4 through 15. It should be understood that circuitry of router 305 may be configured in layouts not specifically illustrated in FIGS. 4 through 15.

Arrow 330 illustrates possible signal reception and retransmission interference via mutual coupling (e.g., signal leakage) of side lobes of the respective beam configurations of the reception antenna array and the transmission antenna array. In some cases, the beam controller 310 may adjust beam width, direction, or both to avoid the mutual coupling. Furthermore, in some cases one or more of the beamforming network 315 or switching network 318 may implement gain control techniques to improve stability and reduce interference in the router 305. Arrow 350 illustrates reflection of an amplified signal (e.g., lobe 325) from a reflecting object 345 and to the signal reception beam configuration, which may cause signal interference or leakage. The beam controller 310 may adjust beam width, direction, or both to avoid interference via reflection.

In some cases, the beamforming network 315, switching network 318, or combinations thereof may be implemented as a RFIC. In some case, meta-material antennas may be used in the circuitry illustrated with respect to FIGS. 4-15. In some cases, when the meta-material antennas are utilized, the circuitry may omit phase shifters or feedback paths, or both. In some cases, when meta-material antennas are utilized, a reduced spacing (e.g., less than λ/2) between antenna elements may be enabled. In some cases, routing of signals via the switching network 318 may be performed by RF switch matrices, which may include SPST switches, single-pole-N-throw (SPNT) switches, DPDT switches, or any combinations thereof. In some cases, the switches may include RF-MEMS devices, PIN diodes, MESFET's or other HEMT devices, or any combinations thereof. Further, beamforming network 315 may include one or more couplers or dividers (e.g., Wilkinson couplers/dividers), which may aggregate signals or divide signals among multiple signal paths.

Routers as described in various aspects of the present disclosure may be used in any number of different applications. For example, such a router may be used for interconnecting base stations (e.g., gNB's), mobile UE's, integrated access and backhaul (IAB) nodes, small cells and back-haul links in a wireless telecommunications system (e.g., in a 5G-NR system). Such routers may also be used in other deployments, such as for ad-hoc cellular vehicle-to-everything (C-V2X) multi-cast transmissions (e.g., connecting base stations, pedestrians, vehicles, and RSUs (road-side units)), multi-hop multi-point radio systems using 60 GHz unlicensed spectrum that may be used for street-level deployments (e.g., Terragraph systems), drone router applications (e.g., connecting multiple base stations to multiple UE in remote areas where fixed-link backhaul is infeasible), applications that connect satellites and earth-stations (e.g., for low-earth-orbit satellites that require agile beam-scanning and beam-switching), communications for multi-person augmented reality (AR) or virtual reality (VR) gamestations and headsets, communications on Ethernet or WiFi networks, to name but a few examples.

Figure 4:
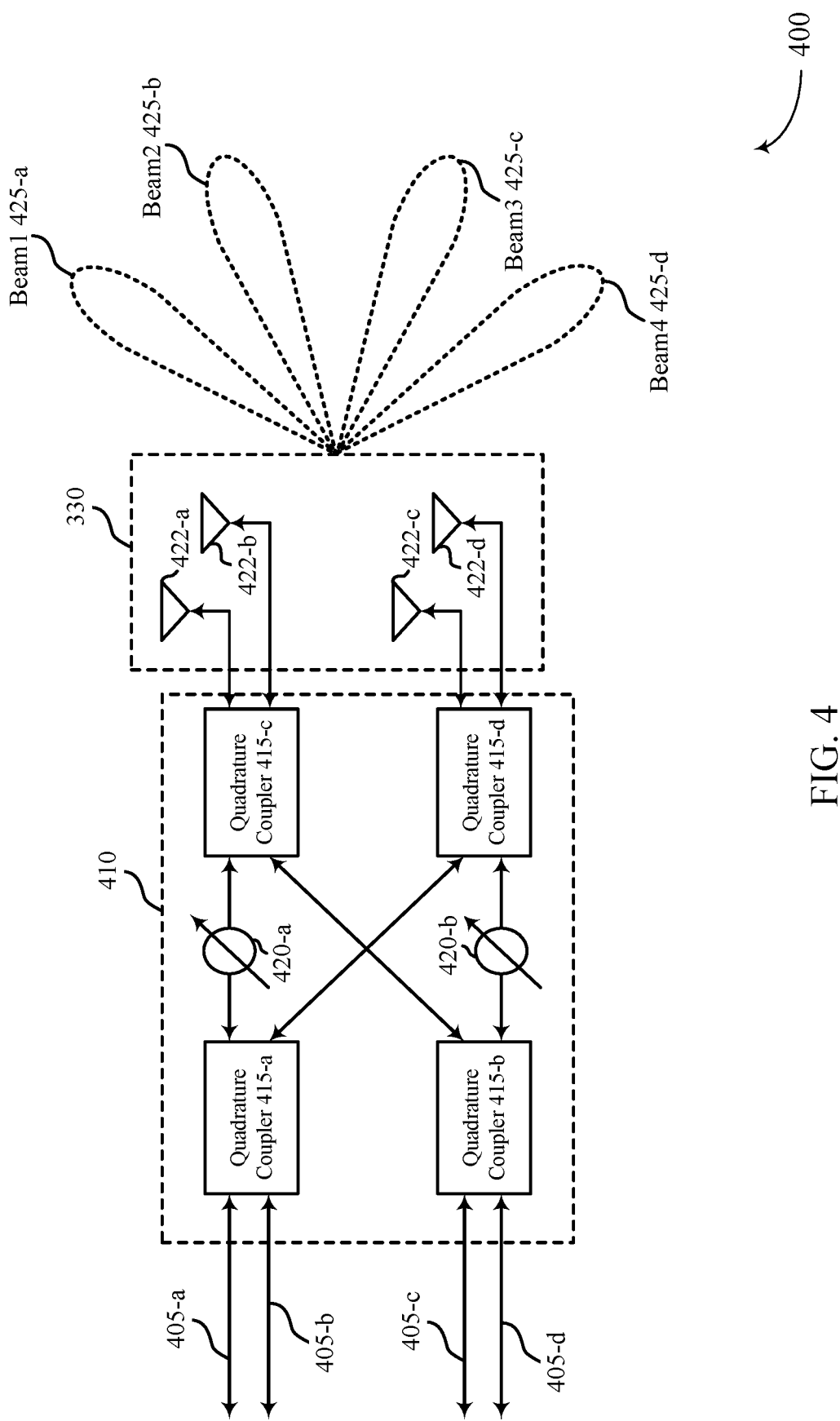
FIG. 4 illustrates an example of a Butler matrix architecture that supports RF-domain beamforming techniques in accordance with aspects of the present disclosure.

FIG. 4 illustrates an example of a Butler matrix architecture 400 that supports RF-domain beamforming techniques in accordance with aspects of the present disclosure. In some examples, Butler matrix architecture 400 may be implemented in RF-domain beamforming routers as discussed herein. For instance, the Butler matrix architecture 400 may include a Butler matrix network 410, which may be included in a beamforming network 215 or 315 as described with reference to FIGS. 2 and 3. In some cases, beamforming networks 215 or 315 may include two (or more) Butler matrix networks 410 (e.g., each associated with a receive antenna array and a transmit antenna array). Additionally, antenna array 330 may be an example of a transmit antenna array or receive antenna array as discussed herein. Signal paths 405-$a$, 405-$b$, 405-$c$, and 405-$d$ may correspond to beams 425-$a$, 425-$b$, 425-$c$, and 425-$d$, respectively. The Butler matrix network 410 may perform a spatial fast Fourier transform (FFT) in one direction (e.g., from left to right) and may perform a spatial inverse FFT (IFFT) in other direction.

The Butler matrix network 410 may be composed of quadrature couplers 415, which may also be referred to as branch-line couplers, and phase shifters 420. At high frequencies (such as SHF, EHF, or mmW wave band and beyond, or any combination thereof), it is understood that signal paths 405—as well as other signal paths connecting quadrature couplers 415, phase shifters 420, and antenna elements 422—can include transmission lines or waveguides, or both. In some cases, a butler matrix network 410 may be divided into a number of stages equal to $\log_2(N)$, where N may be a number of inputs into the Butler matrix network 410. Each stage may have N/2 quadrature couplers 415. Additionally, each stage, except for the last stage, may have N/2 phase shifters 420. As such, each Butler matrix network 410 may have N/2 $\log_2(N)$ quadrature couplers 415 and N/2 ($\log_2(N)-1$) phase shifters 420. In general, N may equal $2^j$, where j is a positive integer. In the present example, j may equal 2 and N may equal 4. As such, the present example may contain 2 stages. The first stage (i.e., stage 0) may contain 2 quadrature couplers 415 (e.g., quadrature couplers 415-a and 415-b) and 2 phase shifters 420 (e.g., phase shifters 420-a and 420-b), and the second stage (i.e., stage 1) may contain 2 quadrature couplers 415 (e.g., quadrature couplers 415-c and 415-d). Quadrature couplers 415 in each stage may be associated with a level. For instance, quadrature couplers 415-a and 415-c may be associated with a first level and quadrature couplers 415-b and 415-d may be associated with a second level. In general, there may be N/2 levels per stage.

Additionally, each quadrature coupler 415 may have two inputs and two outputs. In some cases, the two inputs may become two outputs and vice-versa based on a direction of signals. For instance, if signals are entering from signal path 405, the two left terminals of a quadrature coupler 415 may be input terminals and the two right terminals may be output terminals of the quadrature coupler 415. If signals are entering from antenna elements 422, however, the right terminals of a quadrature coupler may be input terminals and the two left terminals may be output terminals. In some cases, signals that enter a phase shifter 420 or quadrature coupler 415 from one side may have their phase shifted by an amount opposite to if the signals entered the phase shifter 420 or quadrature coupler 415 at the other side. For instance, if signals are shifted by 45 degrees or 90 degrees when entering from one side, the signals may be shifted by −45 degrees or −90 degrees when entering from the other side.

With the exception of the first stage, one input into the quadrature coupler 415 may come from the same level and the other may come from a different level (e.g., one input of quadrature coupler 415-c may come from quadrature coupler 415-a and the other may come from quadrature coupler 415-b). The input that comes from the same level may have passed through a phase shifter 420. In general, the input from the different level may come from a level that is $2^{i-1}$ levels away where i may equal a stage of the quadrature coupler 415. For instance, quadrature coupler 415-c, which may be in stage 1 when viewed from left to right, may have an input that comes from $2^0=1$ level away (e.g., from quadrature coupler 415-b). Alternatively, quadrature coupler 415-a, which may be in stage 1 when viewed from right to left, may have an input that comes from $2^0=1$ level away (e.g., from quadrature coupler 415-d).

Additionally or alternatively, with the exception of the last stage, one output into the quadrature coupler 415 may go to the same level and one may go to a different level (e.g., one output of quadrature coupler 415-a may go to quadrature coupler 415-b and the other may go to quadrature coupler 415-b. The output that goes to the same level may pass through a phase shifter. In general, the output to the different level may go to a level that is $2^i$ levels away from the quadrature coupler 415. For instance, quadrature coupler 415-a, which may be in stage 0 when viewed from left to right, may have an output that goes $2^0=1$ level away (e.g., to quadrature coupler 415-d). Alternatively, quadrature coupler 415-c, which may be in stage 0 when viewed from right to left, may have an output that goes $2^0=1$ level away (e.g., to quadrature coupler 415-b).

In the example of a 4×4 Butler matrix network 410 of FIG. 4, each quadrature coupler 415 may receive two input signals at the two inputs and may output the difference of the input signals at both outputs. In some cases, one of the outputs may be 90 degrees out of phase with the signal formed by the difference of the input signals. For instance, a first output signal at the first output may be directly in phase with a signal formed by the difference of the input signals and a second output signal may be 90 degrees out of phase with a signal formed by the difference of the input signals. The first output may be the coupled with a phase shifter 420 and a quadrature coupler 415 on the same level and the second output may be coupled with a quadrature coupler 415 on a different level. Alternatively, both outputs of each quadrature coupler 415 may be coupled to signal paths 405 (e.g., if the quadrature coupler 415 is in at a most internal stage) or coupled with antenna elements 422 of antenna array 330 (e.g., if the quadrature coupler 415 is at a most external stage). In one example, a first output of quadrature coupler 415-a may be coupled to signal path 405-a and a second output of quadrature coupler 415-a may be coupled to signal path 405-b. In another example, a first output of quadrature coupler 415-c may be coupled with antenna element 422-a and a second output of quadrature coupler 415-c may be coupled with antenna element 422-b.

In one example, a first signal may enter quadrature coupler 415-a via signal path 405-a, a second signal may enter quadrature coupler 415-a via signal path 405-b, and a third signal may enter quadrature coupler 415-b via signal path 405-c. Quadrature coupler 415-a may output a first output signal that is an in-phase difference of the first and second signals at a first output terminal and may pass the first output signal to a phase shifter 420-a. The phase shifter 420-a may shift the phase of the first output signal by a predetermined amount (e.g., 45 degrees) and may pass the resulting phase-shifted first output signal to quadrature coupler 415-c. Additionally, quadrature coupler 415-a may output a second output signal that is a difference of the first and second signals 90 degrees out of phase and may pass the second output signal to quadrature coupler 415-d. Meanwhile, quadrature coupler 415-b may output a third output signal that is an in-phase version of the third signal and may pass the third output signal to phase shifter 420-b. The phase shifter 420-b may shift the phase of the third output signal by a predetermined amount (e.g., 45 degrees) and may pass the resulting phase-shifted third output signal to quadrature coupler 415-d. Additionally, quadrature coupler 415-a may output a fourth output signal that is a version of the third signal 90 degrees out of phase and may pass the fourth output signal to quadrature coupler 415-c. In some cases, the first output signal may be passed to quadrature coupler 415-d and the second output signal may be passed to phase shifter 420-a. Additionally or alternatively, the third output signal may be passed to quadrature coupler 415-a and the fourth output signal may be passed to phase shifter 420-b.

Quadrature coupler 415-c may output an in-phase difference of the phase-shifted first output signal and the third output signal to antenna element 422-a. Additionally, quadrature coupler 415-c may output a difference of the phase-shifted first output signal and the third output signal that is 90 degrees out of phase to antenna element 422-b. Quadrature coupler 415-d, meanwhile, may output an in-phase difference of the second output signal and the phase-shifted version fourth output signal to antenna element 422-c. Additionally, quadrature coupler 415-d may output a difference of the second output signal and the phase-shifted fourth output signal that is 90 degrees out of phase to antenna element 422-d. As quadrature coupler 415-c and 415-d output their corresponding signals, the first signal may be transmitted along beam 425-a, the second signal may be transmitted along beam 425-b, and the third signal may be transmitted along beam 425-c.

In another example, antenna array 330 may receive transmissions along beams 425-a, 425-b, and 425-c. Antenna elements 422-a and 422-b may pass first and second signals, respectively, to quadrature coupler 415-c. Antenna elements 422-c and 422-d may pass third and fourth signals, respectively, to quadrature coupler 415-d. Quadrature coupler 415-c may output a first output signal that is an in-phase difference of the first and second signals and may pass the first output signal to phase shifter 420-a. Phase shifter 420-a may shift the phase of the first output signal by a predetermined amount (e.g., 45 degrees) and may pass the phase-shifted first output signal to quadrature coupler 415-a. Additionally, quadrature coupler 415-c may output a second output signal that is difference of the first and second signals out of phase by 90 degrees and may pass the second output signal to quadrature coupler 415-b. Quadrature coupler 415-d may output a third output signal that is an in-phase difference of the third and fourth signals and may pass the third output signal to phase shifter 420-b. Phase shifter 420-b may shift the phase of the third output signal by 45 degrees and may pass the phase-shifted third signal to quadrature coupler 415-b. In some cases, the first output signal may be passed to quadrature coupler 415-b and the second output signal may be passed to phase shifter 420-a. Additionally or alternatively, the third output signal may be passed to quadrature coupler 415-a and the fourth output signal may be passed to phase shifter 420-b.

Quadrature coupler 415-a may output an in-phase difference of the phase-shifted first output signal and the third output signal to signal path 405-a. The outputted signal along signal path 405-a may be an approximation of the signal received from beam 425-a. Additionally, quadrature coupler 415-a may output a difference of the phase-shifted first output signal and the third output signal that is 90 degrees out of phase to signal path 405-b. The outputted signal along signal path 405-b may be an approximation of the signal received from beam 425-b. Quadrature coupler 415-b, meanwhile, may output an in-phase difference of the second output signal and the phase-shifted version fourth output signal to signal path 405-c. The outputted signal along signal path 405-c may be an approximation of the signal received from beam 425-c.

Figure 5:
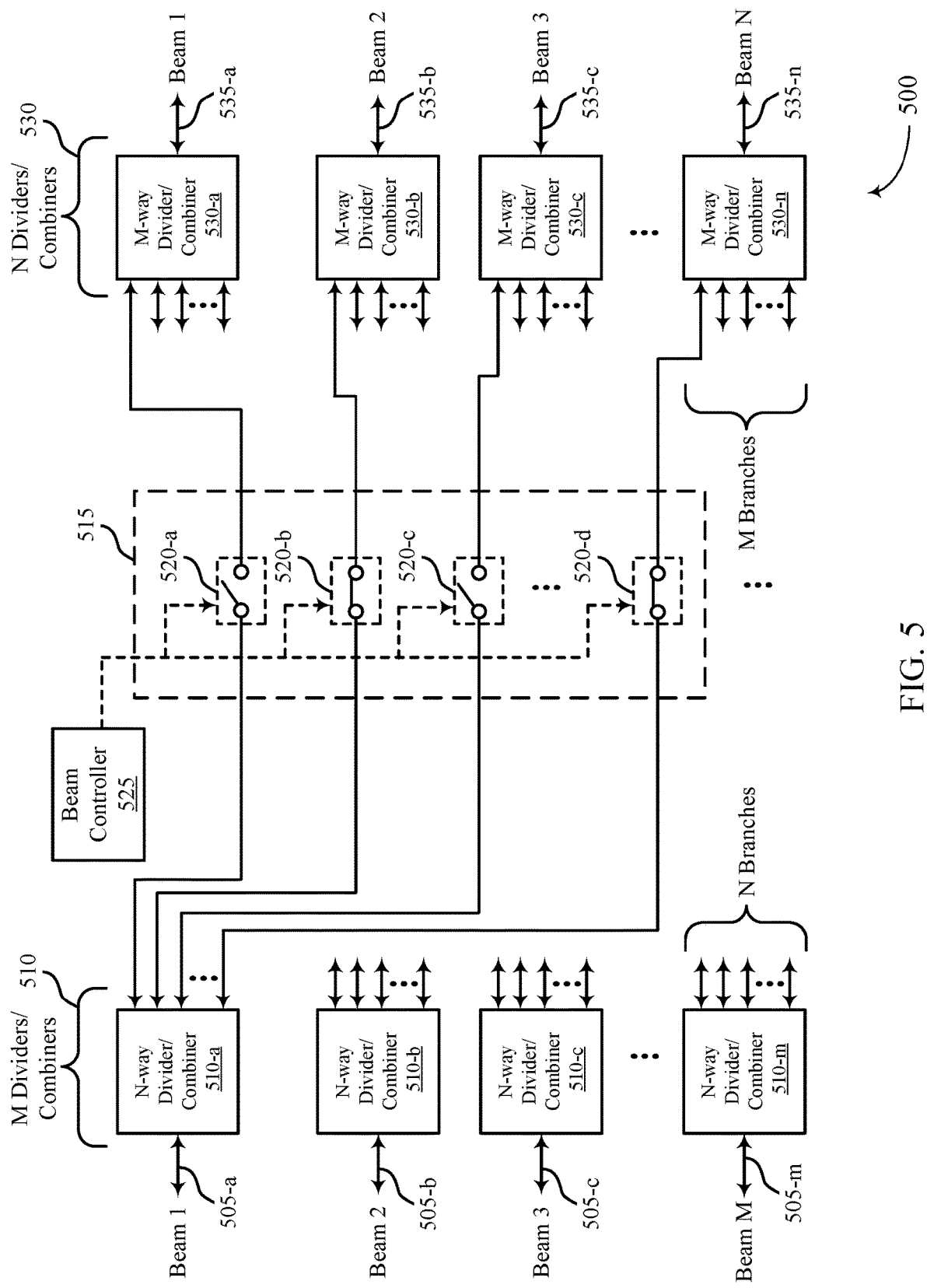
FIG. 5 illustrates an example of a M×N bidirectional RF switching matrix architecture that supports RF-domain beamforming techniques in accordance with aspects of the present disclosure.

FIG. 5 illustrates an example of a M×N bidirectional RF switching matrix architecture 500 that supports RF-domain beamforming router in accordance with aspects of the present disclosure. In some examples, M×N bidirectional RF switching matrix architecture 500 may implement aspects of RF-domain beamforming routers as discussed with reference to FIGS. 1 through 4. For example, the M×N bidirectional RF switching matrix architecture 500 may be incorporated as a switching network in one or more beamforming routers as discussed herein.

In FIG. 5, the M×N bidirectional RF switching matrix architecture 500 may receive a number of inputs associated with a number of receive beams 505, that may be output from the M×N bidirectional RF switching matrix architecture 500 in a number of outputs associated with a number of transmit beams 535. In this example, one or more, up to M, receive beams 505-a through 505-m may be received, and one or more, up to N, transmit beams 535-a through 535-n may be output. Each input receive beam 505 may be provided to an input divider/combiner circuit 510 (e.g., a N-way Wilkinson divider/combiner circuit) that divides the signal of the associated receive beam 505 into N branches. As the illustrated architecture is bidirectional, each input divider/combiner circuit 510 may also work in reverse to receive signals into the N branches and combine the such inputs into the associated beam 505. The N outputs of each input divider/combiner circuit 510 may then be provided to a switch array 515 that includes bidirectional SPST switches 520 that are coupled with each respective output of a particular input divider/combiner circuit 510. Each SPST switch 520 may route a corresponding signal to an output divider/combiner circuit 530 (e.g., a M-way Wilkinson divider/combiner circuit) to be combined with up to M−1 signals from other input divider/combiner circuits 510. Each output divider/combiner circuit 530 may combine or aggregate signals from the M branches and output an associated transmit beam 535. In this example, beam controller 525 may control each SPST switch 520 to be a closed or open path between the input divider/combiner circuit 510 and the corresponding output divider/combiner circuit 530.

For example, a first receive beam (beam 1) 505-a may be received at a first input divider/combiner circuit 510-a. The first input divider/combiner circuit 510-a may divide the first input signal of the first receive beam 505-a into N branches, and route the N outputs to N switches 520-a through 520-d of the switch array 515. Based on the state of the switches 520, as controlled by beam controller 525, the output from divider/combiner circuits 510 may be routed to one or more of the N output divider/combiner circuits 530. Each output divider/combiner circuit 530 may aggregate received signals, corresponding to beams 1 through M, and output the aggregated signal for transmission as a corresponding output beam 535. In some cases, the input beams 505 may be received from corresponding outputs of a first Butler matrix that performs beamforming processing on signals at a receive antenna array to generate the M input beams 505. The switch array 515 may be controlled to route particular received beams 505 to a same or one or more different output beams 535. For example, first input beam 505-a may be routed to a second output beam (Beam 2) 535-b, which may have the same or different beamforming parameters as the first input beam 505-a. The output beams 535 may be provided to a second Butler matrix that performs beamforming processing in signals at a transmit antenna array to generate N beamformed signals that correspond to the N output beams 535. In such a manner, up to M input beams 505 may be selected to be repeated on up to N output beams 535. In some cases, N and M may be equal, with each input beam 505 mapped to a corresponding signal output beam 535. In other cases, M may be less than N, and one or more of the input beams 505 may be multicast over two or more output beams 535. Further, as indicated herein, the switching matrix architecture 500 is bidirectional, and thus may also work in reverse, in which case N may be the same as M, or N may be less than M with one or more of the beams from the right-hand side of the architecture being multicast over two or more beams on the left-hand side.

Figure 6:
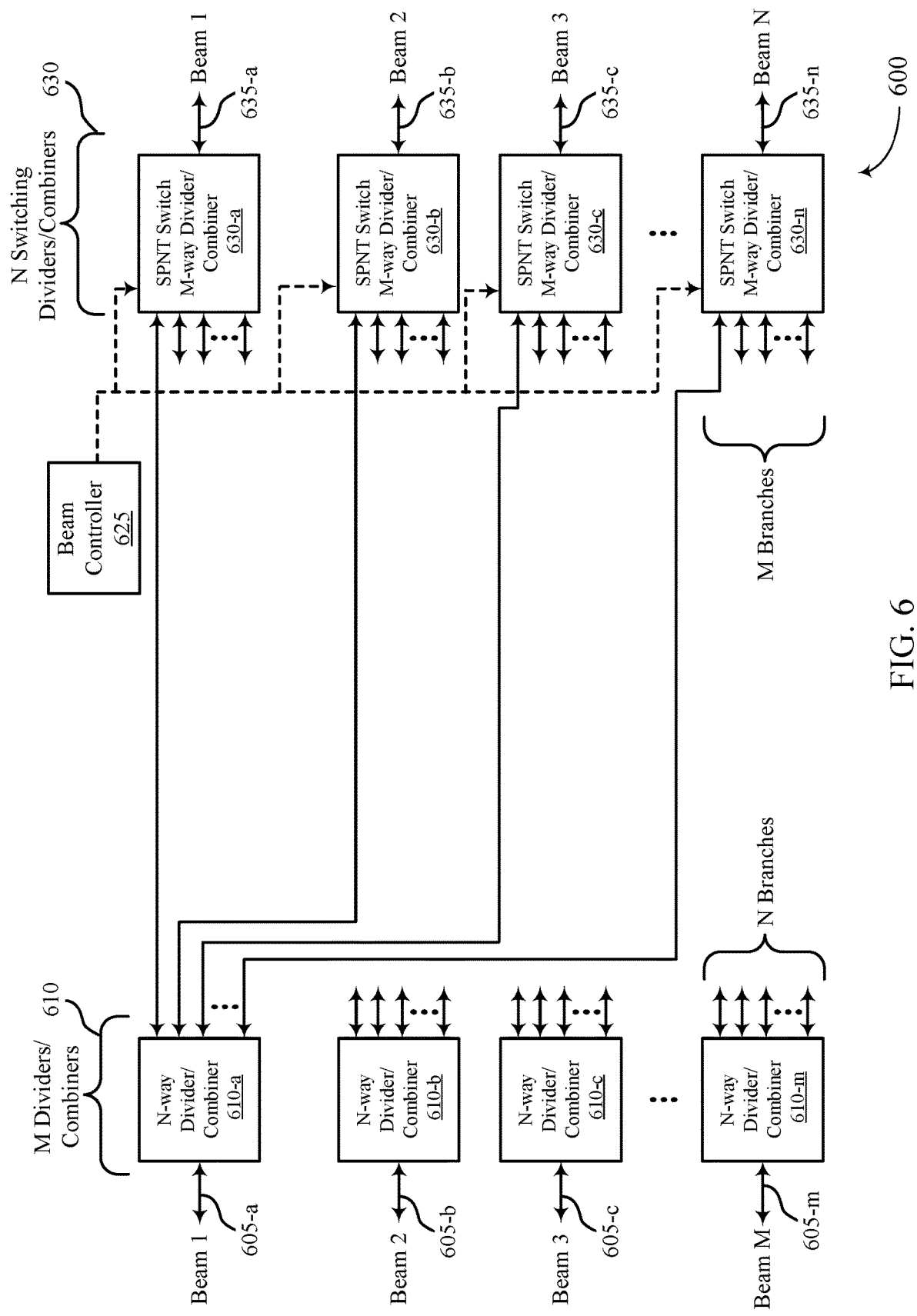
FIG. 6 illustrates another example of a M×N bidirectional RF switching matrix architecture that supports RF-domain beamforming techniques in accordance with aspects of the present disclosure.

FIG. 6 illustrates an example of a M×N bidirectional RF switching matrix architecture 600 that supports RF-domain beamforming router in accordance with aspects of the present disclosure. In some examples, M×N bidirectional RF switching matrix architecture 600 may implement aspects of RF-domain beamforming routers as discussed with reference to FIGS. 1 through 4. For example, the M×N bidirectional RF switching matrix architecture 600 may be incorporated as a switching network in one or more beamforming routers as discussed herein.

In this example, the M×N bidirectional RF switching matrix architecture 600 may operate in a similar manner as the M×N bidirectional RF switching matrix architecture 500 of FIG. 5, where the switches 520 of switch array 515 are integrated with the output divider/combiner circuits 530. Thus, in this example, N switching divider/combiner circuits 630 may receive the divided outputs of the M input divider/combiner circuits 610, where each output (from the N branches) is passed through to the aggregation component or not based on the state of a single-pole-multi-throw (SPNT) switch as controlled by beam controller 625.

Based on the state of the SPNT switches, as controlled by beam controller 625, the outputs of the input divider/combiner circuits 610 may be routed to one or more of the N output switching divider/combiner circuits 630. Each output switching divider/combiner circuit 630 may aggregate received signals, corresponding to beams 1 through M, and output the aggregated signal for transmission as a corresponding output beam 635. In some cases, the input beams 605 may be received from corresponding outputs of a first Butler matrix that performs beamforming processing on signals at a receive antenna array to generate the M input beams 605. The switches on the output switching divider/combiner circuits 630 may be controlled to route particular received beams 605 to a same or one or more different output beams 635, similarly as discussed with respect to FIG. 5, that may be provided to a second Butler matrix that performs beamforming processing in signals at a transmit antenna array to generate N beamformed signals that correspond to the N output beams 635.

Figure 7:
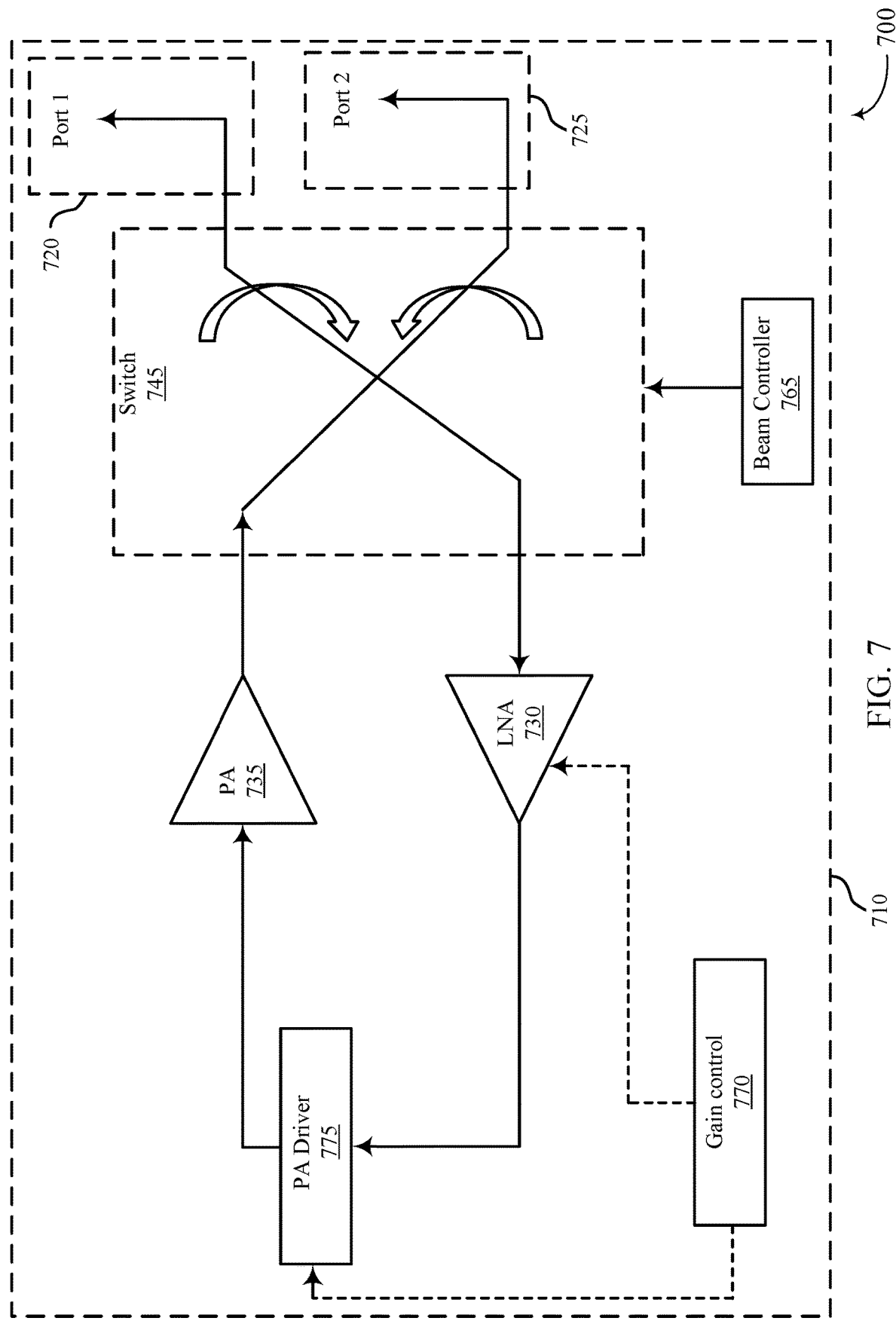
FIG. 7 illustrates an example of a bidirectional RF path with unidirectional amplifiers that supports RF-domain beamforming techniques in accordance with aspects of the present disclosure.

FIG. 7 illustrates an example of a bidirectional RF path with unidirectional amplifiers 700 that supports RF-domain beamforming techniques in accordance with aspects of the present disclosure. In some examples, bidirectional RF path with unidirectional amplifiers 700 may implement aspects of a switching network discussed herein. In FIG. 7, a bidirectional router 710 may include a first antenna 720 (e.g., an antenna array with a first set of antennas) and a second antenna 725 (e.g., an antenna array with a second set of antennas). Both the first antenna 720 and the second antenna 725 may transmit or receive signals to and from a base station and a UE, as discussed herein. The first and second antennas may be coupled to a DPDT switch 745. The DPDT switch 745 may switch two devices at approximately the same time for transmitting and receiving and may be capable of switching in the approximate range of thousands of times per second. The DPDT switch 745 may be a metamaterial switch which may be engineered from man-made materials. Further, the DPDT switch 745 may have low insertion loss as the DPDT switch 745 may have a relatively small or no impact to degrade the performance of the bidirectional router 710.

As depicted in FIG. 7, the DPDT switch 745 may be coupled to a power amplifier 735 and a low noise amplifier 730. In some examples, the first antenna 720 may be coupled with the output of the power amplifier 735. In other examples, such as when the DPDT switch 745 is in the state as illustrated in FIG. 7, the first antenna 720 may be coupled with the output of the low noise amplifier 730. Similarly, the second antenna 725 may be coupled with the output of either one of the power amplifier 735 or the low noise amplifier 730, depending upon the state of the DPDT switch 745. The DPDT switch 745 may be controlled by a beam controller 765, which may be an example of a beam controller as discussed with reference to FIGS. 2, 3, 5-6, and 8-18. In FIG. 7, the beam controller 765 and the gain control 770 may be included as part of a SoC component that may establish and maintain a control link (e.g., an NB-IoT link) as discussed with respect to FIGS. 2 and 3. The gain control 770 in some cases may be part of beam controller 765, and may be used to control the gain of the low noise amplifier 730 and the power amplifier driver 775 where the power amplifier driver 775 may drive the power amplifier 735. The low noise amplifier 730 and the power amplifier 735 may be used to amplify the input signals or the output signals, or both, which may be received or transmitted at the first antenna 720 or the second antenna 725.

As discussed herein, wireless routers according to some aspects of the disclosure may include a first antenna array and a second antenna array for receiving and transmitting signals. In some examples, the transmit and receive paths of the first and second antenna arrays may both remain active at the same time. The router may be configured to apply different beamforming parameters to the first and second antenna array to implement different beamforming configurations, thus increasing the coverage area and improving signal quality by providing more targeted beam directions.

Figure 8:
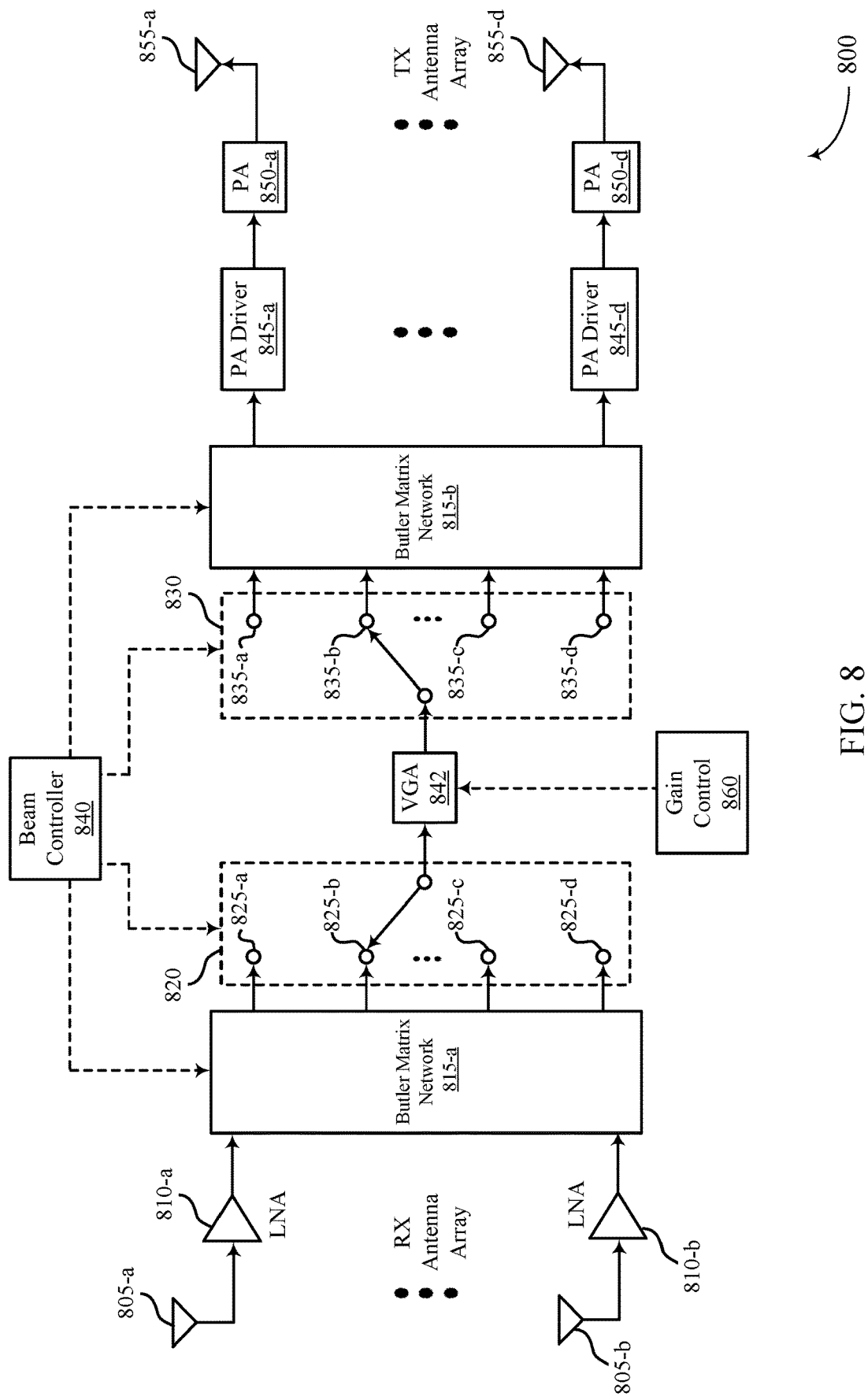
FIG. 8 illustrates an example of a unidirectional beamforming router that supports RF-domain beamforming techniques in accordance with aspects of the present disclosure.

FIG. 8 illustrates an example of a unidirectional beamforming router 800 that supports RF-domain beamforming techniques in accordance with aspects of the present disclosure. In some examples, unidirectional beamforming router 800 may implement aspects of wireless communication system 100, or 200. In some examples, unidirectional beamforming router 800 may be an example of a RF-domain beamforming router as discussed herein. Additionally, butler matrix networks 815-*a* and 815-*b* may be examples of a butler matrix network 410 as described with reference to FIG. 4. Unidirectional beamforming router 800 may be used to route one out of M receive beams to one out of N transmit beams.

In this example, an antenna array including antenna elements 805-*a* and 805-*b* may receive a transmission (e.g., a unicast transmission) from a base station 105 or a UE 115. The antenna array may pass signals at each antenna through an LNA 810. In some cases, the LNA 810 may have a gain that is set based on an input from beam controller 840 (e.g., based on a configured input received via a control link at beam controller 840). The combinations of each antenna element 805 and LNA 810 provide an array of antennas/LNAs. Outputs of the LNAs 810 are provided to a first Butler matrix network 815-*a*, which may perform beamforming processing to output signals associated with each of the M receive beams. For instance, antenna element 805-*a* may pass a first signal to LNA 810-*a*, which may pass the amplified first signal to Butler matrix network 815-*a*, and antenna element 805-*b* may pass a second signal to LNA 810-*b*, which may pass the amplified second signal to Butler matrix network 815-*a*. The first Butler matrix network 815-*a* perform signal processing as discussed with respect to FIG. 4, and output signals that correspond to each of the M receive beams.

The outputs of the first Butler matrix network 815-*a* may be provided to a first SPNT switch 820, which may select one signal path terminal 825 from a set of signal path terminals 825. Although four signal path terminals 825 are depicted in the present example, it should be understood that there may be more signal path terminals 825 without deviating from the scope of the present disclosure. The SPNT switch 820 may determine which signal path terminal 825 to choose at the direction of beam controller 840. The controller 840 may choose a signal path terminal 825 based on a beam direction associated with the signal path terminal 825. In the present example, beam controller 840 may direct the SPNT switch 820 to choose signal path terminal 825-*b* (e.g., associated with a first receive beam that is selected as the one out of M receive beams that is to be repeated).

In this example, the output of the first SPNT switch 820 is provided to a variable gain amplifier (VGA) 842. The VGA 842 may amplify the received signal to provide an amplified repeated signal that is output, which may enhance the likelihood of a receiver successfully receiving, demodulating, and decoding the signal. The gain of the VGA 842 may be set by gain control component 860, which may receive an indication of a gain from beam controller 840 (e.g., based on configuration information received via a control link). In some cases, other signal processing may also be performed in conjunction with the VGA 842, such as analog or digital filtering to provide echo cancellation or mitigation of interfering signals from one or more jammers. The amplified signal may be passed to a second SPNT switch 830 which may select one signal path terminal 835 from a set of signal path terminals 835. Although four signal path terminals 835 are depicted in the present example, it should be understood that there may be more signal path terminals 835 without deviating from the scope of the present disclosure. The second SPNT switch 830 may determine which signal path terminal 835 to choose at the direction of beam controller 840, which may choose a signal path terminal 835 based on a beam direction associated with the signal path terminal 835 (e.g., based on configuration information received via a control link). In the present example, beam controller 840 may direct the second SPNT switch 830 to choose signal path terminal 835-*b* (e.g., associated with a first transmit beam that is selected as the one out of N transmit beams that is to be transmitted).

The output of the second SPNT switch 830 may be provided via signal path terminal 835-*b* and fed into second Butler matrix network 815-*b*. The second Butler matrix network 815-*b* may perform operations on the signal (e.g., via the process described in FIG. 4) and may output a set of output signals which are fed into PA drivers 845. The number of terminals to which the second Butler matrix network 815-*b* may output may be equal to a number of signal path terminals 835 (e.g., if there are four signal path terminals 835, there may be four output terminals). In one example, a first, second, third, and fourth output signal may be fed into PA drivers 845-*a* through 845-*d* respectively. The PA driver 845 may pass the respective output signal to PAs 850-*a* through 850-*d*, respectively. The PA drivers 845 and PAs 850 may apply gains to signals that pass through. In some cases, each PA driver 845 may have the same gain and each PA 850 may have the same gain. The amplified output signals may be passed to antenna elements 855 and the antenna elements 855 may output a unicast transmission. For instance, in the present example, amplified first, second, third, and fourth output signals may be passed to antenna elements 855-*a* through 855-*d*, respectively, and a unicast transmission may be transmitted. The transmission transmitted from the antenna elements 855 may correspond to the beamforming direction associated with the chosen signal path terminal 835. For instance, in the present example, the beam along which the transmission is transmitted may correspond to signal path terminal 835-*b*. The transmission may be received by a UE 115 or a base station 105.

Figure 9:
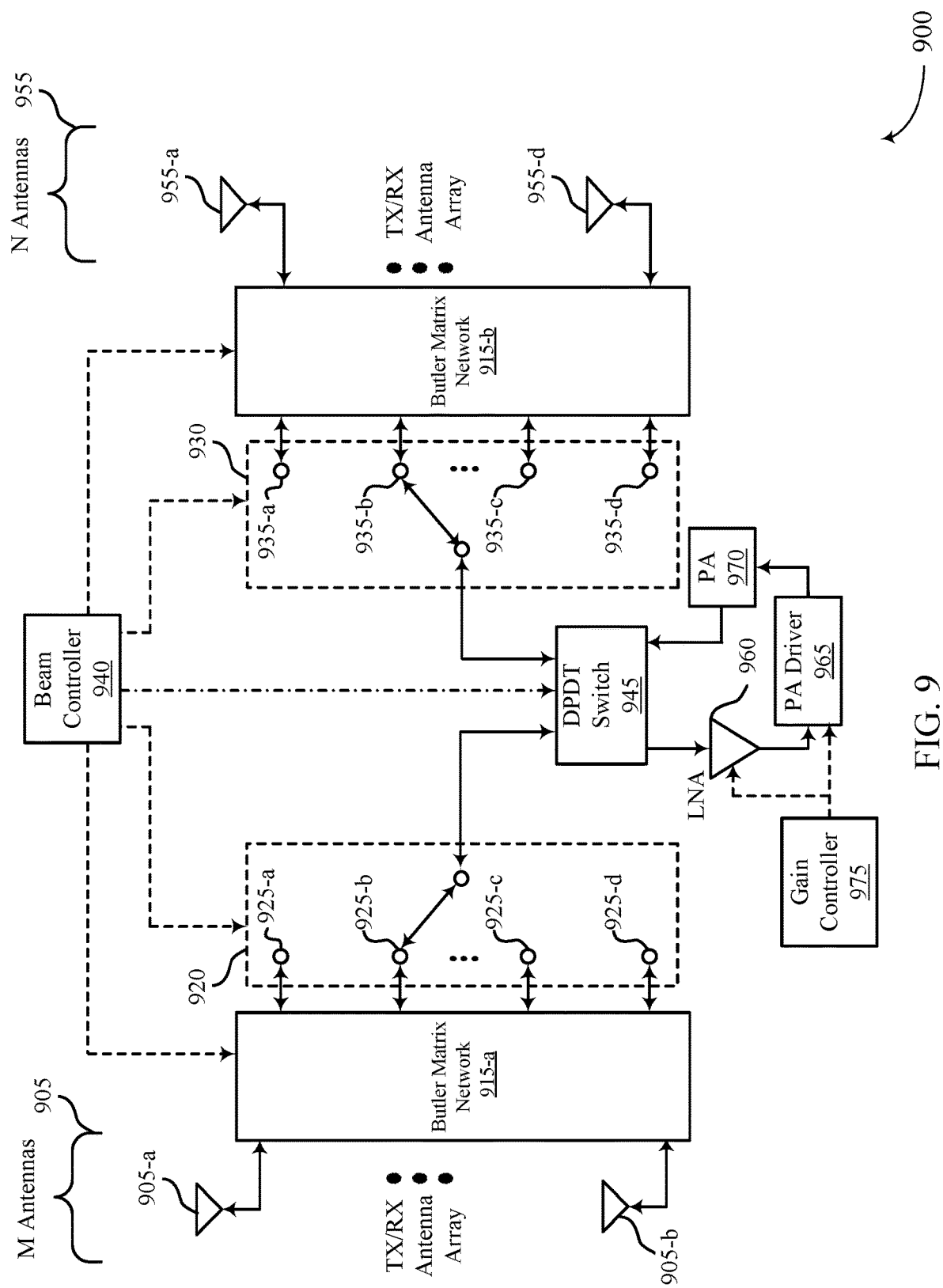
FIG. 9 illustrates an example of a bidirectional beamforming router that supports RF-domain beamforming techniques in accordance with aspects of the present disclosure.

FIG. 9 illustrates an example of a bidirectional beamforming router 900 that supports RF-domain beamforming techniques in accordance with aspects of the present disclosure. In some examples, bidirectional beamforming router 900 may implement aspects of wireless communication system 100, or 200. In some examples, bidirectional beamforming router 900 may be an example of a RF-domain beamforming router as discussed herein. Additionally, butler matrix networks 915-*a* and 915-*b* may be examples of a butler matrix network 410 as described with reference to FIG. 4. Bidirectional beamforming router 900 may be used to route one out of M receive beams to one out of N transmit beams, or one out of N receive beams to one out of M transmit beams.

In this example, an antenna array 905 of M antennas including antenna elements 905-*a* and 905-*b* may receive a transmission (e.g., a unicast transmission) from a base station 105 or a UE 115. Outputs of each antenna element 905 are provided to a first Butler matrix network 915-*a*, which may perform beamforming processing to output signals associated with each of the M receive beams. For instance, antenna element 905-*a* may pass a first signal to Butler matrix network 915-*a*, and antenna element 905-*b* may pass a second signal to Butler matrix network 915-*a*. The first Butler matrix network 915-*a* perform signal processing as discussed with respect to FIG. 4, and output signals that correspond to each of the M receive beams.

The outputs of the first Butler matrix network 915-*a* may be provided to a first SPNT switch 920, which may select one signal path terminal 925 from a set of signal path terminals 925. Although four signal path terminals 925 are depicted in the present example, it should be understood that there may be more signal path terminals 925 without deviating from the scope of the present disclosure. The SPNT switch 920 may determine which signal path terminal 925 to choose at the direction of beam controller 940. The controller 940 may choose a signal path terminal 925 based on a beam direction associated with the signal path terminal 925. In the present example, beam controller 940 may direct the SPNT switch 920 to choose signal path terminal 925-*b* (e.g., associated with a first receive beam that is selected as the one out of M receive beams that is to be repeated).

In this example, the output of the first SPNT switch 920 is provided to DPDT switch 945, which may route the signal through LNA 960, PA driver 965, and PA 970 to a second SPNT switch 930. The DPDT switch 945, LNA 960, PA driver 965, and PA 970 may perform signal processing as discussed with respect to FIG. 7. In some cases, the beam controller 840 may provide input to the DPDT switch 945 that selects which input of the DPDT switch 945 is routed to the LNA 960. In this example gain controller 975 provides a gain control signal to the LNA 960 and to the PA driver 965 that sets amplification gain in the associated signal processing components.

The amplified signal may be passed to a second SPNT switch 930 which may select one signal path terminal 935 from a set of signal path terminals 935. Although four signal path terminals 935 are depicted in the present example, it should be understood that there may be more signal path terminals 935 without deviating from the scope of the present disclosure. The second SPNT switch 930 may determine which signal path terminal 935 to choose at the direction of beam controller 940, which may choose a signal path terminal 935 based on a beam direction associated with the signal path terminal 935 (e.g., based on configuration information received via a control link). In the present example, beam controller 940 may direct the second SPNT switch 930 to choose signal path terminal 935-*b* (e.g., associated with a first transmit beam that is selected as the one out of N transmit beams that is to be transmitted).

The output of the second SPNT switch 930 may be provided via signal path terminal 935-*b* and fed into second Butler matrix network 915-*b*. The second Butler matrix network 915-*b* may perform operations on the signal (e.g., via the process described in FIG. 4) and may output a set of output signals which are fed into antenna elements 955. The number of terminals to which the second Butler matrix network 915-*b* may output may be equal to a number of signal path terminals 935 (e.g., if there are four signal path terminals 935, there may be four output terminals). In one example, a first, second, third, and fourth output signal may be fed into antenna elements 955-*a* through 955-*d* respectively and the antenna elements 955 may output a unicast transmission. For instance, in the present example, amplified first, second, third, and fourth output signals may be passed to antenna elements 955-*a* through 955-*d*, respectively, of antenna array 955 and a unicast transmission may be transmitted. The transmission transmitted from the antenna elements 955 may correspond to the beamforming direction associated with the chosen signal path terminal 935. For instance, in the present example, the beam along which the transmission is transmitted may correspond to signal path terminal 935-*b*. The transmission may be received by a UE 115 or a base station 105.

In this example, by moving the LNA 960, PA driver 965, and PA 970 to be associated with the DPDT switch 945, the router 900 works as a bidirectional router in which signals received at antenna array 955 may be routed to be retransmitted via the antenna array 905. In some cases, a base station and UE may communicate according to a TDD communications scheme, and the beam controller 940 may control the DPDT switch 945 to route signals based on the direction of communications in the TDD communications scheme. In some cases, amplification may be different based on the direction of the communication, and the beam controller 940 may provide an indication to the gain controller 975 to adjust amplifier gain based on the direction of communication. Further, in some cases, the signal processing components may include one or more other components, such as analog filters, digital filters, or both, similarly as discussed with respect to FIG. 8.

Figure 10:
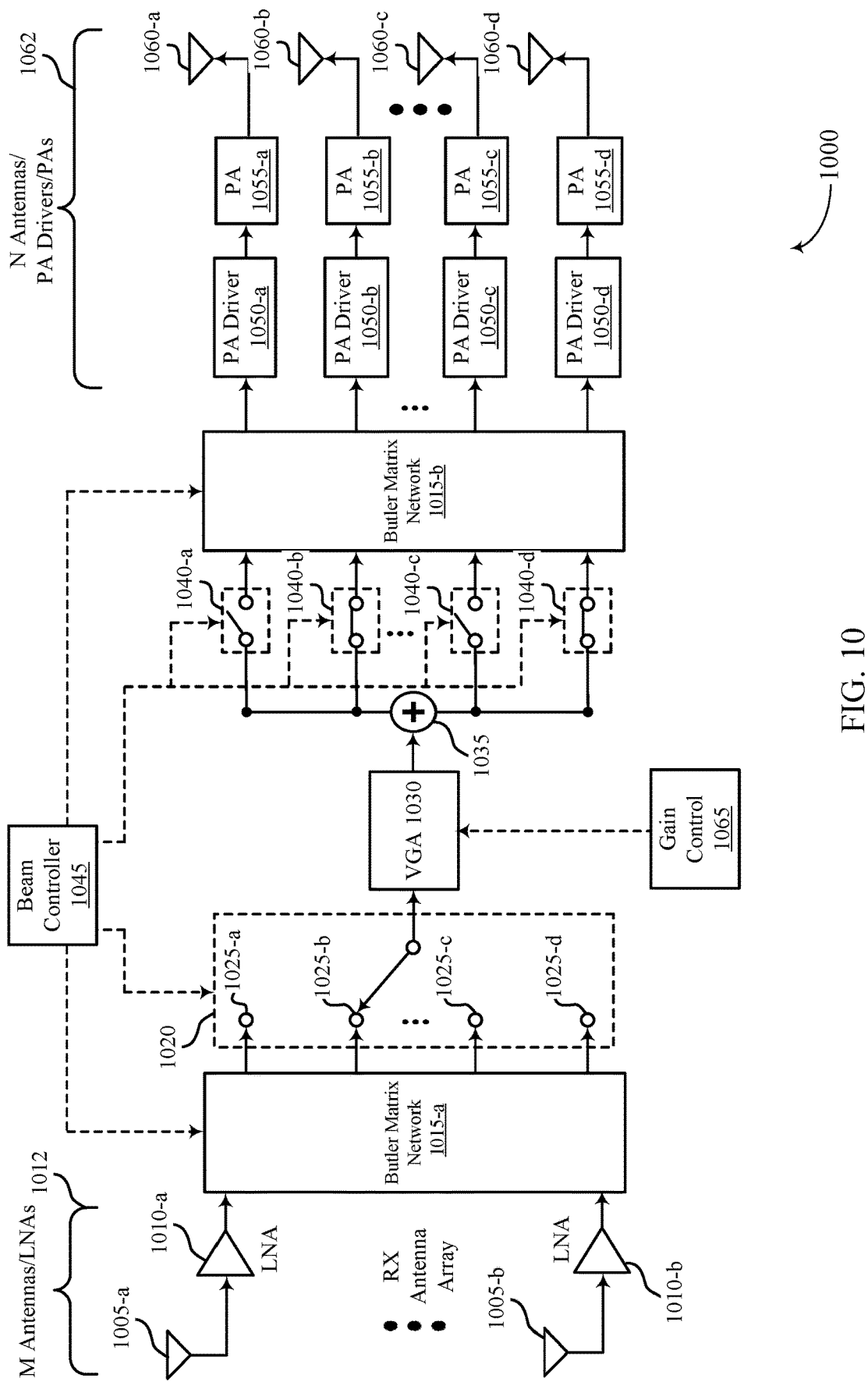
FIG. 10 illustrates an example of a unidirectional multicast beamforming router that supports RF-domain beamforming techniques in accordance with aspects of the present disclosure.

FIG. 10 illustrates an example of a unidirectional multicast beamforming router 1000 that supports RF-domain beamforming techniques in accordance with aspects of the present disclosure. In some examples, unidirectional beamforming router 1000 may implement aspects of wireless communication system 100, or 200. In some examples, unidirectional beamforming router 1000 may be an example of a RF-domain beamforming router as discussed herein. Additionally, butler matrix networks 1015-*a* and 1015-*b* may be examples of a butler matrix network 410 as described with reference to FIG. 4. Unidirectional beamforming router 1000 may be used to route one out of M receive beams to be multicast on up to N transmit beams.

In this example, an antenna array including antenna elements 1005-*a* and 1005-*b* may receive a transmission (e.g., a unicast transmission) from a base station 105 or a UE 115. The antenna array may pass signals at each antenna through an LNA 1010, to provide an array of M antennas/LNAs. In some cases, the LNA 1010 may have a gain that is set based on an input from beam controller 1045 (e.g., based on a configured input received via a control link at beam controller 1045). The combinations of each antenna element 1005 and LNA 1010 provide an array of antennas/LNAs 1012. Outputs of the LNAs 1010 are provided to a first Butler matrix network 1015-*a*, which may perform beamforming processing to output signals associated with each of the M receive beams. For instance, antenna element 1005-*a* may pass a first signal to LNA 1010-*a*, which may pass the amplified first signal to Butler matrix network 1015-*a*, and antenna element 1005-*b* may pass a second signal to LNA 1010-*b*, which may pass the amplified second signal to Butler matrix network 1015-*a*. The first Butler matrix network 1015-*a* perform signal processing as discussed with respect to FIG. 4, and output signals that correspond to each of the M receive beams.

The outputs of the first Butler matrix network 1015-*a* may be provided to a first SPNT switch 1020, which may select one signal path terminal 1025 from a set of signal path terminals 1025. Although four signal path terminals 1025 are depicted in the present example, it should be understood that there may be more signal path terminals 1025 without deviating from the scope of the present disclosure. The SPNT switch 1020 may determine which signal path terminal 1025 to choose at the direction of beam controller 1045. The controller 1045 may choose a signal path terminal 1025 based on a beam direction associated with the signal path terminal 1025. In the present example, beam controller 1045 may direct the SPNT switch 1020 to choose signal path terminal 1025-*b* (e.g., associated with a first receive beam that is selected as the one out of M receive beams that is to be repeated).

In this example, the output of the first SPNT switch 1020 is provided to a variable gain amplifier (VGA) 1030. The VGA 1030 may amplify the received signal to provide an amplified repeated signal that is output, which may enhance the likelihood of a receiver successfully receiving, demodulating, and decoding the signal. The gain of the VGA 1030 may be set by gain control component 1065, which may receive an indication of a gain from beam controller 1045 (e.g., based on configuration information received via a control link). In some cases, other signal processing may also be performed in conjunction with the VGA 1030, such as analog or digital filtering to provide echo cancellation or mitigation of interfering signals from one or more jammers. The variable gain amplifier 1030 may pass the amplified signal to signal aggregator/divider 1035. In the present example, signal aggregator/divider 1035 may pass the amplified aggregated signal to signal path switches 1040. Each signal path switch 1040 may be associated with a different beamforming direction and may be controlled by a beam controller 1045. The beam controller 1045 may determine which of the signal path switches 1040 may be opened and which may be closed. In the present example, signal path switches 1040-*a* and 1040-*c* may be opened and signal path switches 1040-*b* and 1040-*d* may be closed. Although four signal path switches 1040 are depicted in the present example, it should be understood that a different number of signal path switches 1040 may be used without deviating from the scope of the present disclosure.

Signal path switches 1040-*b* and 1040-*d* may pass the amplified signal to second Butler matrix network 1015-*b*. The second Butler matrix network 1015-*b* may perform operations on the signal (e.g., via the process described in FIG. 4) and may output a set of output signals which are fed into PA drivers 1050. The number of terminals to which the butler matrix network 1015-*b* may output may be equal to a number of signal path switches 1040 (e.g., if there are four signal path switches 1040, there may be four output terminals). In one example, a first, second, third, and fourth output signal may be fed into PA drivers 1050-*a*, 1050-*b*, 1050-*c*, and 1050-*d* respectively. Each PA driver 1050 may pass the first, second, third, and fourth output signal to PAs 1055-*a*, 1050-5, 1055-*c*, and 1055-*d*, respectively. The PA drivers 1050 and PA 1055 may apply gains to signals that pass through. In this example, N antennas 1060 may each have associated PA drivers 1050 and PAs 1055, to provide an array of N antennas/PA drivers/PAs 1062. In some cases, each PA driver 1050 may have the same gain and each PA 1055 may have the same gain. In some cases, gain control component 1065 may provide a gain signal to PA drivers 1050. The amplified output signals may be passed to antenna elements 1060 and the antenna elements 1060 may output a multicast transmission. For instance, in the present example, amplified first, second, third, and fourth output signals may be passed to antenna elements 1060-a, 1060-b, 1060-c, and 1060-d, respectively, and a multicast transmission may be transmitted. The transmission transmitted from the antenna elements 1060 may correspond to beamforming directions associated with the chosen signal path switches 1040, according to a mapping that is provided to beam controller 1045. For instance, in the present example, a first beam along which the transmission is transmitted may correspond to signal path switch 1040-b and a second beam along which the transmission is transmitted may correspond to signal path switch 1040-d. A first UE 115 or base station 105 may receive the transmission from the first beam and a second UE 115 or base station 105 may receive the transmission from the second beam. In some cases, beam controller 1045 may close a single signal path switch 1040 and the resulting transmission may be unicast.

Figure 11:
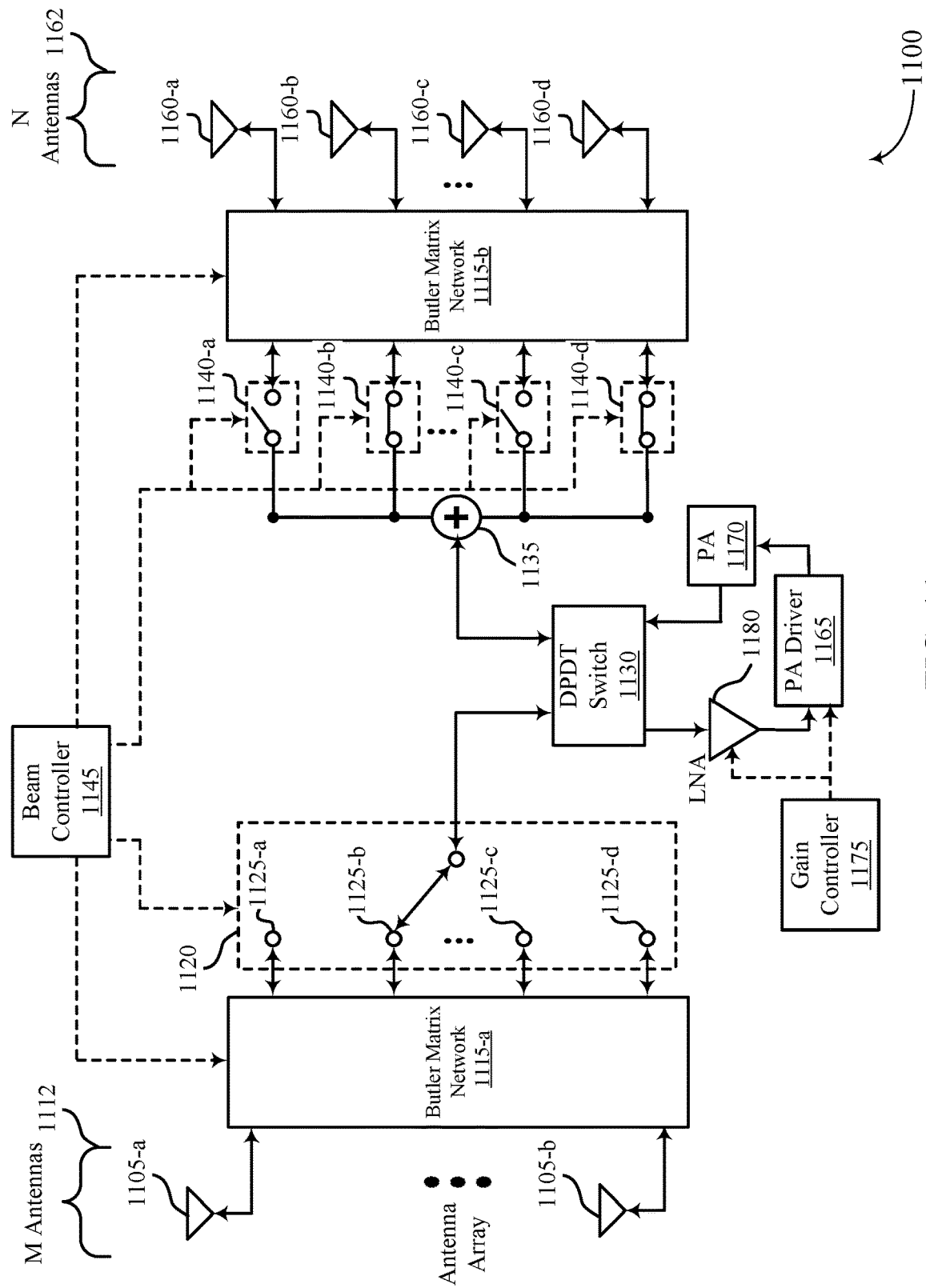
FIG. 11 illustrates an example of a bidirectional multicast beamforming router that supports RF-domain beamforming techniques in accordance with aspects of the present disclosure.

FIG. 11 illustrates an example of a bidirectional multicast beamforming router 1100 that supports RF-domain beamforming techniques in accordance with aspects of the present disclosure. In some examples, bidirectional multicast beamforming router 1100 may implement aspects of wireless communication system 100, or 200. In some examples, bidirectional multicast beamforming router 1100 may be an example of a RF-domain beamforming router as discussed herein. Additionally, butler matrix networks 1115-a and 1115-b may be examples of a butler matrix network 410 as described with reference to FIG. 4. Bidirectional multicast beamforming router 1100 may be used to route one out of M receive beams to up to N transmit beams, or up to N receive beams to one out of M transmit beams.

In this example, an antenna array 1112 of M antennas including antenna elements 1105-a and 1105-b may receive a transmission (e.g., a unicast transmission) from a base station 105 or a UE 115. Outputs of each antenna element 1105 are provided to a first Butler matrix network 1115-a, which may perform beamforming processing to output signals associated with each of the M receive beams. For instance, antenna element 1105-a may pass a first signal to Butler matrix network 1115-a, and antenna element 1105-b may pass a second signal to Butler matrix network 1115-a. The first Butler matrix network 1115-a perform signal processing as discussed with respect to FIG. 4, and output signals that correspond to each of the M receive beams.

The outputs of the first Butler matrix network 1115-a may be provided to a first SPNT switch 1120, which may select one signal path terminal 1125 from a set of signal path terminals 1125. Although four signal path terminals 1125 are depicted in the present example, it should be understood that there may be more signal path terminals 1125 without deviating from the scope of the present disclosure. The SPNT switch 1120 may determine which signal path terminal 1125 to choose at the direction of beam controller 1145. The controller 1145 may choose a signal path terminal 1125 based on a beam direction associated with the signal path terminal 1125. In the present example, beam controller 1145 may direct the SPNT switch 1120 to choose signal path terminal 1125-b (e.g., associated with a first receive beam that is selected as the one out of M receive beams that is to be repeated).

In this example, the output of the first SPNT switch 1120 is provided to DPDT switch 1130, which may route the signal through LNA 1180, PA driver 1165, and PA 1170 to a signal aggregator/divider 1135. The DPDT switch 1130, LNA 1180, PA driver 1165, and PA 1170 may perform signal processing as discussed with respect to FIG. 7. In some cases, the beam controller 840 may provide input to the DPDT switch 1130 that selects which input of the DPDT switch 1130 is routed to the LNA 1180. In this example gain controller 1175 provides a gain control signal (e.g., received from beam controller 1145, from a control link, or combinations thereof) to the LNA 1180 and to the PA driver 1165 that sets amplification gain in the associated signal processing components. In some cases, other signal processing may also be performed in conjunction with the amplification illustrated in FIG. 11, such as analog or digital filtering to provide echo cancellation, to provide mitigation of interfering signals from one or more jammers, or combinations thereof.

The output of the DPDT switch 1130 be provided to signal aggregator/divider 1135. In the present example, signal aggregator/divider 1135 may pass the amplified aggregated signal to signal path switches 1140. Each signal path switch 1140 may be associated with a different beamforming direction and may be controlled by a beam controller 1145. The beam controller 1145 may determine which of the signal path switches 1140 may be opened and which may be closed. In the present example, signal path switches 1140-a and 1140-c may be opened and signal path switches 1140-b and 1140-d may be closed. Although four signal path switches 1140 are depicted in the present example, it should be understood that a different number of signal path switches 1140 may be used without deviating from the scope of the present disclosure.

Signal path switches 1140-b and 1140-d may pass the amplified signal to second Butler matrix network 1115-b. The second Butler matrix network 1115-b may perform operations on the signal (e.g., via the process described in FIG. 4) and may output a set of output signals which are fed into PA drivers 1150. The number of terminals to which the butler matrix network 1115-b may output may be equal to a number of signal path switches 1140 (e.g., if there are four signal path switches 1140, there may be four output terminals). In one example, a first, second, third, and fourth output signal may be fed into an array of N antennas 1162. The output signals may be passed to antenna elements 1160 and the antenna elements 1160 may output a multicast transmission. For instance, in the present example, amplified first, second, third, and fourth output signals may be passed to antenna elements 1160-a, 1160-b, 1160-c, and 1160-d, respectively, and a multicast transmission may be transmitted. The transmission transmitted from the antenna elements 1160 may correspond to beamforming directions associated with the chosen signal path switches 1140, according to a mapping that is provided to beam controller 1145. For instance, in the present example, a first beam along which the transmission is transmitted may correspond to signal path switch 1140-b and a second beam along which the transmission is transmitted may correspond to signal path switch 1140-d. A first UE 115 or base station 105 may receive the transmission from the first beam and a second UE 115 or base station 105 may receive the transmission from the second beam. In some cases, beam controller 1145 may close a single signal path switch 1140 and the resulting transmission may be unicast.

Figure 12:
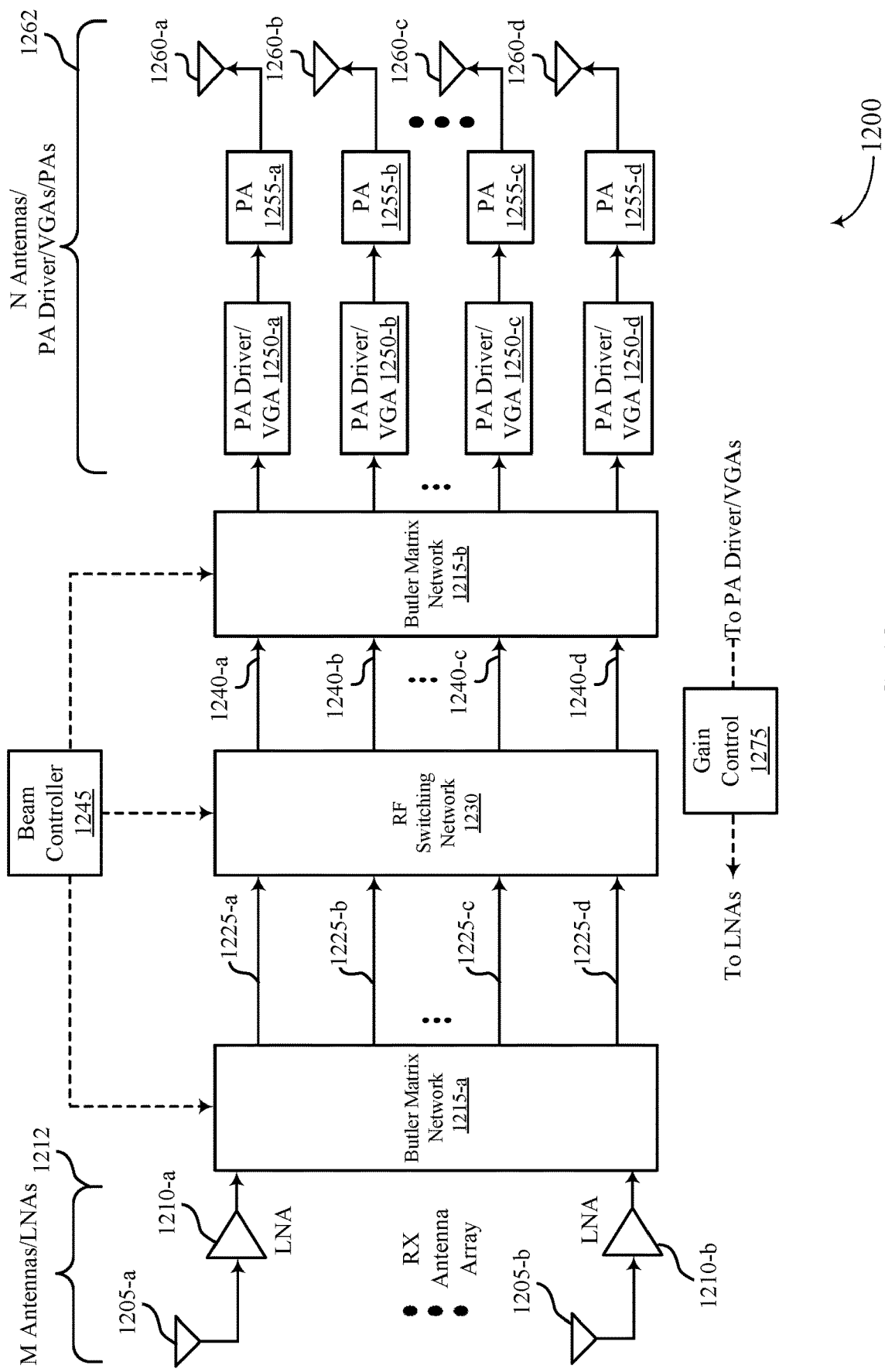
FIG. 12 illustrates an example of a unidirectional M×N beamforming router that supports RF-domain beamforming techniques in accordance with aspects of the present disclosure.

FIG. 12 illustrates an example of a unidirectional M×N beamforming router 1200 that supports RF-domain beamforming techniques in accordance with aspects of the present disclosure. In some examples, unidirectional M×N beamforming router 1200 may implement aspects of wireless communication system 100, or 200. In some examples, unidirectional M×N beamforming router 1200 may be an example of a RF-domain beamforming router as discussed herein. Additionally, butler matrix networks 1215-*a* and 1215-*b* may be examples of a butler matrix network 410 as described with reference to FIG. 4. Further, RF switching network 1230 may be an example of RF switching architectures 500 or 600 as described with reference to FIGS. 5 and 6. Unidirectional M×N beamforming router 1200 may be used to route up to M receive beams to up to N transmit beams.

In this example, an antenna array including antenna elements 1205-*a* and 1205-*b* may receive a transmission (e.g., transmissions on M receive beams) from multiple base stations 105, UEs 115, or combinations thereof. The antenna array may pass signals at each antenna through an LNA 1210. In some cases, the LNA 1210 may have a gain that is set based on an input from beam controller 1245 (e.g., based on a configured input received via a control link at beam controller 1245). The combinations of each antenna element 1205 and LNA 1210 provide an array of antennas/LNAs 1212. Outputs of the LNAs 1210 are provided to a first Butler matrix network 1215-*a*, which may perform beamforming processing to output signals associated with each of the M receive beams. For instance, antenna element 1205-*a* may pass a first signal to LNA 1210-*a*, which may pass the amplified first signal to Butler matrix network 1215-*a*, and antenna element 1205-*b* may pass a second signal to LNA 1210-*b*, which may pass the amplified second signal to Butler matrix network 1215-*a*. The first Butler matrix network 1215-*a* perform signal processing as discussed with respect to FIG. 4, and output signals that correspond to each of the M receive beams.

The outputs 1225 of the first Butler matrix network 1215-*a* may be provided to RF switching network 1230, which may route each of the M receive beams to the N transmit beams by setting switches in the RF switching network 1230 to states that correspond to a mapping between the M receive beams and N transmit beams (e.g., receive beam 1 mapped to transmit beam 1, receive beam 2 mapped to transmit beams 2 and 3, receive beam 3 mapped to transmit beam 4, etc.). Although four signal path outputs 1225 are depicted in the present example, it should be understood that there may be more or fewer signal paths outputs 1225 without deviating from the scope of the present disclosure. The RF switching network 1230 may determine the mapping between the receive and transmit beams at the direction of beam controller 1245. The beam controller 1245 may identify or determine the signal paths, for example, based on configuration information received from a base station or other controller via a control link.

In this example, the outputs 1240 of the RF switching network 1230 may be fed into second Butler matrix network 1215-*b*. The second Butler matrix network 1215-*b* may perform operations on the signal (e.g., via the process described in FIG. 4) and may output a set of N output signals which are fed into VGA and PA drivers 1250. The number of terminals to which the second Butler matrix network 1215-*b* may output may be equal to the N outputs for the transmit beams. In one example, a first, second, third, and fourth output signal may be fed into VGAs and PA drivers 1250-*a* through 1250-*d* respectively, which may amplify the signals and pass the respective output signal to PAs 1255-*a* through 1255-*d*, respectively. The VGAs and PA drivers 1250 and PAs 1255 may apply gains to signals that pass through, and may receive a signal that sets the associated gain from gain control 1275 (e.g., that receives gain control information from beam controller 1245, from a control link, or combinations thereof). In some cases, each VGA and PA driver 1250 may have the same gain and each PA 1255 may have the same gain. The amplified output signals may be passed to antenna elements 1260 and the antenna elements 1260 may output the associated one or more (i.e., N) output transmissions. The array 1262 of antennas, PA drivers, VGAs, and PAs may thus output beamformed output signals that may be received by one or more base stations, one or more UEs, or combinations thereof. For instance, in the present example, amplified first, second, third, and fourth output signals may be passed to antenna elements 1260-*a* through 1260-*d*, which may correspond to the N output beams.

Figure 13:
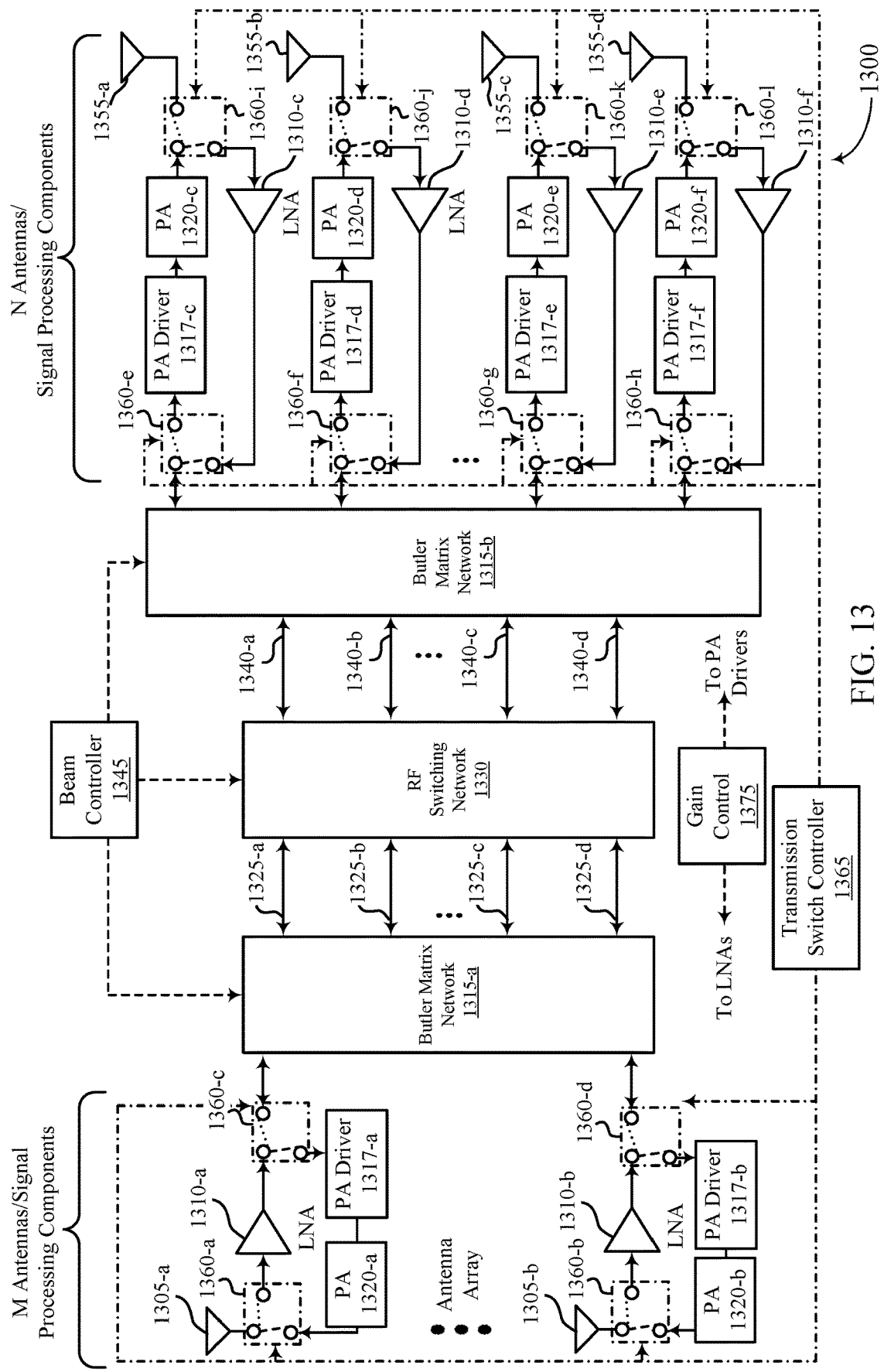
FIG. 13 illustrates an example of a bidirectional time division duplexing M×N beamforming router that supports RF-domain beamforming techniques in accordance with aspects of the present disclosure.

FIG. 13 illustrates an example of a bidirectional time division duplexing M×N beamforming router 1300 that supports RF-domain beamforming techniques in accordance with aspects of the present disclosure. In some examples, bidirectional time division duplexing M×N beamforming router 1300 may implement aspects of wireless communication system 100, or 200. In some examples, bidirectional TDD M×N beamforming router 1300 may be an example of a RF-domain beamforming router as discussed herein. Additionally, butler matrix networks 1315-*a* and 1315-*b* may be examples of a butler matrix network 410 as described with reference to FIG. 4. Further, RF switching network 1330 may be an example of RF switching architectures 500 or 600 as described with reference to FIGS. 5 and 6. Bidirectional TDD M×N beamforming router 1300 may be used to route up to M receive beams to up to N transmit beams, and N receive beams to M transmit beams.

In this example, an antenna array including antenna elements 1305-*a* and 1305-*b* may receive a transmission (e.g., transmissions on M receive beams) from multiple base stations 105, UEs 115, or combinations thereof. In this example, due to the TDD nature of the transmissions, the device may alternate between processing transmissions received by antenna elements 1305 (e.g., downlink transmissions) and transmissions received by antenna elements 1355 (e.g., uplink transmissions). When alternating from receiving and retransmitting transmissions received at a first antenna array (e.g., the array comprising antenna elements 1305) to receiving and retransmitting transmissions at a second antenna array (e.g., antenna elements 1355), a number of transit/receive (T/R) switches 1360 associated with each antenna element may be switched. For instance, when receiving and retransmitting transmissions at antenna elements 1305, each T/R switch 1360-*a* through 1360-*d* may be switched such that the received signal is routed from antenna element 1305 through LNA 1310 to the first Butler matrix network 1315-*a*, and when receiving and retransmitting transmissions from antenna elements 1355, T/R switches 1360-*a* through 1360-*d* may be configured to pass signals from the first Butler matric network 1315-*a* to the PA driver 1317, PA 1320, and antenna element 1305. The configuration of T/R switches 1360 may be controlled by a transmission switch controller 1365 (which may receive information on configuration, timing, and transmission direction from beam controller 1345, from a control link, or combinations thereof).

In one example, each T/R switch 1360 may be in a configuration for receiving beams at the M antennas and signal processing components, and antenna elements 1305-a and 1305-b may receive transmissions (e.g., separate beamformed transmissions) from multiple base stations 105 or a UE 115. The antenna array may pass signals at each antenna element 1305 through associated T/R switch 1360 to an LNA 1310, which may pass the signal through another T/R switch 1360 to the first Butler matrix network 1315-a. In some cases, the LNA 1310 may have a gain that is set based on an input from gain control 1375 (e.g., based on a configured input received via a control link at beam controller 1345). The first Butler matrix network 1315-a may perform beamforming processing to output signals associated with each of the M receive beams. For instance, antenna element 1305-a may pass a first signal to LNA 1310-a, which may pass the amplified first signal to Butler matrix network 1315-a, and antenna element 1305-b may pass a second signal to LNA 1310-b, which may pass the amplified second signal to Butler matrix network 1315-a. The first Butler matrix network 1315-a perform signal processing as discussed with respect to FIG. 4, and output signals that correspond to each of the M receive beams.

The outputs 1325 of the first Butler matrix network 1315-a may be provided to RF switching network 1330, which may route each of the M receive beams to the N transmit beams by setting switches in the RF switching network 1330 to states that correspond to a mapping between the M receive beams and N transmit beams (e.g., receive beam 1 mapped to transmit beam 1, receive beam 2 mapped to transmit beams 2 and 3, receive beam 3 mapped to transmit beam 4, etc.). Although four signal path outputs 1325 are depicted in the present example, it should be understood that there may be more or fewer signal path outputs 1325 without deviating from the scope of the present disclosure. The RF switching network 1330 may determine the mapping between the receive and transmit beams at the direction of beam controller 1345. The beam controller 1345 may identify or determine the signal paths, for example, based on configuration information received from a base station or other controller via a control link.

In this example, the outputs 1340 of the RF switching network 1330 may be fed into second Butler matrix network 1315-b. The second Butler matrix network 1315-b may perform operations on the signal (e.g., via the process described in FIG. 4) and may output a set of N output signals which are provided to PA driver 1317 and PA 1320 when T/R switches 1360-e through 1360-1 are configured retransmit signals from antenna elements 1355. The number of terminals to which the second Butler matrix network 1315-b may output may be equal to the N outputs/inputs for the associated beams. The PA drivers 1317 and PAs 1320 may apply gains to signals that pass through, and may receive a signal that sets the associated gain from gain control 1375 (e.g., that receives gain control information from beam controller 1345, from a control link, or combinations thereof). The amplified output signals may be passed to antenna elements 1355 and the antenna elements 1355 may output the associated one or more (i.e., N) output transmissions. When beams are received at the antenna elements 1355 to be retransmitted via antenna elements 1305, the above described signal paths are configured, using T/R switches 1360, to provide a path that moves from right-to-left in the illustration of FIG. 13.

Figure 14:
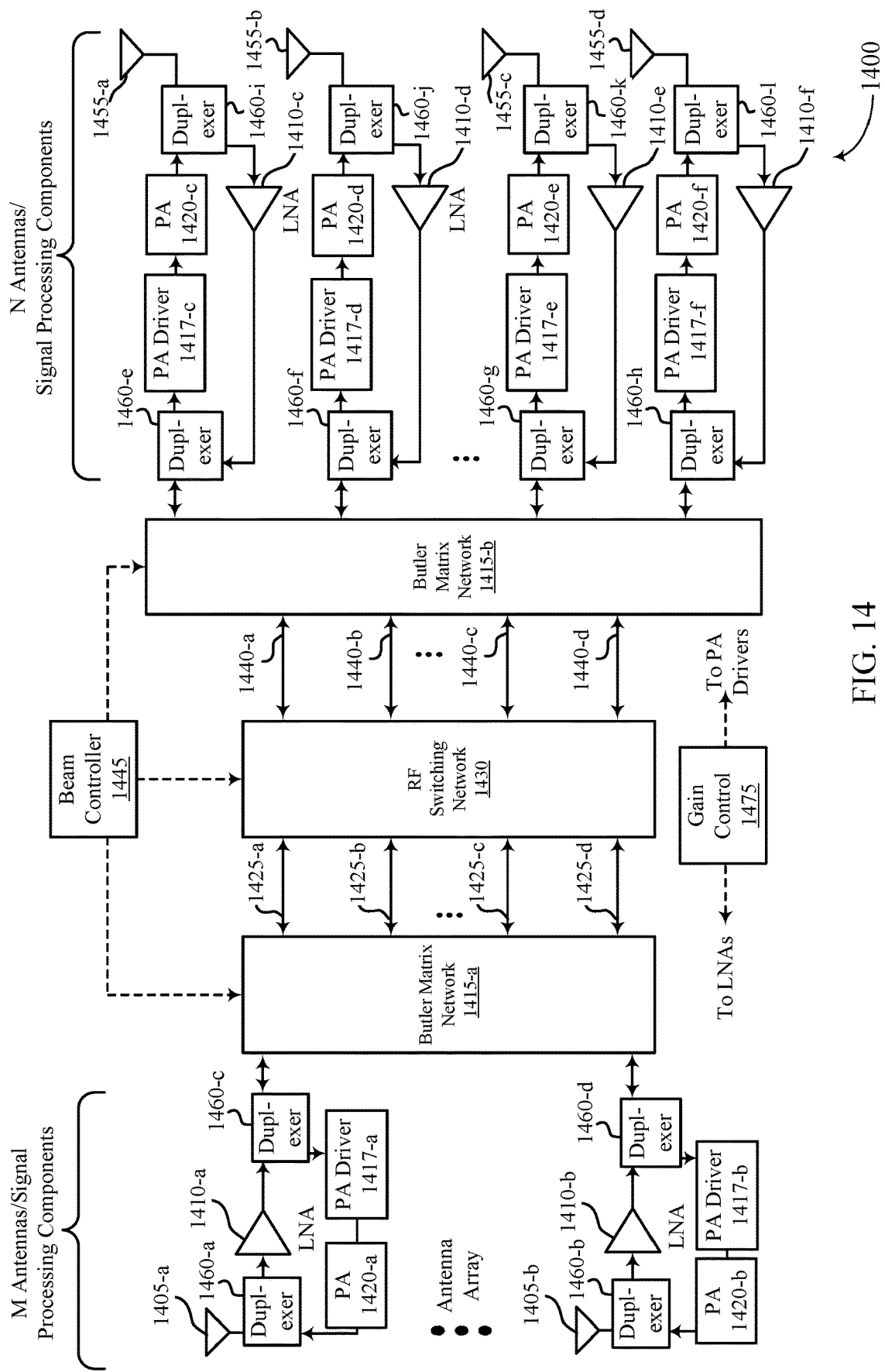
FIG. 14 illustrates an example of a bidirectional full duplex M×N beamforming router that supports RF-domain beamforming techniques in accordance with aspects of the present disclosure.

FIG. 14 illustrates an example of a bidirectional full duplex M×N beamforming router 1400 that supports RF-domain beamforming techniques in accordance with aspects of the present disclosure. In some examples, bidirectional full duplex M×N beamforming router 1400 may implement aspects of wireless communication system 100, or 200. In some examples, bidirectional full duplex M×N beamforming router 1400 may be an example of a RF-domain beamforming router as discussed herein. Additionally, butler matrix networks 1415-a and 1415-b may be examples of a butler matrix network 410 as described with reference to FIG. 4. Further, RF switching network 1430 may be an example of RF switching architectures 500 or 600 as described with reference to FIGS. 5 and 6. Bidirectional full duplex M×N beamforming router 1400 may be used to route up to M receive beams to up to N transmit beams, and N receive beams to M transmit beams.

In this example, an antenna array including antenna elements 1405-a and 1405-b may receive a transmission (e.g., transmissions on M receive beams) from multiple base stations 105, UEs 115, or combinations thereof. In this example, due to the full duplex nature of the transmissions, the device may concurrently process transmissions received by antenna elements 1405 (e.g., downlink transmissions) and transmissions received by antenna elements 1455 (e.g., uplink transmissions). When concurrently receiving and retransmitting transmissions received at a first antenna array (e.g., the array comprising antenna elements 1405) to receiving and retransmitting transmissions at a second antenna array (e.g., antenna elements 1455), a number of duplexers 1460 associated with each antenna element may be used to route signals in a directional manner. Duplexers 1460, which may also be referred to as circulators or circulating circuits, route signals received from a first connection point to a second connection point, and signals received at a third connection point to the first connection point, where signals may be received at each of the first and third connection points concurrently. Accordingly, signals received at antenna elements 1405 and at antenna elements 1455 are routed to LNAs 1410, and signals that are coming from Butler matrix networks 1415 are routed to PA drivers 1417 and PAs 1420.

In one example, each duplexer 1460 may be in a configuration for receiving beams at the M antennas elements 1405 (e.g., separate beamformed transmissions) from multiple base stations 105 or a UE 115. The antenna array may pass signals at each antenna element 1405 through associated duplexer 1460 to an LNA 1410, which may pass the signal through another duplexer 1460 to the first Butler matrix network 1415-a. In some cases, the LNA 1410 may have a gain that is set based on an input from gain control 1475 (e.g., based on a configured input received via a control link at beam controller 1445). The first Butler matrix network 1415-a may perform beamforming processing to output signals associated with each of the M receive beams. For instance, antenna element 1405-a may pass a first signal to LNA 1410-a, which may pass the amplified first signal to Butler matrix network 1415-a, and antenna element 1405-b may pass a second signal to LNA 1410-b, which may pass the amplified second signal to Butler matrix network 1415-a. The first Butler matrix network 1415-a perform signal processing as discussed with respect to FIG. 4, and output signals that correspond to each of the M receive beams.

The outputs 1425 of the first Butler matrix network 1415-a may be provided to RF switching network 1430, which may route each of the M receive beams to the N transmit beams by setting switches in the RF switching network 1430 to states that correspond to a mapping between the M receive beams and N transmit beams (e.g., receive beam 1 mapped to transmit beam 1, receive beam 2 mapped to transmit beams 2 and 3, receive beam 3 mapped to transmit beam 4, etc.). Although four signal path outputs 1425 are depicted in the present example, it should be understood that there may be more or fewer signal path outputs 1425 without deviating from the scope of the present disclosure. The RF switching network 1430 may determine the mapping between the receive and transmit beams at the direction of beam controller 1445. The beam controller 1445 may identify or determine the signal paths, for example, based on configuration information received from a base station or other controller via a control link.

In this example, the outputs 1440 of the RF switching network 1430 may be fed into second Butler matrix network 1415-b. The second Butler matrix network 1415-b may perform operations on the signal (e.g., via the process described in FIG. 4) and may output a set of N output signals which are provided to PA driver 1417 and PA 1420 via duplexers 1460-e through 1460-h and to antenna elements 1455 via duplexers 1460-I through 1460-1. The number of terminals to which the second Butler matrix network 1415-b may output may be equal to the N outputs/inputs for the associated beams. The PA drivers 1417 and PAs 1420 may apply gains to signals that pass through, and may receive a signal that sets the associated gain from gain control 1475 (e.g., that receives gain control information from beam controller 1445, from a control link, or combinations thereof). The amplified output signals may be passed to antenna elements 1455 and the antenna elements 1455 may output the associated one or more (i.e., N) output transmissions. When beams are received at the antenna elements 1455 to be retransmitted via antenna elements 1405, the above described signal paths are configured, using duplexers 1460, to provide a path that moves from right-to-left in the illustration of FIG. 14.

Figure 15:
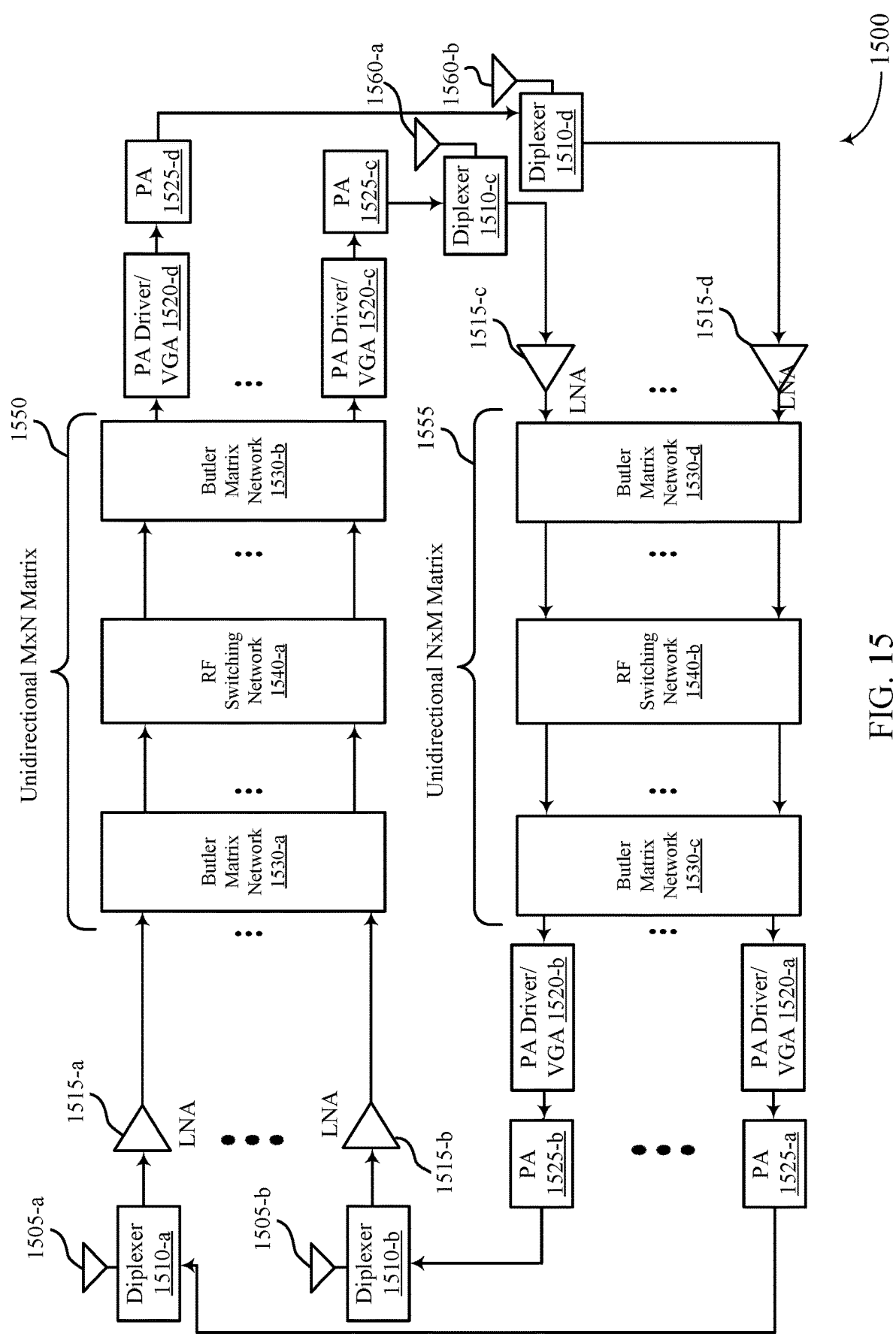
FIG. 15 illustrates an example of a bidirectional frequency division duplexing M×N beamforming router that supports RF-domain beamforming techniques in accordance with aspects of the present disclosure.

FIG. 15 illustrates an example of a bidirectional FDD M×N beamforming router 1500 that supports RF-domain beamforming techniques in accordance with aspects of the present disclosure. In some examples, bidirectional FDD M×N beamforming router 1500 may implement aspects of wireless communication system 100, or 200. In some examples, bidirectional FDD M×N beamforming router 1500 may be an example of a RF-domain beamforming router as discussed herein. Additionally, butler matrix networks 1530-a through 1530-d may be examples of a butler matrix network 410 as described with reference to FIG. 4. Further, RF switching networks 1540-a and 1540-b may be examples of RF switching architectures 500 or 600 as described with reference to FIGS. 5 and 6. Bidirectional FDD M×N beamforming router 1500 may be used to route up to M receive beams at a first frequency to up to N transmit beams at a second frequency, and N receive beams at the second frequency to M transmit beams at the first frequency. Bidirectional FDD M×N beamforming router 1500 may be capable of processing and retransmitting transmissions received at a first antenna array (e.g., the array comprising antenna elements 1505) simultaneously with processing and retransmitting transmissions received at a second antenna array (e.g., antenna elements 1560). As such, bidirectional FDD M×N beamforming router 1500 may be used for FDD operations.

In this example, an antenna array including antenna elements 1505-a and 1505-b may receive transmissions (e.g., multiple beamformed transmissions) from one or more base stations 105, one or more UEs 115, or combinations thereof. The antenna array may pass signals at each antenna through a diplexer 1510 to an LNA 1515, which may pass the signal to a first Butler matrix network 1530-a. For instance, antenna element 1505-a may pass a first signal through diplexer 1510-a to LNA 1515-a, which may pass the amplified first signal to first Butler matrix network 1530-a. Additionally, antenna element 1505-b may pass a second signal through diplexer 1510-b to LNA 1515-b, which may pass the amplified second signal to first Butler matrix network 1530-a. In some cases the transmissions received at antenna elements 1505 and retransmitted from antenna elements 1560 may have a first frequency (e.g., a downlink frequency in FDD transmissions), and the transmissions received at antenna elements 1560 and retransmitted from antenna elements 1505 may have a second frequency (e.g., an uplink frequency in FDD transmission). In this case, the transmissions received at antenna elements 1505 may be passed through unidirectional M×N matrix that includes the first Butler matrix network 1530-a, a first RF switching network 1540-a, and a second Butler matrix network 1530-b. Likewise, the transmissions received at antenna elements 1505 may be passed through diplexers 1510, LNAs 1515, and unidirectional N×M matrix that includes a third Butler matrix network 1530-c, a second RF switching network 1540-b, and a fourth Butler matrix network 1530-d. In some cases, beamforming parameters of the Butler matrix networks 1530 and RF switching networks 1540 may be controlled by a beam controller. The outputs of the unidirectional M×N matrix 1550 may each be provided to PA driver and VGA 1520, PA 1525, and diplexer 1510, for transmission via antenna elements 1560. Likewise, the outputs of the unidirectional N×M matrix 1555 may each be provided to PA driver and VGA 1520, PA 1525, and diplexer 1510, for transmission via antenna elements 1505.

The LNAs 1515, PA drivers and VGAs 1520 and PAs 1525 may apply gains to signals that pass through. In some cases, gains may be provided by a gain controller that may receive gain information from a beam controller, from a control link, or combinations thereof.

Figure 16:
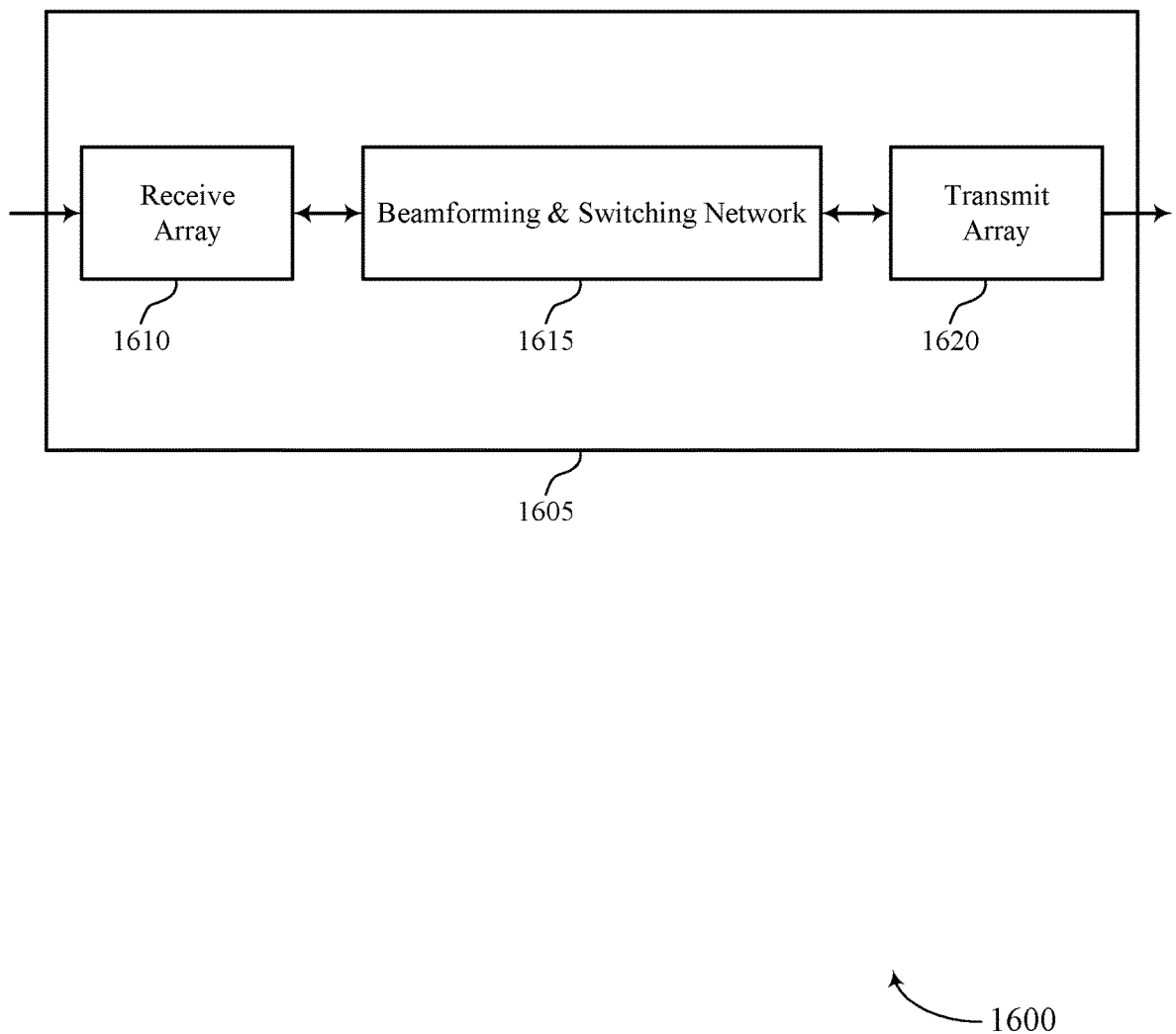
FIGS. 16 and 17 show block diagrams of devices that support RF-domain beamforming techniques in accordance with aspects of the present disclosure.

FIG. 16 shows a block diagram 1600 of a device 1605 that supports RF-domain beamforming router in accordance with aspects of the present disclosure. The device 1605 may be an example of aspects of a device as described herein. The device 1605 may include a receive array 1610, a beamforming and switching network 1615, and a transmit array 1620. The device 1605 may also include a processor. Each of these components may be in communication with one another (e.g., via one or more buses).

The receive array 1610 may include a number of antenna elements and may receive signals from one or more transmitters using beamformed communications. Signals may be passed on to other components of the device 1605. The receive array 1610 may be an example of aspects of the receive array described with reference to FIGS. 2 through 15.

The beamforming and switching network 1615 may configure a first beamforming network to receive one or more receive beams of a set of receive beams, a second beamforming network to transmit one or more transmit beams of a set of transmit beams, and a switching network coupled between the first beamforming network and the second beamforming network to route signals between the first beamforming network and the second beamforming network based on a mapping of the one or more receive beams to the one or more transmit beams. The device 1605 may receive, at two or more antenna elements of the receive array 1610 (which may be referred to as a first antenna array), one or more beamformed transmissions associated with the one or more receive beams, feed received signals at each of the two or more antenna elements into corresponding inputs of the first beamforming network, switch, at the switching network, one or more outputs of a set of outputs of the first beamforming network to be coupled with one or more inputs of a set of inputs of the second beamforming network based on the mapping of the one or more receive beams to the one or more transmit beams, and transmit, using two or more antenna elements of the transmit array 1620 (which may be referred to as a second antenna array) coupled with corresponding outputs of the second beamforming network, the one or more transmit beams. The beamforming and switching network 1615 may be an example of aspects of the RF-domain beamforming routers as described herein.

The transmit array 1620 may transmit signals generated by other components of the device 1605. In some examples, the transmit array 1620 may be collocated with the receive array 1610 in a dual-polarity antenna array configuration. The transmit array 1620 may be an example of aspects of the receive array described with reference to FIGS. 2 through 15.

Figure 17:
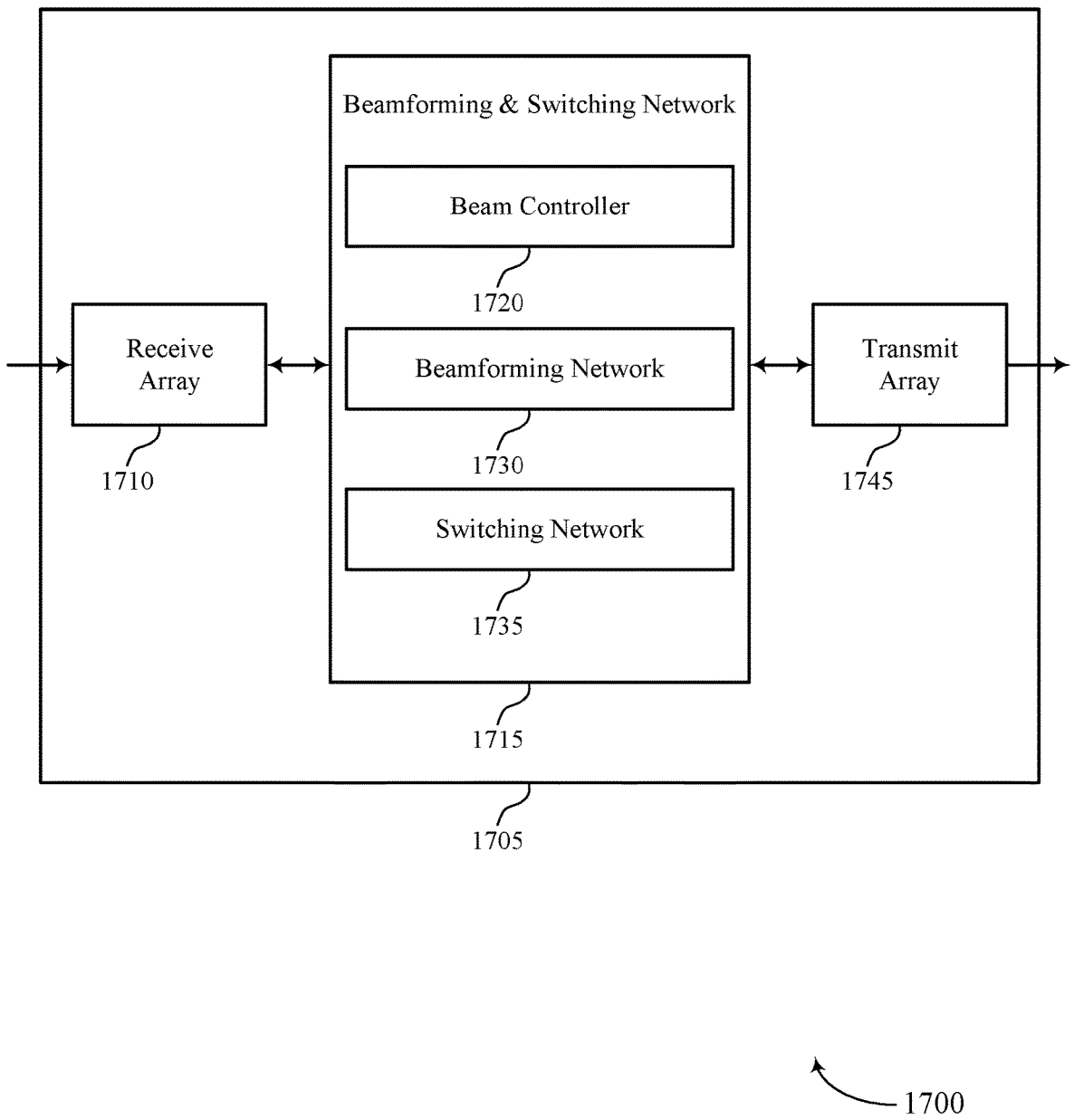

FIG. 17 shows a block diagram 1700 of a device 1705 that supports RF-domain beamforming router in accordance with aspects of the present disclosure. The device 1705 may be an example of aspects of a device 1605 or a router as described herein with reference to FIGS. 2 through 15. The device 1705 may include a receive array 1710, a beamforming and switching network 1715, and a transmit array 1745. The device 1705 may also include a processor. Each of these components may be in communication with one another (e.g., via one or more buses).

The receive array 1710 may include a number of antenna elements and may receive signals from one or more transmitters using beamformed communications. Signals may be passed on to other components of the device 1705. The receive array 1705 may receive, at two or more antenna elements of the antenna array (which may be a first antenna array), one or more beamformed transmissions associated with the one or more receive beams. The receive array 1710 may be an example of aspects of the receive array described with reference to FIGS. 2 through 15.

The beamforming and switching network 1715 may be an example of aspects of the beamforming and switching network 1615 as described herein. The beamforming and switching network 1715 may include a beam controller 1720, a beamforming network 1730, and a switching network 1735.

The beam controller 1720 may configure a first beamforming network to receive one or more receive beams of a set of receive beams, a second beamforming network to transmit one or more transmit beams of a set of transmit beams, and a switching network coupled between the first beamforming network and the second beamforming network to route signals between the first beamforming network and the second beamforming network based on a mapping of the one or more receive beams to the one or more transmit beams.

The beamforming network 1730 may receive signals from each of the two or more antenna elements that are fed into corresponding inputs of the first beamforming network.

The switching network 1735 may switch one or more outputs of a set of outputs of the first beamforming network to be coupled with one or more inputs of a set of inputs of the second beamforming network based on the mapping of the one or more receive beams to the one or more transmit beams.

The transmit array 1745 may transmit signals generated by other components of the device 1705. The transmit array 1745 may transmit, using two or more antenna elements of a second antenna array coupled with corresponding outputs of the second beamforming network, the one or more transmit beams. In some examples, the transmit array 1720 may be collocated with the receive array 1710 in a dual-polarity antenna array configuration. The transmit array 1720 may be an example of aspects of the receive array described with reference to FIGS. 2 through 15.

Figure 18:
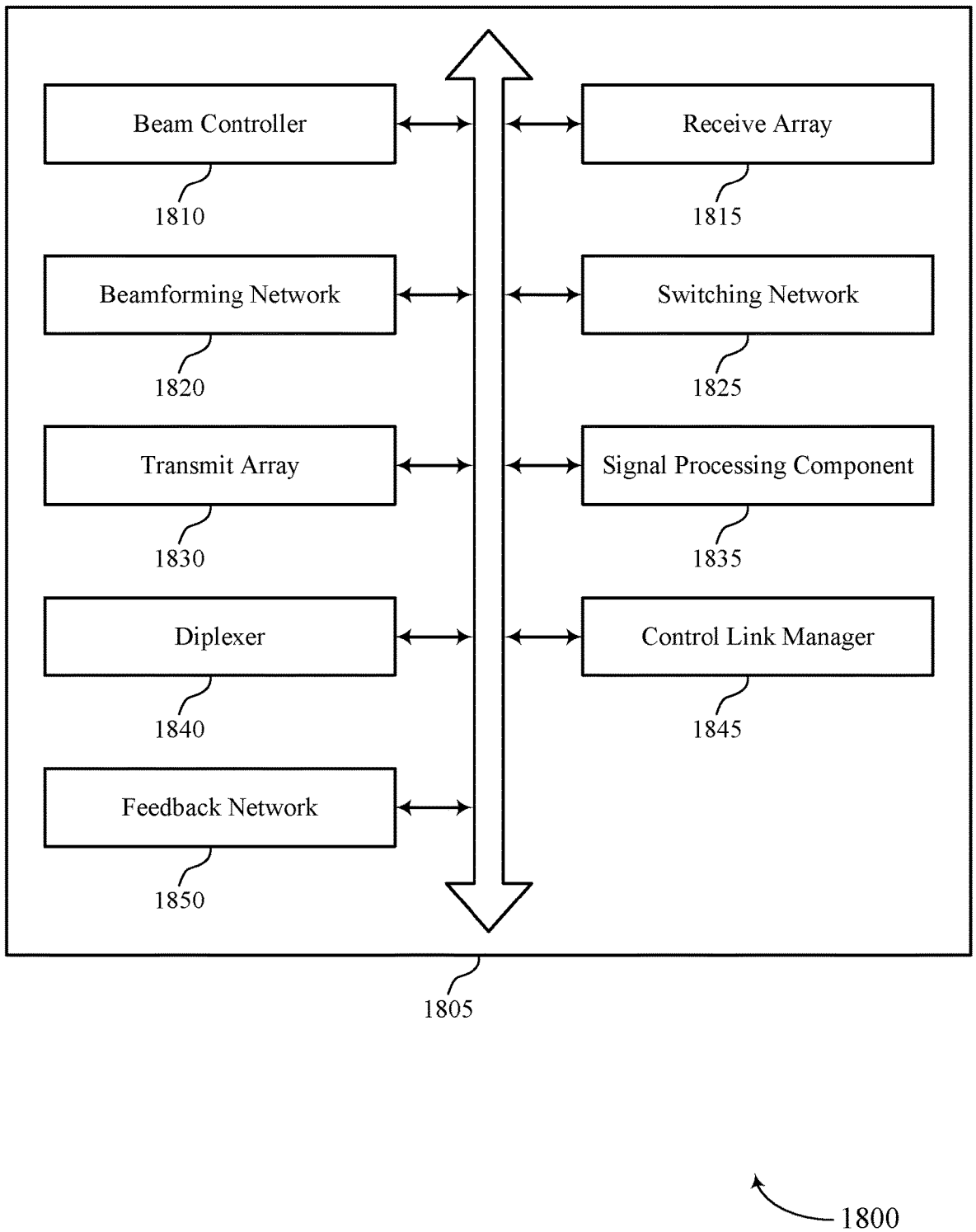
FIG. 18 shows a block diagram of a controller that supports RF-domain beamforming techniques in accordance with aspects of the present disclosure.

FIG. 18 shows a block diagram 1800 of a device 1805 that supports RF-domain beamforming router in accordance with aspects of the present disclosure. The device 1805 may be an example of aspects of a device 1605, a device 1705, or a RF-domain beamforming router as discussed with respect to FIGS. 2 through 15. The device 1805 may include a beam controller 1810, a receive array 1815, a beamforming network 1820 (which may include a first beamforming network such as a first Butler matrix and a second beamforming network such as a second Butler matrix), a switching network 1825, a transmit array 1830, a signal processing component 1835, an optional diplexer 1840, a control link manager 1845, and a feedback network 1850. Each of these modules may communicate, directly or indirectly, with one another (e.g., via one or more buses).

The beam controller 1810 may configure a first beamforming network to receive one or more receive beams of a set of receive beams, a second beamforming network to transmit one or more transmit beams of a set of transmit beams, and a switching network coupled between the first beamforming network and the second beamforming network to route signals between the first beamforming network and the second beamforming network based on a mapping of the one or more receive beams to the one or more transmit beams.

In some examples, the beam controller 1810 may determine a first receive beam of the set of receive beams to be repeated via a first transmit beam of the set of transmit beams, where the first receive beam is associated with a first output of the set of outputs of the first beamforming network and the first transmit beam is associated with a first input of the set of inputs of the second beamforming network.

In some examples, the beam controller 1810 may configure the switching network to route signals from the first output of the first beamforming network to the first input of the second beamforming network based on the mapping of the first receive beam to the first transmit beam. In some examples, the beam controller 1810 may determine a first receive beam of the set of receive beams to be repeated via two or more transmit beams of the set of transmit beams, where the first receive beam is associated with a first output of the set of outputs of the first beamforming network and the two or more transmit beams are associated with two or more inputs of the set of inputs of the second beamforming network. In some examples, the beam controller 1810 may configure the switching network to route signals from the first output of the first beamforming network to the two or more inputs of the second beamforming network based on the mapping of the first receive beam to the two or more transmit beams.

In some examples, the beam controller 1810 may determine a first set of beams that includes two or more receive beams of the set of receive beams to be repeated via a second set of beams that includes two or more transmit beams of the set of transmit beams, where each beam of the first set of beams is associated with a corresponding output of a first output set of the set of outputs of the first beamforming network and each beam of the second set of beams is associated with a corresponding input of a first input set the set of inputs of the second beamforming network. In some examples, the beam controller 1810 may configure the switching network to route signals from the first output set of the first beamforming network to the first input set of the second beamforming network based on the mapping of the first set of beams to the second set of beams.

In some cases, the set receive beams have beamforming parameters that correspond to a first set of beams that can be transmitted or received via the first antenna array and the first beamforming network. In some cases, the set transmit beams have beamforming parameters that correspond to a second set of beams that can be transmitted or received via the second antenna array and the second beamforming network. In some cases, the set receive beams have beamforming parameters that correspond to the first set of beams that can be transmitted or received via the first antenna array and the first beamforming network. In some cases, the set transmit beams have beamforming parameters that correspond to the second set of beams that can be transmitted or received via the second antenna array and the second beamforming network.

The receive array 1815 may receive, at two or more antenna elements of a first antenna array, one or more beamformed transmissions associated with the one or more receive beams. In some examples, the receive array 1815 may receive, at two or more antenna elements of the second antenna array, a second signal at a second frequency of the FDD system. In some cases, the first antenna array includes an dual-polarized antenna array functioning in a first polarization and the second antenna array includes the dual-polarized antenna array functioning in a second polarization.

The beamforming network 1820 may feed received signals at each of the two or more antenna elements into corresponding inputs of the first beamforming network. In some examples, the beamforming network 1820 may feed the received second signal into corresponding inputs of a third beamforming network associated with a second transmission path at the second frequency of the FDD system. In some cases, the first beamforming network and the second beamforming network are each based on a Butler matrix. In some cases, the wireless router is a bidirectional wireless router.

In some cases, the first beamforming network, switching network, and the second beamforming network are associated with a first transmission path at a first frequency of a FDD system; and where the method further includes.

In some cases, one or more components of the wireless router, including one or more of the first antenna array, the second antenna array, one or more switches, one or more couplers, one or more combiners, one or more splitters, one or more filters, one or more phase-shifters, one or more connecting elements, or any combinations thereof, include a meta-material or a material with tunable permittivity and permeability.

The switching network 1825 may switch, at the switching network, one or more outputs of a set of outputs of the first beamforming network to be coupled with one or more inputs of a set of inputs of the second beamforming network based on the mapping of the one or more receive beams to the one or more transmit beams.

In some cases, the switching network 1825 includes a single-pole-N-throw (SPNT) switch coupled between the set of outputs of the first beamforming network and a variable gain amplifier that is coupled with a power divider that divides the output of the variable gain amplifier among the set of inputs of the second beamforming network.

In some examples, the switching network 1825 switches a DPDT switch that is coupled between a first single-pole-N-throw (SPNT) switch associated with the first beamforming network and a second SPNT switch associated with the second beamforming network to toggle the first antenna array from a transmit configuration to a receive configuration and the second antenna array from the receive configuration to the transmit configuration.

In some examples, the switching network 1825 switches a DPDT switch that is coupled between a single-pole-N-throw (SPNT) switch associated with the first beamforming network and a power divider/combiner of the second beamforming network to toggle the first antenna array from a transmit configuration to a receive configuration and the second antenna array from the receive configuration to the transmit configuration.

In some examples, the switching network 1825 may switch, based on the mapping of the first set of beams to the second set of beams, a set of SPST switches, each SPST switch coupled with a divided output signal of one of the set of power dividers, where the switching couples the divided output signals with a set of inputs of a set of power combiners, each power combiner being associated with a corresponding input of the set of inputs of the second beamforming network.

In some examples, the switching network 1825 may route an output of each of the set of power combiners to an associated input of the set of inputs of the second beamforming network.

In some examples, the switching network 1825 may switch a first set of transmit/receive amplification paths between antenna elements of the first antenna array and the first beamforming network based on whether the first set of beams are being transmitted or received using the first antenna array, and switching a second set of transmit/receive amplification paths between antenna elements of the second antenna array and the second beamforming network based on whether the second set of beams are being transmitted or received using the second antenna array.

In some examples, the switching network 1825 may switch, at a second switching network associated with the second transmission path at the second frequency of the FDD system, one or more outputs of the third beamforming network to be coupled with one or more inputs of a fourth beamforming network associated with the second transmission path at the second frequency of the FDD system, where the switching is based on the mapping of the one or more receive beams to the one or more transmit beams.

In some cases, the switching network includes a first single-pole-N-throw (SPNT) switch coupled between the set of outputs of the first beamforming network and a variable gain amplifier, and a second SPNT switch coupled between the variable gain amplifier and the set of inputs of the second beamforming network.

In some cases, the switching the DPDT switch changes signal path through a LNA, a PA driver, and a PA to flow from the first SPNT switch to the second SNPT switch or from the second SPNT switch to the first SPNT switch. In some cases, the switching the DPDT switch occurs during a guard period between a first TDD period and a second TDD period. In some cases, the switching the DPDT switch changes signal path through a LNA, a PA driver, and a PA to flow from the SPNT switch to the power divider/combiner or from the power divider/combiner to the SPNT switch. In some cases, the switching the first set of transmit/receive amplification paths and the second set of transmit/receive amplification paths occurs during a guard period between a first time domain duplexing (TDD) period and a second TDD period.

The transmit array 1830 may transmit, using two or more antenna elements of a second antenna array coupled with corresponding outputs of the second beamforming network, the one or more transmit beams. In some examples, the transmit array 1830 may transmit, using two or more antenna elements of the second antenna array coupled with corresponding outputs of the fourth beamforming network, the second signal at the second frequency of the FDD system.

The signal processing component 1835 include a PA driver and a PA coupled between each of the two or more antenna elements of the second antenna array and an associated output of the second beamforming network. In some examples, the signal processing component 1835 may divide, at a set of power dividers that are associated with each output of the set of outputs of the first beamforming network, each output signal of the first output set into a first number of outputs that correspond to a second number of inputs of the set of inputs of the second beamforming network. In some examples, the signal processing component 1835 may combine, at the set of power combiners, received output signals from a set of SPST switches, where each SPST switch of the set of SPST switches is associated with a corresponding output of the first output set.

In some cases, the first beamforming network includes a LNA coupled between each of the two or more antenna elements of the first antenna array and an associated input of the first beamforming network.

In some cases, the switching the first set of transmit/receive amplification paths and the second set of transmit/receive amplification paths occurs concurrently at a duplexer or circulator component to route received signals at each antenna element to a LNA and to concurrently route signals to be transmitted at each antenna element to a PA driver and PA, and where the switching provides full-duplex routing of transmitted and received signals.

In some cases, the first beamforming network includes a first LNA coupled between each of the two or more antenna elements of the first antenna array and an associated input of the first beamforming network. In some cases, the second beamforming network includes a first PA driver and a first PA coupled between each of the two or more antenna elements of the second antenna array and an associated output of the second beamforming network. In some cases, the third beamforming network includes a second LNA coupled between each of the two or more antenna elements of the second antenna array and an associated input of the third beamforming network. In some cases, the fourth beamforming network includes a second PA driver and a second PA coupled between each of the two or more antenna elements of the first antenna array and an associated output of the fourth beamforming network.

The diplexer 1840 may route signals received at the first antenna array at the first frequency of the FDD system to the first beamforming network and routes signals provided from the fourth beamforming network to the first antenna array. In some cases, a second diplexer routes signals received at the second antenna array at the second frequency of the FDD system to the third beamforming network and routes signals provided from the second beamforming network to the second antenna array.

The control link manager 1845 may establish a control link with a controller of the wireless router, the control link being separate from the one or more receive beams or the one or more transmit beams. In some examples, the control link manager 1845 may receive, via the control link, one or more of first beamforming parameters for the first beamforming network, second beamforming parameters for the second beamforming network, mapping information between the one or more receive beams and the one or more transmit beams, or any combinations thereof.

The feedback network 1850 may monitor an output of at least one PA associated with the second beamforming network and the second antenna array. In some examples, the feedback network 1850 may adjust, based on the output, one or more of a gain of the at least one PA or a gain of at least one LNA coupled with the first antenna array.

Figure 19:
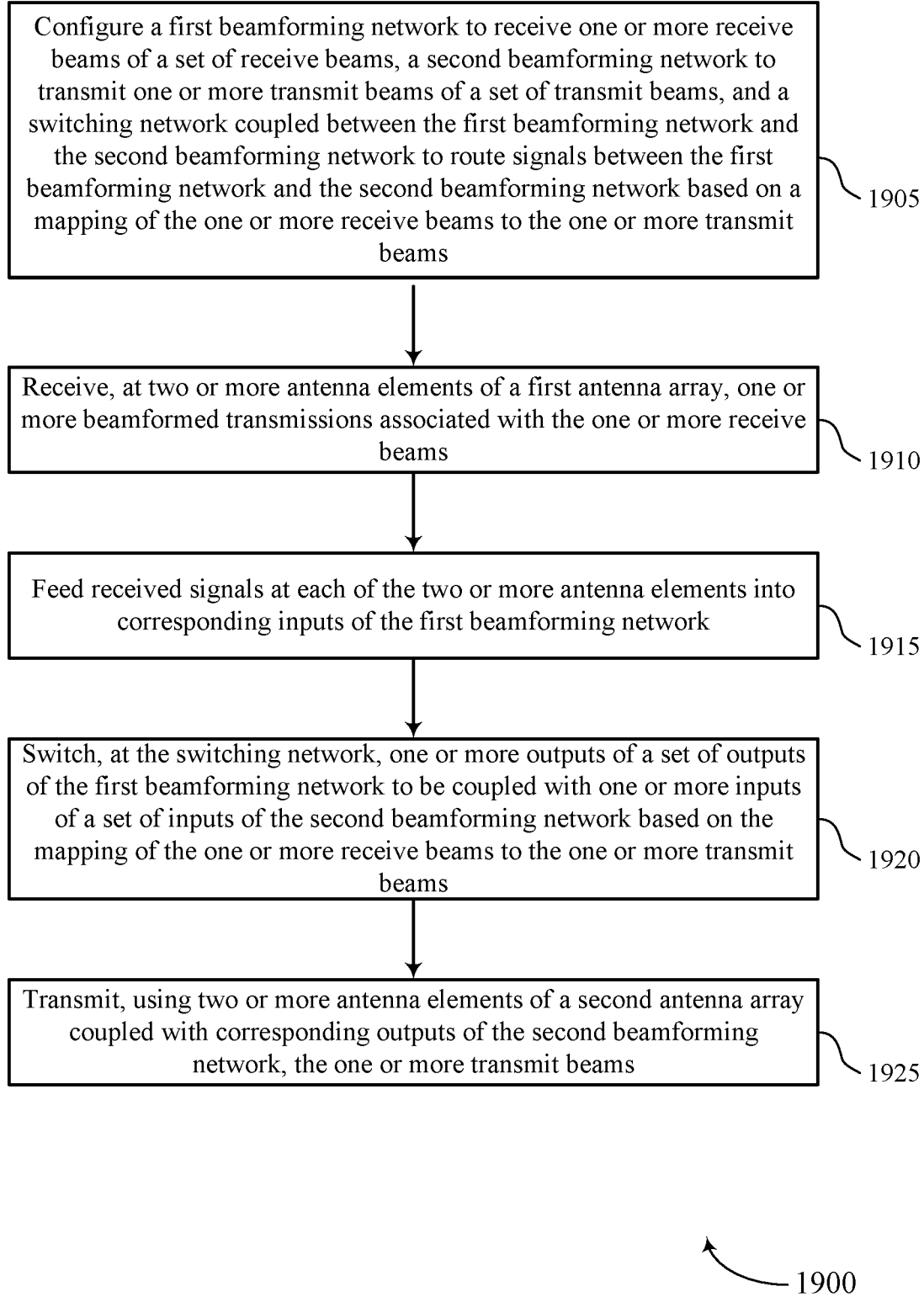
FIGS. 19 through 23 show flowcharts illustrating methods of RF-domain beamforming techniques in accordance with aspects of the present disclosure.

FIG. 19 shows a flowchart illustrating a method 1900 that supports RF-domain beamforming router in accordance with aspects of the present disclosure. The operations of method 1900 may be implemented by a router or its components as described herein. For example, the operations of method 1900 may be performed by a router as described with reference to FIGS. 2 through 18. In some examples, a device may execute a set of instructions to control the functional elements of the device to perform the functions described below. Additionally or alternatively, a device may perform aspects of the functions described below using special-purpose hardware.

At 1905, the device may configure a first beamforming network to receive one or more receive beams of a set of receive beams, a second beamforming network to transmit one or more transmit beams of a set of transmit beams, and a switching network coupled between the first beamforming network and the second beamforming network to route signals between the first beamforming network and the second beamforming network based on a mapping of the one or more receive beams to the one or more transmit beams. The operations of 1905 may be performed according to the methods described herein. In some examples, aspects of the operations of 1905 may be performed by a beam controller as described with reference to FIGS. 16 through 18.

At 1910, the device may receive, at two or more antenna elements of a first antenna array, one or more beamformed transmissions associated with the one or more receive beams. The operations of 1910 may be performed according to the methods described herein. In some examples, aspects of the operations of 1910 may be performed by a receive array as described with reference to FIGS. 16 through 18.

At 1915, the device may feed received signals at each of the two or more antenna elements into corresponding inputs of the first beamforming network. The operations of 1915 may be performed according to the methods described herein. In some examples, aspects of the operations of 1915 may be performed by a beamforming network as described with reference to FIGS. 16 through 18.

At 1920, the device may switch one or more outputs of a set of outputs of the first beamforming network to be coupled with one or more inputs of a set of inputs of the second beamforming network based on the mapping of the one or more receive beams to the one or more transmit beams. The operations of 1920 may be performed according to the methods described herein. In some examples, aspects of the operations of 1920 may be performed by a switching network as described with reference to FIGS. 16 through 18.

At 1925, the device may transmit, using two or more antenna elements of a second antenna array coupled with corresponding outputs of the second beamforming network, the one or more transmit beams. The operations of 1925 may be performed according to the methods described herein. In some examples, aspects of the operations of 1925 may be performed by a transmit array as described with reference to FIGS. 16 through 18.

Figure 20:
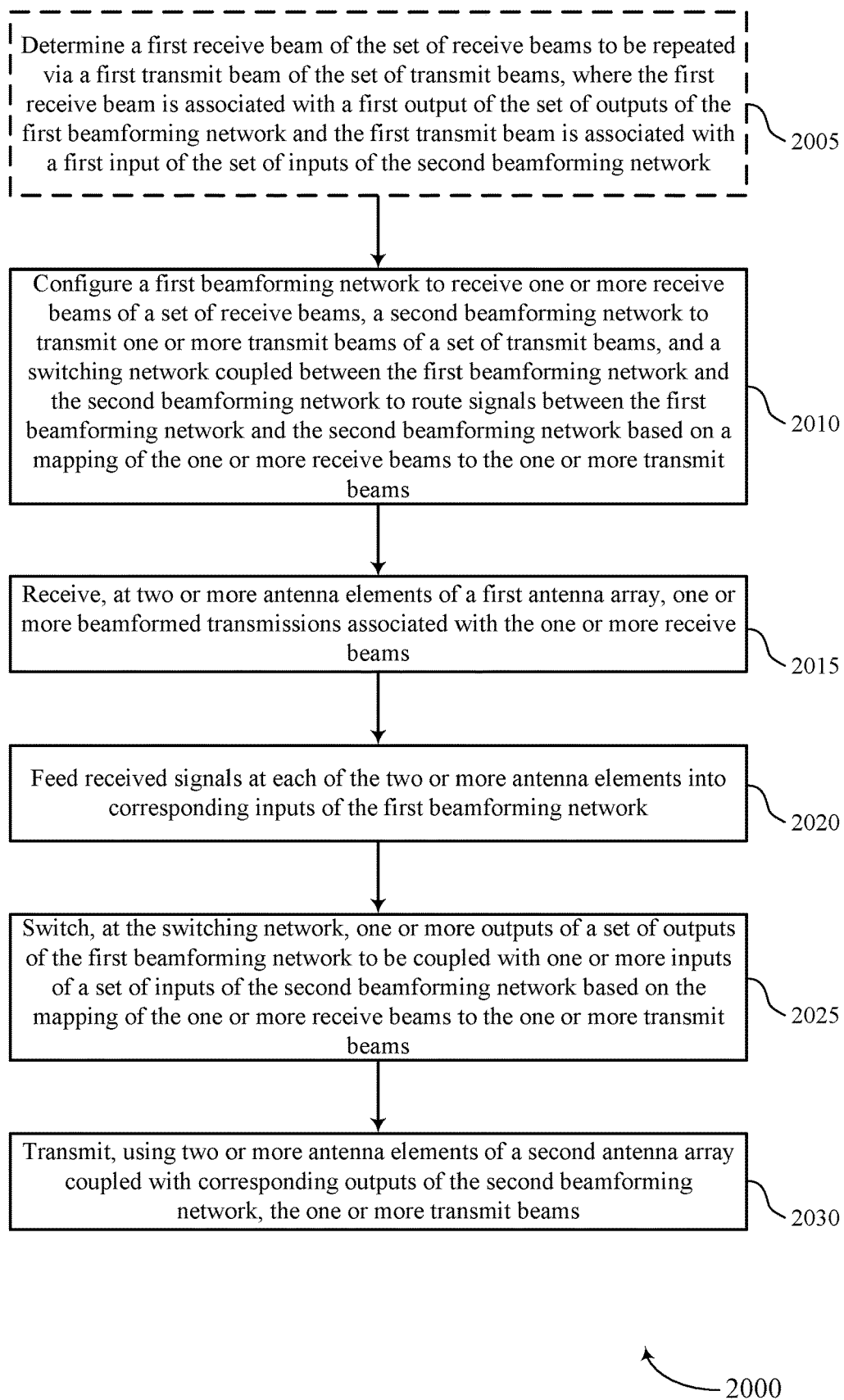

FIG. 20 shows a flowchart illustrating a method 2000 that supports RF-domain beamforming router in accordance with aspects of the present disclosure. The operations of method 2000 may be implemented by a device or its components as described herein. For example, the operations of method 2000 may be performed by a router as described with reference to FIGS. 2 through 18. In some examples, a device may execute a set of instructions to control the functional elements of the device to perform the functions described below. Additionally or alternatively, a device may perform aspects of the functions described below using special-purpose hardware.

At 2005, the device may optionally determine a first receive beam of the set of receive beams to be repeated via a first transmit beam of the set of transmit beams, where the first receive beam is associated with a first output of the set of outputs of the first beamforming network and the first transmit beam is associated with a first input of the set of inputs of the second beamforming network. The operations of 2005 may be performed according to the methods described herein. In some examples, aspects of the operations of 2005 may be performed by a beam controller as described with reference to FIGS. 16 through 18.

At 2010, the device may configure a first beamforming network to receive one or more receive beams of a set of receive beams, a second beamforming network to transmit one or more transmit beams of a set of transmit beams, and a switching network coupled between the first beamforming network and the second beamforming network to route signals between the first beamforming network and the second beamforming network based on a mapping of the one or more receive beams to the one or more transmit beams. The operations of 2010 may be performed according to the methods described herein. In some examples, aspects of the operations of 2010 may be performed by a beam controller as described with reference to FIGS. 16 through 18. In some cases, the configuring further includes configuring the switching network to route signals from the first output of the first beamforming network to the first input of the second beamforming network based on the mapping of the first receive beam to the first transmit beam.

At 2015, the device may receive, at two or more antenna elements of a first antenna array, one or more beamformed transmissions associated with the one or more receive beams. The operations of 2015 may be performed according to the methods described herein. In some examples, aspects of the operations of 2015 may be performed by a receive array as described with reference to FIGS. 16 through 18.

At 2020, the device may feed received signals at each of the two or more antenna elements into corresponding inputs of the first beamforming network. The operations of 2020 may be performed according to the methods described herein. In some examples, aspects of the operations of 2020 may be performed by a beamforming network as described with reference to FIGS. 16 through 18.

At 2025, the device may switch one or more outputs of a set of outputs of the first beamforming network to be coupled with one or more inputs of a set of inputs of the second beamforming network based on the mapping of the one or more receive beams to the one or more transmit beams. The operations of 2025 may be performed according to the methods described herein. In some examples, aspects of the operations of 2025 may be performed by a switching network as described with reference to FIGS. 16 through 18.

At 2030, the device may transmit, using two or more antenna elements of a second antenna array coupled with corresponding outputs of the second beamforming network, the one or more transmit beams. The operations of 2030 may be performed according to the methods described herein. In some examples, aspects of the operations of 2030 may be performed by a transmit array as described with reference to FIGS. 16 through 18.

Figure 21:
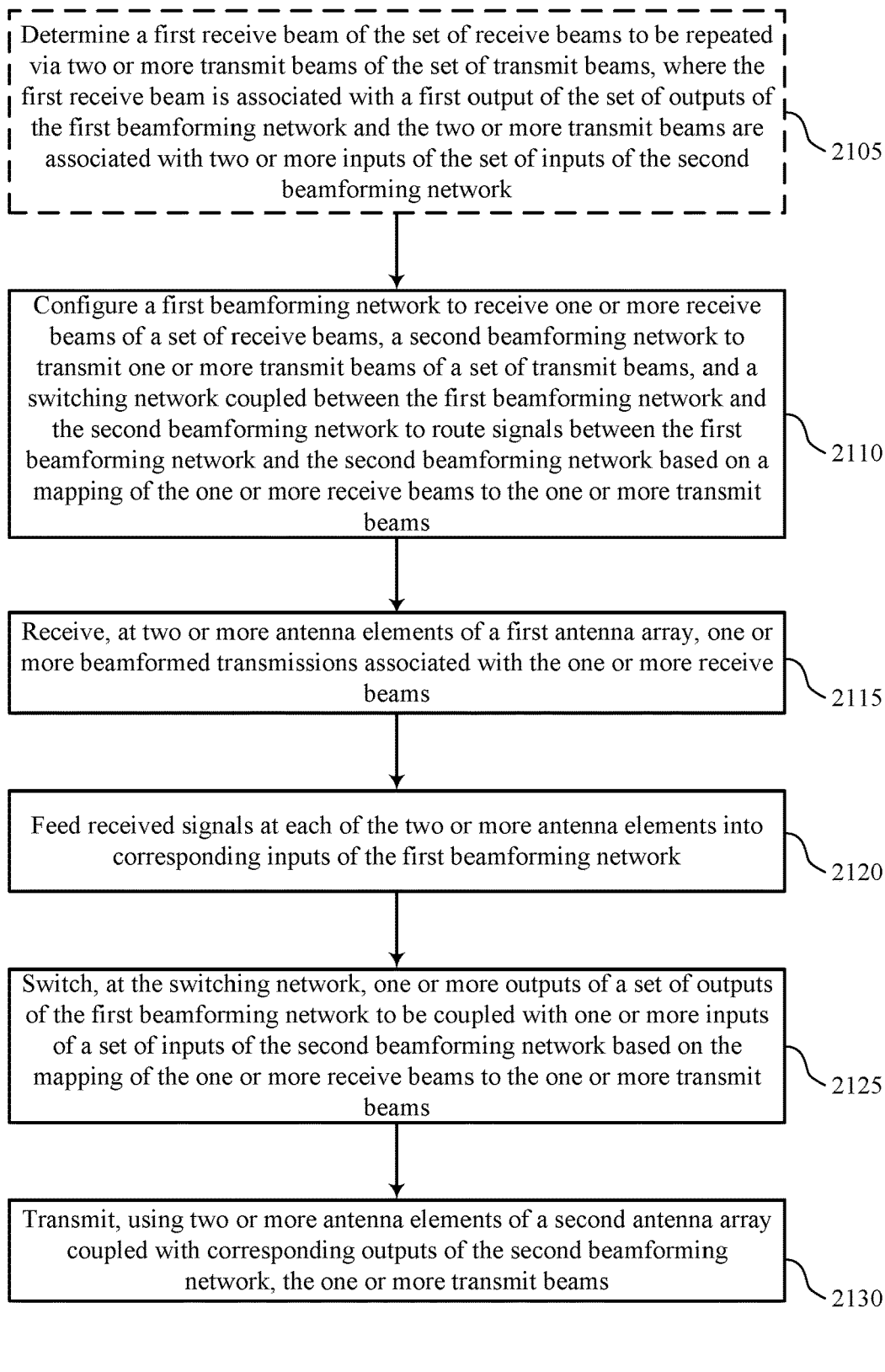

FIG. 21 shows a flowchart illustrating a method 2100 that supports RF-domain beamforming router in accordance with aspects of the present disclosure. The operations of method 2100 may be implemented by a device or its components as described herein. For example, the operations of method 2100 may be performed by a controller as described with reference to FIGS. 2 through 18. In some examples, a device may execute a set of instructions to control the functional elements of the device to perform the functions described below. Additionally or alternatively, a device may perform aspects of the functions described below using special-purpose hardware.

At 2105, the device may optionally determine a first receive beam of the set of receive beams to be repeated via two or more transmit beams of the set of transmit beams, where the first receive beam is associated with a first output of the set of outputs of the first beamforming network and the two or more transmit beams are associated with two or more inputs of the set of inputs of the second beamforming network. The operations of 2105 may be performed according to the methods described herein. In some examples, aspects of the operations of 2105 may be performed by a beam controller as described with reference to FIGS. 16 through 18.

At 2110, the device may configure a first beamforming network to receive one or more receive beams of a set of receive beams, a second beamforming network to transmit one or more transmit beams of a set of transmit beams, and a switching network coupled between the first beamforming network and the second beamforming network to route signals between the first beamforming network and the second beamforming network based on a mapping of the one or more receive beams to the one or more transmit beams. The operations of 2110 may be performed according to the methods described herein. In some examples, aspects of the operations of 2110 may be performed by a beam controller as described with reference to FIGS. 16 through 18. In some cases, the configuring further includes configuring the switching network to route signals from the first output of the first beamforming network to the two or more inputs of the second beamforming network based on the mapping of the first receive beam to the two or more transmit beams.

At 2115, the device may receive, at two or more antenna elements of a first antenna array, one or more beamformed transmissions associated with the one or more receive beams. The operations of 2115 may be performed according to the methods described herein. In some examples, aspects of the operations of 2115 may be performed by a receive array as described with reference to FIGS. 16 through 18.

At 2120, the device may feed received signals at each of the two or more antenna elements into corresponding inputs of the first beamforming network. The operations of 2120 may be performed according to the methods described herein. In some examples, aspects of the operations of 2120 may be performed by a beamforming network as described with reference to FIGS. 16 through 18.

At 2125, the device may switch one or more outputs of a set of outputs of the first beamforming network to be coupled with one or more inputs of a set of inputs of the second beamforming network based on the mapping of the one or more receive beams to the one or more transmit beams. The operations of 2125 may be performed according to the methods described herein. In some examples, aspects of the operations of 2125 may be performed by a switching network as described with reference to FIGS. 16 through 18.

At 2130, the device may transmit, using two or more antenna elements of a second antenna array coupled with corresponding outputs of the second beamforming network, the one or more transmit beams. The operations of 2130 may be performed according to the methods described herein. In some examples, aspects of the operations of 2130 may be performed by a transmit array as described with reference to FIGS. 16 through 18.

Figure 22:
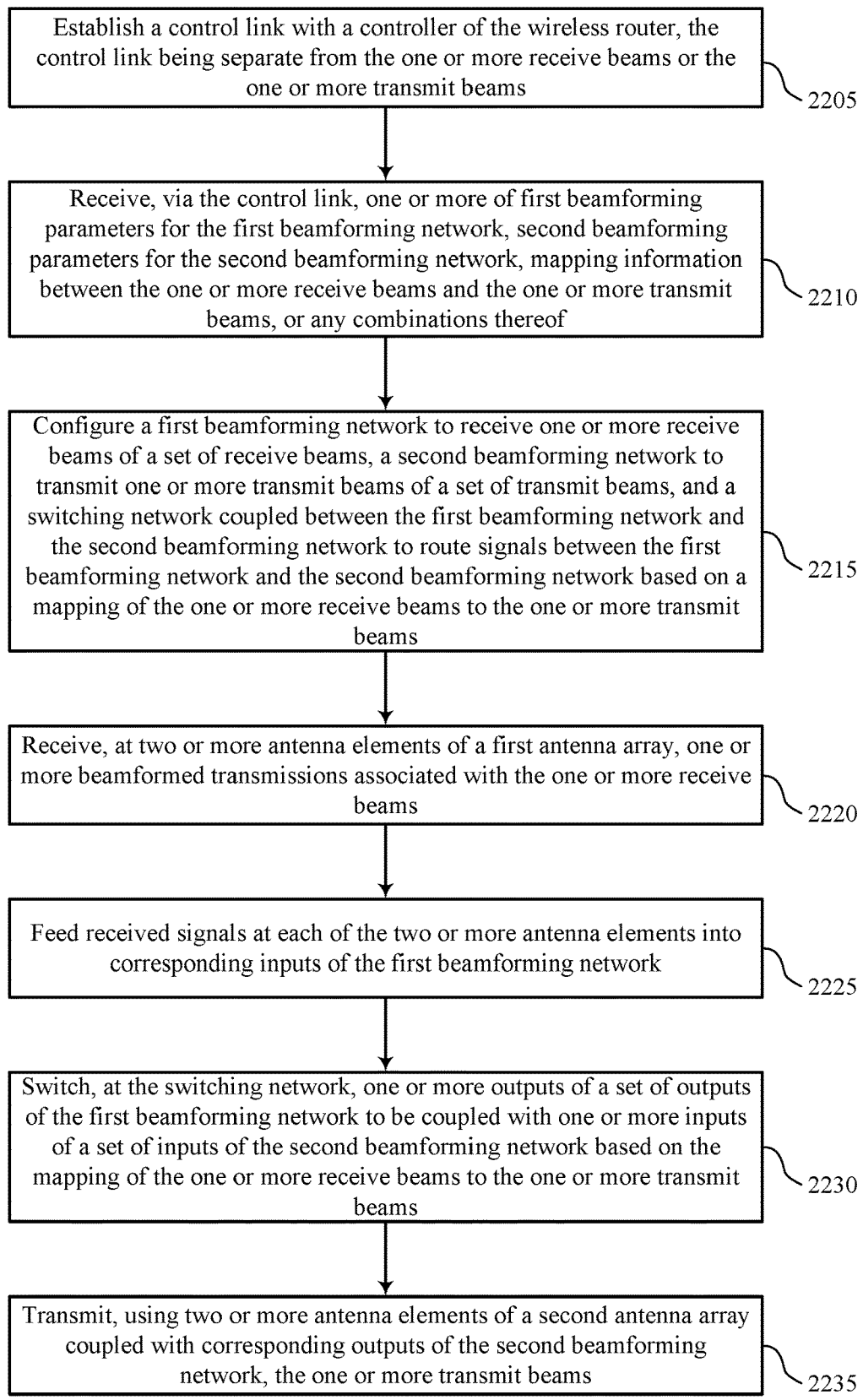

FIG. 22 shows a flowchart illustrating a method 2200 that supports RF-domain beamforming router in accordance with aspects of the present disclosure. The operations of method 2200 may be implemented by a device or its components as described herein. For example, the operations of method 2200 may be performed by a router as described with reference to FIGS. 2 through 18. In some examples, a device may execute a set of instructions to control the functional elements of the device to perform the functions described below. Additionally or alternatively, a device may perform aspects of the functions described below using special-purpose hardware.

At 2205, the device may establish a control link with a controller of the wireless router, the control link being separate from the one or more receive beams or the one or more transmit beams. The operations of 2205 may be performed according to the methods described herein. In some examples, aspects of the operations of 2205 may be performed by a control link manager as described with reference to FIGS. 16 through 18.

At 2210, the device may receive, via the control link, one or more of first beamforming parameters for the first beamforming network, second beamforming parameters for the second beamforming network, mapping information between the one or more receive beams and the one or more transmit beams, or any combinations thereof. The operations of 2210 may be performed according to the methods described herein. In some examples, aspects of the operations of 2210 may be performed by a control link manager as described with reference to FIGS. 16 through 18.

At 2215, the device may configure a first beamforming network to receive one or more receive beams of a set of receive beams, a second beamforming network to transmit one or more transmit beams of a set of transmit beams, and a switching network coupled between the first beamforming network and the second beamforming network to route signals between the first beamforming network and the second beamforming network based on a mapping of the one or more receive beams to the one or more transmit beams. The operations of 2215 may be performed according to the methods described herein. In some examples, aspects of the operations of 2215 may be performed by a beam controller as described with reference to FIGS. 16 through 18.

At 2220, the device may receive, at two or more antenna elements of a first antenna array, one or more beamformed transmissions associated with the one or more receive beams. The operations of 2220 may be performed according to the methods described herein. In some examples, aspects of the operations of 2220 may be performed by a receive array as described with reference to FIGS. 16 through 18.

At 2225, the device may feed received signals at each of the two or more antenna elements into corresponding inputs of the first beamforming network. The operations of 2225 may be performed according to the methods described herein. In some examples, aspects of the operations of 2225 may be performed by a beamforming network as described with reference to FIGS. 16 through 18.

At 2230, the device may switch one or more outputs of a set of outputs of the first beamforming network to be coupled with one or more inputs of a set of inputs of the second beamforming network based on the mapping of the one or more receive beams to the one or more transmit beams. The operations of 2230 may be performed according to the methods described herein. In some examples, aspects of the operations of 2230 may be performed by a switching network as described with reference to FIGS. 16 through 18.

At 2235, the device may transmit, using two or more antenna elements of a second antenna array coupled with corresponding outputs of the second beamforming network, the one or more transmit beams. The operations of 2235 may be performed according to the methods described herein. In some examples, aspects of the operations of 2235 may be performed by a transmit array as described with reference to FIGS. 16 through 18.

Figure 23:
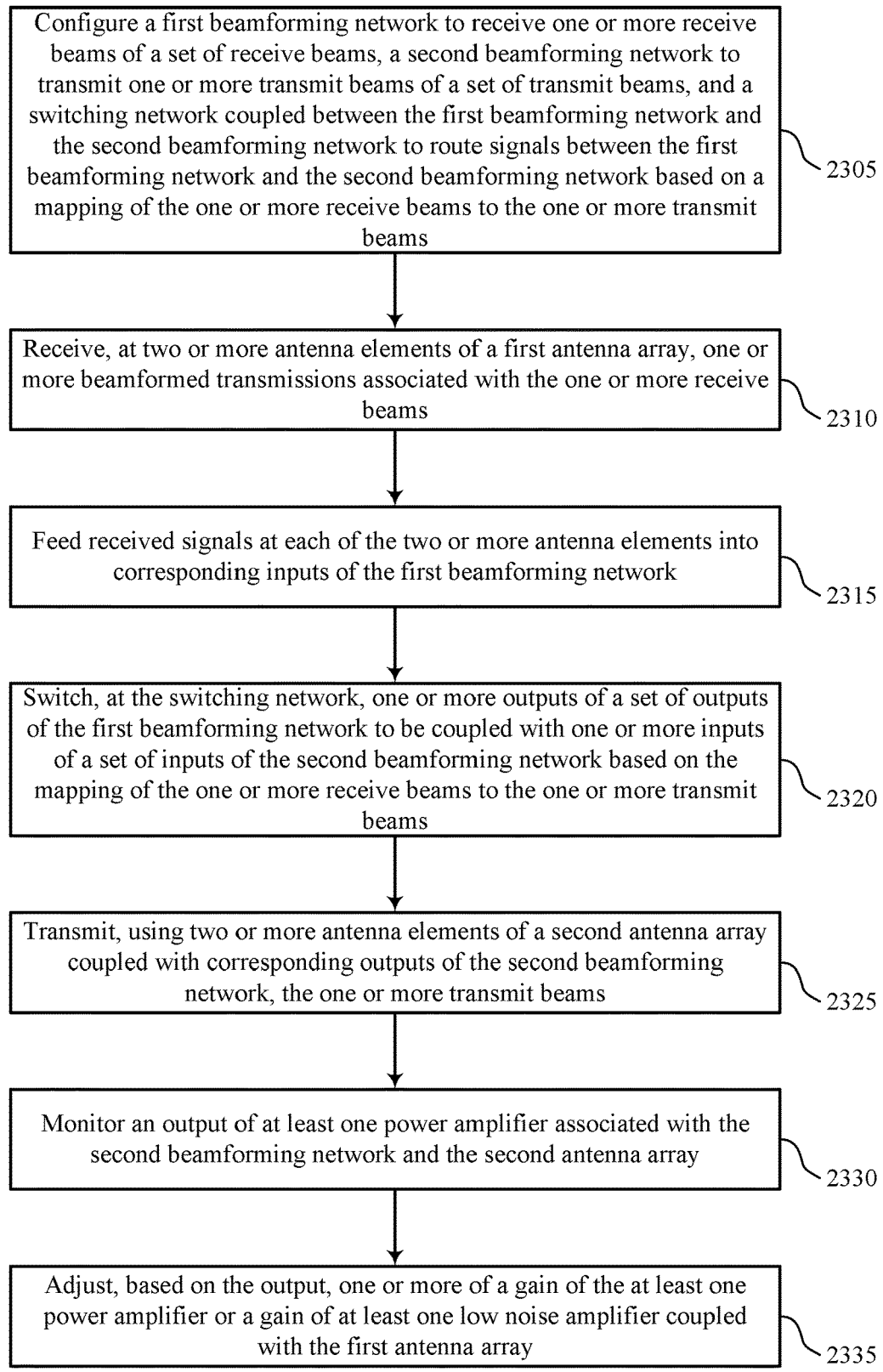

FIG. 23 shows a flowchart illustrating a method 2300 that supports RF-domain beamforming router in accordance with aspects of the present disclosure. The operations of method 2300 may be implemented by a device or its components as described herein. For example, the operations of method 2300 may be performed by a router as described with reference to FIGS. 2 through 18. In some examples, a device may execute a set of instructions to control the functional elements of the device to perform the functions described below. Additionally or alternatively, a device may perform aspects of the functions described below using special-purpose hardware.

At 2305, the device may configure a first beamforming network to receive one or more receive beams of a set of receive beams, a second beamforming network to transmit one or more transmit beams of a set of transmit beams, and a switching network coupled between the first beamforming network and the second beamforming network to route signals between the first beamforming network and the second beamforming network based on a mapping of the one or more receive beams to the one or more transmit beams. The operations of 2305 may be performed according to the methods described herein. In some examples, aspects of the operations of 2305 may be performed by a beam controller as described with reference to FIGS. 16 through 18.

At 2310, the device may receive, at two or more antenna elements of a first antenna array, one or more beamformed transmissions associated with the one or more receive beams. The operations of 2310 may be performed according to the methods described herein. In some examples, aspects of the operations of 2310 may be performed by a receive array as described with reference to FIGS. 16 through 18.

At 2315, the device may feed received signals at each of the two or more antenna elements into corresponding inputs of the first beamforming network. The operations of 2315 may be performed according to the methods described herein. In some examples, aspects of the operations of 2315 may be performed by a beamforming network as described with reference to FIGS. 16 through 18.

At 2320, the device may switch, at the switching network, one or more outputs of a set of outputs of the first beamforming network to be coupled with one or more inputs of a set of inputs of the second beamforming network based on the mapping of the one or more receive beams to the one or more transmit beams. The operations of 2320 may be performed according to the methods described herein. In some examples, aspects of the operations of 2320 may be performed by a switching network as described with reference to FIGS. 16 through 18.

At 2325, the device may transmit, using two or more antenna elements of a second antenna array coupled with corresponding outputs of the second beamforming network, the one or more transmit beams. The operations of 2325 may be performed according to the methods described herein. In some examples, aspects of the operations of 2325 may be performed by a transmit array as described with reference to FIGS. 16 through 18.

At 2330, the device may monitor an output of at least one PA associated with the second beamforming network and the second antenna array. The operations of 2330 may be performed according to the methods described herein. In some examples, aspects of the operations of 2330 may be performed by a feedback network as described with reference to FIGS. 16 through 18.

At 2335, the device may adjust, based on the output, one or more of a gain of the at least one PA or a gain of at least one LNA coupled with the first antenna array. The operations of 2335 may be performed according to the methods described herein. In some examples, aspects of the operations of 2335 may be performed by a feedback network as described with reference to FIGS. 16 through 18.

It should be noted that the methods described herein describe possible implementations, and that the operations and the steps may be rearranged or otherwise modified and that other implementations are possible. Further, aspects from two or more of the methods may be combined.

The following provides an overview of examples of the present disclosure:

Example 1: A method for wireless communication at a wireless router, comprising: configuring a first beamforming network to receive one or more receive beams of a plurality of receive beams, a second beamforming network to transmit one or more transmit beams of a plurality of transmit beams, and a switching network coupled between the first beamforming network and the second beamforming network to route signals between the first beamforming network and the second beamforming network based at least in part on a mapping of the one or more receive beams to the one or more transmit beams; receiving, at two or more antenna elements of a first antenna array, one or more beamformed transmissions associated with the one or more receive beams; feeding received signals at each of the two or more antenna elements into corresponding inputs of the first beamforming network; switching, at the switching network, one or more outputs of a plurality of outputs of the first beamforming network to be coupled with one or more inputs of a plurality of inputs of the second beamforming network based at least in part on the mapping of the one or more receive beams to the one or more transmit beams; and transmitting, using two or more antenna elements of a second antenna array coupled with corresponding outputs of the second beamforming network, the one or more transmit beams.

Example 2: The method of example 1, wherein the first beamforming network and the second beamforming network are each based at least in part on a Butler matrix.

Example 3: The method of example 1 or 2, further comprising identifying a first receive beam of the plurality of receive beams to be repeated via a first transmit beam of the plurality of transmit beams, wherein the first receive beam is associated with a first output of the plurality of outputs of the first beamforming network and the first transmit beam is associated with a first input of the plurality of inputs of the second beamforming network.

Example 4: The method of any one of examples 1 through 3, wherein the configuring further comprises configuring the switching network to route signals from the first output of the first beamforming network to the first input of the second beamforming network based at least in part on the mapping of the first receive beam to the first transmit beam.

Example 5: The method of any one of examples 1 through 4, wherein the switching network comprises a SPNT switch coupled between the plurality of outputs of the first beamforming network and a variable gain amplifier, and a second SPNT switch coupled between the variable gain amplifier and the plurality of inputs of the second beamforming network.

Example 6: The method of any one of examples 1 through 5, wherein: the first beamforming network includes a low noise amplifier coupled between each of the two or more antenna elements of the first antenna array and an associated input of the first beamforming network; and the second beamforming network includes a power amplifier driver and a power amplifier coupled between each of the two or more antenna elements of the second antenna array and an associated output of the second beamforming network.

Example 7: The method of any one of examples 1 through 6, wherein: the wireless router is a bidirectional wireless router the plurality receive beams have beamforming parameters that correspond to a first set of beams that can be transmitted or received via the first antenna array and the first beamforming network; and the plurality transmit beams have beamforming parameters that correspond to a second set of beams that can be transmitted or received via the second antenna array and the second beamforming network.

Example 8: The method of any one of examples 1 through 7, further comprising switching a DPDT switch that is coupled between a first SPNT switch associated with the first beamforming network and a second SPNT switch associated with the second beamforming network to toggle the first antenna array from a transmit configuration to a receive configuration and the second antenna array from the receive configuration to the transmit configuration.

Example 9: The method of example 8, wherein the switching the DPDT switch comprises changing signal path through at least one of a LNA, a power amplifier driver, or a power amplifier to flow from the first SPNT switch to the second SNPT switch or from the second SPNT switch to the first SPNT switch.

Example 10: The method of example 8 or 9, wherein the switching the DPDT switch occurs during a guard period between a first TDD period and a second TDD period.

Example 11: The method of any one of examples 1 through 10, further comprising determining a first receive beam of the plurality of receive beams to be repeated via two or more transmit beams of the plurality of transmit beams, wherein the first receive beam is associated with a first output of the plurality of outputs of the first beamforming network and the two or more transmit beams are associated with two or more inputs of the plurality of inputs of the second beamforming network.

Example 12: The method of example 11, wherein the configuring further comprises configuring the switching network to route signals from the first output of the first beamforming network to the two or more inputs of the second beamforming network based at least in part on the mapping of the first receive beam to the two or more transmit beams.

Example 13: The method of example 11 or 12, wherein the switching network comprises a SPNT switch coupled between the plurality of outputs of the first beamforming network and a variable gain amplifier that is coupled with a power divider that divides the output of the variable gain amplifier among the plurality of inputs of the second beamforming network.

Example 14: The method of any one of examples 11 through 13, wherein: the wireless router is a bidirectional wireless router the plurality receive beams have beamforming parameters that correspond to a first set of beams that can be transmitted or received via the first antenna array and the first beamforming network; and the plurality transmit beams have beamforming parameters that correspond to a second set of beams that can be transmitted or received via the second antenna array and the second beamforming network.

Example 15: The method of any one of examples 11 through 14, wherein the method further comprises switching a DPDT switch that is coupled between a SPNT switch associated with the first beamforming network and a power divider/combiner of the second beamforming network to toggle the first antenna array from a transmit configuration to a receive configuration and the second antenna array from the receive configuration to the transmit configuration.

Example 16: The method of example 15, wherein the switching the DPDT switch changes signal path through a LNA, a power amplifier driver, and a power amplifier to flow from the SPNT switch to the power divider/combiner or from the power divider/combiner to the SPNT switch.

Example 17: The method of any one of examples 1 through 16, further comprising determining a first set of beams that includes two or more receive beams of the plurality of receive beams to be repeated via a second set of beams that includes two or more transmit beams of the plurality of transmit beams, wherein each beam of the first set of beams is associated with a corresponding output of a first output set of the plurality of outputs of the first beamforming network and each beam of the second set of beams is associated with a corresponding input of a first input set the plurality of inputs of the second beamforming network.

Example 18: The method of example 17, wherein the configuring further comprises configuring the switching network to route signals from the first output set of the first beamforming network to the first input set of the second beamforming network based at least in part on the mapping of the first set of beams to the second set of beams.

Example 19: The method of example 17 or 18, wherein the switching comprises: dividing, at a plurality of power dividers that are associated with each output of the plurality of outputs of the first beamforming network, each output signal of the first output set into a first number of outputs that correspond to a second number of inputs of the plurality of inputs of the second beamforming network; switching, based at least in part on the mapping of the first set of beams to the second set of beams, a plurality of SPST switches, each SPST switch coupled with a divided output signal of one of the plurality of power dividers, wherein the switching couples the divided output signals with a plurality of inputs of a plurality of power combiners, each power combiner being associated with a corresponding input of the plurality of inputs of the second beamforming network; combining, at the plurality of power combiners, received output signals from a plurality of SPST switches, wherein each SPST switch of the plurality of SPST switches is associated with a corresponding output of the first output set; and routing an output of each of the plurality of power combiners to an associated input of the plurality of inputs of the second beamforming network.

Example 20: The method of any one of examples 17 through 19, wherein: the first beamforming network includes a low noise amplifier coupled between each of the two or more antenna elements of the first antenna array and an associated input of the first beamforming network; and the second beamforming network includes a power amplifier driver and a power amplifier coupled between each of the two or more antenna elements of the second antenna array and an associated output of the second beamforming network.

Example 21: The method of any one of examples 17 through 20, wherein: the wireless router is a bidirectional wireless router the plurality receive beams have beamforming parameters that correspond to the first set of beams that can be transmitted or received via the first antenna array and the first beamforming network; and the plurality transmit beams have beamforming parameters that correspond to the second set of beams that can be transmitted or received via the second antenna array and the second beamforming network.

Example 22: The method of any one of examples 17 through 21, further comprising switching a first plurality of transmit/receive amplification paths between antenna elements of the first antenna array and the first beamforming network based on whether the first set of beams are being transmitted or received using the first antenna array, and switching a second plurality of transmit/receive amplification paths between antenna elements of the second antenna array and the second beamforming network based on whether the second set of beams are being transmitted or received using the second antenna array.

Example 23: The method of example 22, wherein the switching the first plurality of transmit/receive amplification paths and the second plurality of transmit/receive amplification paths occurs during a guard period between a first TDD period and a second TDD period.

Example 24: The method of example 22 or 23, wherein the switching the first plurality of transmit/receive amplification paths and the second plurality of transmit/receive amplification paths occurs concurrently at a duplexer or circulator component to route received signals at each antenna element to a low noise amplifier and to concurrently route signals to be transmitted at each antenna element to a power amplifier driver and power amplifier.

Example 25: The method of any one of examples 22 through 24, wherein the switching the first plurality of transmit/receive amplification paths and the second plurality of transmit/receive amplification paths provides full-duplex routing of transmitted and received signals.

Example 26: The method of any one of examples 1 through 9, 11 through 22, 24 or 25, wherein the first beamforming network, switching network, and the second beamforming network are associated with a first transmission path at a first frequency of a FDD system.

Example 27: The method of example 26, further comprising: receiving, at two or more antenna elements of the second antenna array, a second signal at a second frequency of the FDD system; feeding the received second signal into corresponding inputs of a third beamforming network associated with a second transmission path at the second frequency of the FDD system; switching, at a second switching network associated with the second transmission path at the second frequency of the FDD system, one or more outputs of the third beamforming network to be coupled with one or more inputs of a fourth beamforming network associated with the second transmission path at the second frequency of the FDD system, wherein the switching is based at least in part on the mapping of the one or more receive beams to the one or more transmit beams; and transmitting, using two or more antenna elements of the second antenna array coupled with corresponding outputs of the fourth beamforming network, the second signal at the second frequency of the FDD system.

Example 28: The method of example 26 or 27, wherein: the first beamforming network includes a first low noise amplifier coupled between each of the two or more antenna elements of the first antenna array and an associated input of the first beamforming network; the second beamforming network includes a first power amplifier driver and a first power amplifier coupled between each of the two or more antenna elements of the second antenna array and an associated output of the second beamforming network; the third beamforming network includes a second low noise amplifier coupled between each of the two or more antenna elements of the second antenna array and an associated input of the third beamforming network; and the fourth beamforming network includes a second power amplifier driver and a second power amplifier coupled between each of the two or more antenna elements of the first antenna array and an associated output of the fourth beamforming network.

Example 29: The method of any one of examples 26 through 28, wherein: a first diplexer routes signals received at the first antenna array at the first frequency of the FDD system to the first beamforming network and routes signals provided from the fourth beamforming network to the first antenna array; and a second diplexer routes signals received at the second antenna array at the second frequency of the FDD system to the third beamforming network and routes signals provided from the second beamforming network to the second antenna array.

Example 30: The method of any one of examples 1 through 29, further comprising: establishing a control link with a controller of the wireless router, the control link being separate from the one or more receive beams or the one or more transmit beams; and receiving, via the control link, one or more of first beamforming parameters for the first beamforming network, second beamforming parameters for the second beamforming network, mapping information between the one or more receive beams and the one or more transmit beams, or any combinations thereof.

Example 31: The method of any one of examples 1 through 30, wherein the first antenna array comprises a dual-polarized antenna array functioning in a first polarization and the second antenna array comprises the dual-polarized antenna array functioning in a second polarization.

Example 32: The method of any one of examples 1 through 31, wherein one or more components of the wireless router, including one or more of the first antenna array, the second antenna array, one or more switches, one or more couplers, one or more combiners, one or more splitters, one or more filters, one or more phase-shifters, one or more connecting elements, or any combinations thereof, comprise a meta-material or a material with tunable permittivity and permeability.

Example 33: The method of any one of examples 1 through 32, further comprising: monitoring an output of at least one power amplifier associated with the second beamforming network and the second antenna array; and adjusting, based at least in part on the output, one or more of a gain of the at least one power amplifier or a gain of at least one low noise amplifier coupled with the first antenna array.

Example 34: An apparatus for wireless communication comprising a processor, memory coupled with the processor, the processor and memory configured to perform a method of any one of examples 1 through 33.

Example 35: An apparatus for wireless communication comprising at least one means for performing a method of any one of examples 1 through 33.

Example 36: A non-transitory computer-readable medium storing code for wireless communication comprising a processor, memory coupled with the processor, and instructions stored in the memory and executable by the processor to cause the apparatus to perform a method of any one of examples 1 through 33.

Techniques described herein may be used for various wireless communications systems such as CDMA, TDMA, FDMA, OFDMA, single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), E-UTRA, Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell may cover a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communication at a wireless device, comprising:
   one or more memories; and
   one or more processors coupled with the one or more memories, the one or more processors configured to cause the wireless device to:
      receive, using two or more first antenna elements of a first antenna array coupled with a first beamforming network that is configured to receive one or more receive beams of a plurality of receive beams, one or more first signals associated with the one or more receive beams;

couple, using a switching network between the first beamforming network and a second beamforming network that is configured to transmit one or more transmit beams of a plurality of transmit beams, one or more outputs of a plurality of outputs of the first beamforming network with one or more inputs of a plurality of inputs of the second beamforming network based at least in part on a configuration that maps the one or more receive beams to the one or more transmit beams, wherein the configuration to couple the one or more outputs of the first beamforming network with the one or more inputs of the second beamforming network provides at least one signal path for each of the one or more receive beams; and transmit, using two or more second antenna elements of a second antenna array coupled with the second beamforming network, one or more second signals associated with the one or more transmit beams based at least in part on the received one or more first signals associated with the one or more receive beams.

2. The apparatus of claim 1, wherein the first beamforming network and the second beamforming network are each based at least in part on a Butler matrix.

3. The apparatus of claim 1, wherein the one or more processors are further configured to cause the wireless device to:

identify a receive beam of the plurality of receive beams to be repeated via a transmit beam of the plurality of transmit beams, the receive beam associated with an output of the plurality of outputs of the first beamforming network and the transmit beam associated with an input of the plurality of inputs of the second beamforming network; and couple, using the switching network based at least in part on the identification of the receive beam to be repeated via the transmit beam, the output of the first beamforming network with the input of the second beamforming network.

4. The apparatus of claim 1, wherein the one or more processors are further configured to cause the wireless device to:

toggle the first antenna array from a transmit configuration to a receive configuration, and toggle the second antenna array from the receive configuration to the transmit configuration, based at least in part on a switch of a di-pole-di-throw (DPDT) switch that is coupled between a first single-pole-N-throw (SPNT) switch associated with the first beamforming network and a second SPNT switch associated with the second beamforming network.

5. The apparatus of claim 4, wherein the one or more processors are further configured to cause the wireless device to:

change a signal path through at least one of a low noise amplifier, a power amplifier driver, or a power amplifier to flow from the first SPNT switch to the second SPNT switch, or from the second SPNT switch to the first SPNT switch, based at least in part on the switched DPDT switch.

6. The apparatus of claim 4, wherein the one or more processors are further configured to cause the wireless device to:

switch the DPDT switch during a guard period between a first time domain duplexing (TDD) period and a second TDD period.

7. The apparatus of claim 1, wherein the one or more processors are further configured to cause the wireless device to:

identify a receive beam of the plurality of receive beams to be repeated via two or more transmit beams of the plurality of transmit beams, the receive beam associated with an output of the plurality of outputs of the first beamforming network and the two or more transmit beams associated with two or more inputs of the plurality of inputs of the second beamforming network; and couple, using the switching network based at least in part on the identification of the receive beam to be repeated via the two or more transmit beams, the output of the first beamforming network with the two or more inputs of the second beamforming network.

8. The apparatus of claim 1, wherein the one or more processors are further configured to cause the wireless device to:

toggle the first antenna array from a transmit configuration to a receive configuration, and toggle the second antenna array from the receive configuration to the transmit configuration, based at least in part on a switch of a di-pole-di-throw (DPDT) switch that is coupled between a single-pole-N-throw (SPNT) switch associated with the first beamforming network and a power divider/combiner associated with the second beamforming network.

9. The apparatus of claim 8, wherein the one or more processors are further configured to cause the wireless device to:

change a signal path through at least one of a low noise amplifier, a power amplifier driver, or a power amplifier to flow from the SPNT switch to the power divider/combiner or from the power divider/combiner to the SPNT switch based at least in part on the switched DPDT switch.

10. The apparatus of claim 1, wherein the one or more processors are further configured to cause the wireless device to:

identify a first set of beams that includes two or more receive beams of the plurality of receive beams to be repeated via a second set of beams that includes two or more transmit beams of the plurality of transmit beams, each beam of the first set of beams associated with a corresponding output of a first output set of the plurality of outputs of the first beamforming network and each beam of the second set of beams associated with a corresponding input of a first input set of the plurality of inputs of the second beamforming network; and couple, using the switching network based at least in part on the identification of the first set of beams to be repeated via the second set of beams, the first output set of the first beamforming network with the first input set of the second beamforming network.

11. The apparatus of claim 10, wherein the one or more processors are further configured to cause the wireless device to:

divide, at a plurality of power dividers that are associated with each output of the plurality of outputs of the first beamforming network, each output signal of the first output set into a plurality of divided output signals;

switch, based at least in part on the identification of the first set of beams to be repeated via the second set of beams, a plurality of single-pole-single-throw (SPST) switches, each SPST switch of the plurality of SPST switches coupled with a divided output signal of one of the plurality of power dividers, to couple the divided output signals with a plurality of inputs of a plurality of power combiners, each power combiner associated with a corresponding input of the plurality of inputs of the second beamforming network;

combine, at the plurality of power combiners, received divided output signals from the plurality of SPST switches; and route an output of each of the plurality of power combiners to an associated input of the plurality of inputs of the second beamforming network.

12. The apparatus of claim 10, wherein the one or more processors are further configured to cause the wireless device to:

switch a first plurality of transmit/receive amplification paths between first antenna elements of the first antenna array and the first beamforming network based at least on part on whether the first set of beams are transmitted or received using the first antenna array; and switch a second plurality of transmit/receive amplification paths between second antenna elements of the second antenna array and the second beamforming network based at least in part on whether the second set of beams are transmitted or received using the second antenna array.

13. The apparatus of claim 12, wherein the one or more processors are further configured to cause the wireless device to:

switch the first plurality of transmit/receive amplification paths and switch the second plurality of transmit/receive amplification paths during a guard period between a first time domain duplexing (TDD) period and a second TDD period.

14. The apparatus of claim 12, wherein the one or more processors are further configured to cause the wireless device to:

switch the first plurality of transmit/receive amplification paths and switch the second plurality of transmit/receive amplification paths concurrently at a duplexer or circulator component to route received signals at each antenna element to a low noise amplifier and to concurrently route signals to be transmitted at each antenna element to a power amplifier driver and power amplifier.

15. The apparatus of claim 1, wherein the first beamforming network, the switching network, and the second beamforming network are associated with a first frequency, and wherein the one or more processors are further configured to cause the wireless device to:

receive, using two or more third antenna elements of the second antenna array coupled with a third beamforming network, one or more third signals associated with one or more second receive beams at a second frequency;

couple, using a second switching network based at least in part on a second configuration that maps the one or more second receive beams to one or more second transmit beams, one or more outputs of a plurality of outputs of the third beamforming network with one or more inputs of a plurality of inputs of a fourth beamforming network via a transmission path associated with the second frequency; and transmit, using two or more fourth antenna elements of the first antenna array coupled with the fourth beamforming network, one or more fourth signals associated with the one or more second transmit beams based at least in part on the received one or more third signals associated with the one or more second receive beams.

16. The apparatus of claim 1, wherein the one or more processors are further configured to cause the wireless device to:

establish a control link separate from the one or more receive beams and the one or more transmit beams; and receive, via the control link, one or more beamforming parameters for the first beamforming network, one or more beamforming parameters for the second beamforming network, or one or more parameters of the configuration that maps the one or more receive beams to the one or more transmit beams.

17. The apparatus of claim 1, wherein the one or more processors are further configured to cause the wireless device to:

monitor an output of at least one power amplifier associated with the second beamforming network and the second antenna array; and adjust, based at least in part on the monitored output, a gain of the at least one power amplifier, a gain of at least one low noise amplifier coupled with the first antenna array, or a combination thereof.

18. The apparatus of claim 1, wherein the first antenna array is associated with a first polarization of a dual-polarized antenna array and the second antenna array is associated with a second polarization of the dual-polarized antenna array.

19. The apparatus of claim 1, wherein the two or more first antenna elements of the first antenna array, or the two or more second antenna elements of the second antenna array, or both comprise a meta-material.

20. A method for wireless communication, comprising:

receiving, using two or more first antenna elements of a first antenna array coupled with a first beamforming network that is configured to receive one or more receive beams of a plurality of receive beams, one or more first signals associated with the one or more receive beams;

coupling, using a switching network between the first beamforming network and a second beamforming network that is configured to transmit one or more transmit beams of a plurality of transmit beams, one or more outputs of a plurality of outputs of the first beamforming network with one or more inputs of a plurality of inputs of the second beamforming network based at least in part on a configuration that maps the one or more receive beams to the one or more transmit beams, wherein the configuration to couple the one or more outputs of the first beamforming network with the one or more inputs of the second beamforming network provides at least one signal path for each of the one or more receive beams; and transmitting, using two or more second antenna elements of a second antenna array coupled with the second beamforming network, one or more second signals associated with the one or more transmit beams based at least in part on the received one or more first signals associated with the one or more receive beams.

21. The method of claim 20, wherein the first beamforming network and the second beamforming network are each based at least in part on a Butler matrix.

22. The method of claim 20, further comprising:

identifying a receive beam of the plurality of receive beams to be repeated via a transmit beam of the plurality of transmit beams, the receive beam associated with an output of the plurality of outputs of the first beamforming network and the transmit beam associated with an input of the plurality of inputs of the second beamforming network; and coupling, using the switching network based at least in part on identifying the receive beam to be repeated via the transmit beam, the output of the first beamforming network with the input of the second beamforming network.

23. The method of claim 20, further comprising:
toggling the first antenna array from a transmit configuration to a receive configuration, and toggling the second antenna array from the receive configuration to the transmit configuration, based at least in part on switching a di-pole-di-throw (DPDT) switch that is coupled between a first single-pole-N-throw (SPNT) switch associated with the first beamforming network and a second SPNT switch associated with the second beamforming network.

24. The method of claim 20, further comprising:
identifying a receive beam of the plurality of receive beams to be repeated via two or more transmit beams of the plurality of transmit beams, the receive beam associated with an output of the plurality of outputs of the first beamforming network and the two or more transmit beams associated with two or more inputs of the plurality of inputs of the second beamforming network; and coupling, using the switching network based at least in part on identifying the receive beam to be repeated via the two or more transmit beams, the output of the first beamforming network with the two or more inputs of the second beamforming network.

25. The method of claim 20, further comprising:
identifying a first set of beams that includes two or more receive beams of the plurality of receive beams to be repeated via a second set of beams that includes two or more transmit beams of the plurality of transmit beams, each beam of the first set of beams associated with a corresponding output of a first output set of the plurality of outputs of the first beamforming network and each beam of the second set of beams associated with a corresponding input of a first input set of the plurality of inputs of the second beamforming network; and coupling, using the switching network based at least in part on identifying the first set of beams to be repeated via the second set of beams, the first output set of the first beamforming network with the first input set of the second beamforming network.

26. The method of claim 20, wherein the first beamforming network, the switching network, and the second beamforming network are associated with a first frequency, the method further comprising:
receiving, using two or more third antenna elements of the second antenna array coupled with a third beamforming network, one or more third signals associated with one or more second receive beams at a second frequency;
coupling, using a second switching network based at least in part on a second configuration that maps the one or more second receive beams to one or more second transmit beams, one or more outputs of a plurality of outputs of the third beamforming network with one or more inputs of a plurality of inputs of a fourth beamforming network via a transmission path associated with the second frequency; and
transmitting, using two or more fourth antenna elements of the first antenna array coupled with the fourth beamforming network, one or more fourth signals associated with the one or more second transmit beams based at least in part on the received one or more third signals associated with the one or more second receive beams.

27. The method of claim 20, further comprising:
establishing a control link separate from the one or more receive beams and the one or more transmit beams; and
receiving, via the control link, one or more beamforming parameters for the first beamforming network, one or more beamforming parameters for the second beamforming network, or one or more parameters of the configuration that maps the one or more receive beams to the one or more transmit beams.

28. The method of claim 20, further comprising:
monitoring an output of at least one power amplifier associated with the second beamforming network and the second antenna array; and
adjusting, based at least in part on the monitored output, a gain of the at least one power amplifier, a gain of at least one low noise amplifier coupled with the first antenna array, or a combination thereof.

29. A non-transitory computer-readable medium storing code for wireless communications, the code comprising instructions executable by one or more processors to cause a wireless device to:
receive, using two or more first antenna elements of a first antenna array coupled with a first beamforming network that is configured to receive one or more receive beams of a plurality of receive beams, one or more first signals associated with the one or more receive beams;
couple, using a switching network between the first beamforming network and a second beamforming network that is configured to transmit one or more transmit beams of a plurality of transmit beams, one or more outputs of a plurality of outputs of the first beamforming network with one or more inputs of a plurality of inputs of the second beamforming network based at least in part on a configuration that maps the one or more receive beams to the one or more transmit beams, wherein the configuration to couple the one or more outputs of the first beamforming network with the one or more inputs of the second beamforming network provides at least one signal path for each of the one or more receive beams; and
transmit, using two or more second antenna elements of a second antenna array coupled with the second beamforming network, one or more second signals associated with the one or more transmit beams based at least in part on the received one or more first signals associated with the one or more receive beams.

30. An apparatus for wireless communication, comprising:
means for receiving, using two or more first antenna elements of a first antenna array coupled with a first beamforming network that is configured to receive one or more receive beams of a plurality of receive beams, one or more first signals associated with the one or more receive beams;
means for coupling, using a switching network between the first beamforming network and a second beamforming network that is configured to transmit one or more transmit beams of a plurality of transmit beams, one or more outputs of a plurality of outputs of the first beamforming network with one or more inputs of a plurality of inputs of the second beamforming network based at least in part on a configuration that maps the one or more receive beams to the one or more transmit beams, wherein the configuration to couple the one or more outputs of the first beamforming network with the one or more inputs of the second beamforming network provides at least one signal path for each of the one or more receive beams; and means for transmitting, using two or more second antenna elements of a second antenna array coupled with the second beamforming network, one or more second signals associated with the one or more transmit beams based at least in part on the received one or more first signals associated with the one or more receive beams.

* * * * *